United States Patent
Toye

(10) Patent No.: US 10,849,281 B2
(45) Date of Patent: Dec. 1, 2020

(54) NETTING MATERIAL

(71) Applicant: Nine IP Limited, Auckland (NZ)

(72) Inventor: Jonathan Dallas Toye, Auckland (NZ)

(73) Assignee: NINE IP LIMITED, Auckland (NZ)

( * ) Notice: Subject to any disclaimer, the term of this patent is extended or adjusted under 35 U.S.C. 154(b) by 499 days.

(21) Appl. No.: 15/318,808

(22) PCT Filed: Jun. 16, 2015

(86) PCT No.: PCT/IB2015/054530
§ 371 (c)(1),
(2) Date: Dec. 14, 2016

(87) PCT Pub. No.: WO2015/193800
PCT Pub. Date: Dec. 23, 2015

(65) Prior Publication Data
US 2017/0118926 A1    May 4, 2017

(30) Foreign Application Priority Data

Jun. 16, 2014 (NZ) ........................................ 626307

(51) Int. Cl.
*A01G 13/02* (2006.01)
*A01G 13/04* (2006.01)

(52) U.S. Cl.
CPC ....... *A01G 13/043* (2013.01); *A01G 13/0206* (2013.01)

(58) Field of Classification Search
CPC .... A01G 13/00; A01G 13/02; A01G 13/0206; A01G 13/0212; A01G 13/0231;
(Continued)

(56) References Cited

U.S. PATENT DOCUMENTS 2,601,326 A * 6/1952 Rohs ................... A01G 9/1438
47/17
RE23,603 E * 12/1952 Rohs et al. .......... A01G 9/1438
47/17
(Continued)

FOREIGN PATENT DOCUMENTS

AU          34723/89 A    11/1989
CN          2764139 Y     3/2006
(Continued)

OTHER PUBLICATIONS

Castellano, S & Scarascia-Mugnozza, G & Russo, Giovanni & Briassoulis, Demetres & Mistriotis, Antonis & Hemming, Silke & Waaijenberg, D. (2008). Plastic Nets in Agriculture: A General Review of Types and Applications. Applied Engineering in Agriculture 24 (2008) 6. 24. 10.13031/2013.25368. (Year: 2008).*
(Continued)

*Primary Examiner* — Maria V Ewald
*Assistant Examiner* — Ethan A. Utt
(74) *Attorney, Agent, or Firm* — Seed IP Law Group LLP

(57) ABSTRACT

An agricultural netting material has a construction profile across the width of the netting in which one or more construction elements varies across the width of the netting, a construction element in a first region of at least 20 cm width of the netting being different to the construction element in a second region of at least 20 cm width of the netting, the construction element being one of a yarn thickness, a yarn width, a yarn transmittance, a yarn pigmentation, a yarn reflectance, a yarn absorbance, a netting aperture size, a netting construction pattern and a netting cover factor.

31 Claims, 32 Drawing Sheets

US 10,849,281 B2
Page 2

(58) Field of Classification Search
CPC ............ A01G 13/0237; A01G 13/0243; A01G 13/025; A01G 13/0256; A01G 13/0268; A01G 13/04; A01G 13/043; A01G 13/10; A01G 13/105; A01G 2013/046; Y10T 428/18; Y10T 428/183; Y10T 428/187; Y10T 428/19; Y10T 428/192; Y10T 428/24942; Y10T 428/2495; Y10T 428/24967; Y10T 428/24975; Y10T 428/24992; Y10T 428/26; Y10T 428/261; Y10T 428/266; Y10T 428/268; Y10T 428/269; Y10T 428/27; Y10T 428/29; Y10T 428/2913; Y10T 428/2915; Y10T 428/2927; Y10T 428/2933; Y10T 428/2938; Y10T 428/2964; Y10T 428/2965; Y10T 428/2967; Y10T 428/2971; Y10T 428/2973; Y10T 428/298; Y10T 442/10; Y10T 442/102; Y10T 442/103; Y10T 442/105; Y10T 442/107; Y10T 442/172; Y10T 442/174; Y10T 442/178; Y10T 442/179; Y10T 442/183; Y10T 442/184; Y10T 442/186; Y10T 442/198; Y10T 442/30; Y10T 442/3008; Y10T 442/3024; Y10T 442/3065; Y10T 442/3089; Y10T 442/313; Y10T 442/3146; Y10T 442/3171; Y10T 442/3976; Y10T 442/40; Y10T 442/406; Y10T 442/413; Y10T 442/419; Y10T 442/425; Y10T 442/438; Y10T 442/444; Y10T 442/60; Y10T 442/601; Y10T 442/602; Y10T 442/603; Y10T 442/607; Y10T 442/608; Y10T 442/614; Y10T 442/615; Y10T 442/619; Y10T 442/622; Y10T 442/626; Y10T 442/637; Y10T 442/642; Y10T 442/643; Y10T 442/696; Y10T 442/697; Y10T 442/698; Y10T 442/699; B32B 5/00; B32B 5/02; B32B 5/022; B32B 5/024; B32B 5/026; B32B 5/028; B32B 5/04; B32B 5/10; B32B 5/14; B32B 5/142; B32B 7/00; B32B 7/02; B32B 7/022; B32B 7/023; D03D 1/00; D03D 1/0035; D03D 1/0058; D03D 1/007; D03D 3/00; D03D 3/005; D03D 3/04; D03D 9/00; D03D 13/00; D03D 13/004; D03D 13/008; D03D 15/00; D03D 15/0016; D03D 15/0033; D03D 15/0061; D03D 15/0083; D03D 15/0094; D03D 15/08; D03D 2700/00; D03D 2700/01; D03D 2700/0103; D03D 2700/0133; D03D 2700/0137; D03D 2700/0144; D03D 2700/0174; D03D 2700/03; D04B 1/00; D04B 1/10; D04B 1/102; D04B 1/104; D04B 1/12; D04B 1/126; D04B 1/14; D04B 1/16; D04B 1/18; D04B 1/22; D04B 21/00; D04B 21/06; D04B 21/08; D04B 21/10; D04B 21/12; D04B 21/14; D04B 21/16; D04B 21/18; D04B 21/20; D04B 21/202; D04H 3/00; D04H 3/005; D04H 3/007; D04H 3/009; D04H 3/011; D04H 3/013; D04H 3/016; D04H 3/018; D04H 13/00

USPC ..... 47/20.1, 23.1–23.3, 24.1, 29.1, 29.4, 31, 47/31.1, 32; 428/54–56, 57, 58, 212, 428/213, 215, 216, 218, 219, 220, 332, 428/333, 337, 338, 339, 340, 357, 364, 428/365, 372, 375, 378, 392–397, 401; 442/1–5, 43, 44, 46, 47, 49–51, 58, 181, 442/182, 184, 189, 192, 197, 199, 202, 442/301, 304–308, 310, 311, 327–330, 442/333, 334, 340, 341, 344, 347, 351, 442/361, 365, 366, 414–417; 66/169 R, 66/170, 190, 192, 200, 202, 169 A; 139/383 R, 384 R, 420 R, 383 B
See application file for complete search history.

(56) References Cited

U.S. PATENT DOCUMENTS

| | | | | |
|---|---|---|---|---|
| 2,974,442 | A | * 3/1961 | Womelsdorf | ...... A01G 13/0206 47/32 |
| 4,761,913 | A | 8/1988 | Henningsson et al. | |
| 6,001,458 | A | * 12/1999 | Heir | ...... D04B 21/10 428/192 |
| 6,397,920 | B1 | * 6/2002 | Forin | ...... D03D 9/00 139/383 R |
| 2001/0034970 | A1 | * 11/2001 | Ko | ...... A01G 9/22 47/31 |
| 2010/0299993 | A1 | * 12/2010 | Lais | ...... A01G 13/0243 47/29.4 |

FOREIGN PATENT DOCUMENTS

| | | | | |
|---|---|---|---|---|
| DE | 19737219 | A1 * | 3/1999 | ......... E04G 23/0214 |
| DE | 102009047383 | A1 * | 6/2011 | ............ F16B 5/0692 |
| EP | 2634298 | A1 * | 9/2013 | ............ B32B 27/12 |
| GB | 288409 | A | 4/1928 | |
| JP | 10-295196 | A | 11/1998 | |
| JP | 2006-205522 | A | 8/2006 | |
| JP | 2007202551 | A * | 8/2007 | ........... A01G 9/1438 |
| JP | 3147033 | U * | 12/2008 | |
| JP | 3158042 | U * | 3/2010 | |
| KR | 20120100584 | A * | 9/2012 | |
| NL | 1035819 | C2 * | 2/2010 | ............... A01G 9/22 |
| NZ | 570110 | A * | 6/2010 | ............ A01G 13/02 |
| SU | 520076 | A1 * | 7/1976 | |
| WO | WO 2007/147758 | A2 | 12/2007 | |
| WO | WO 2014/041499 | A1 | 3/2014 | |
| WO | WO-2014060289 | A1 * | 4/2014 | ......... A01G 13/0206 |

OTHER PUBLICATIONS

Machine translation (Google Patents) of JP 3158042 U. Translated Jul. 1, 2020. (Year: 2020).*
Machine translation (Google Patents) of JP 3147033 U. Translated Jul. 1, 2020. (Year: 2020).*
Machine translation (Google Patents) of KR 2012-0100584 A. Translated Jul. 1, 2020. (Year: 2020).*
Machine translation (Espacenet) of DE 19737219 A1. Translated Mar. 14, 2019. (Year: 2019).*
Machine translation (Espacenet) of DE 102009047383 A1. Translated Mar. 14, 2019. (Year: 2019).*
Machine translation (Google Patents) of JP 2007-202551 A. Translated Jul. 1, 2020. (Year: 2020).*
Machine translation (Google Patents) of NL 1035819 C2. Translated Mar. 15, 2019. (Year: 2019).*
Machine translation (Google translate) of SU 520076 A1. Translated Mar. 14, 2019. (Year: 2019).*

* cited by examiner

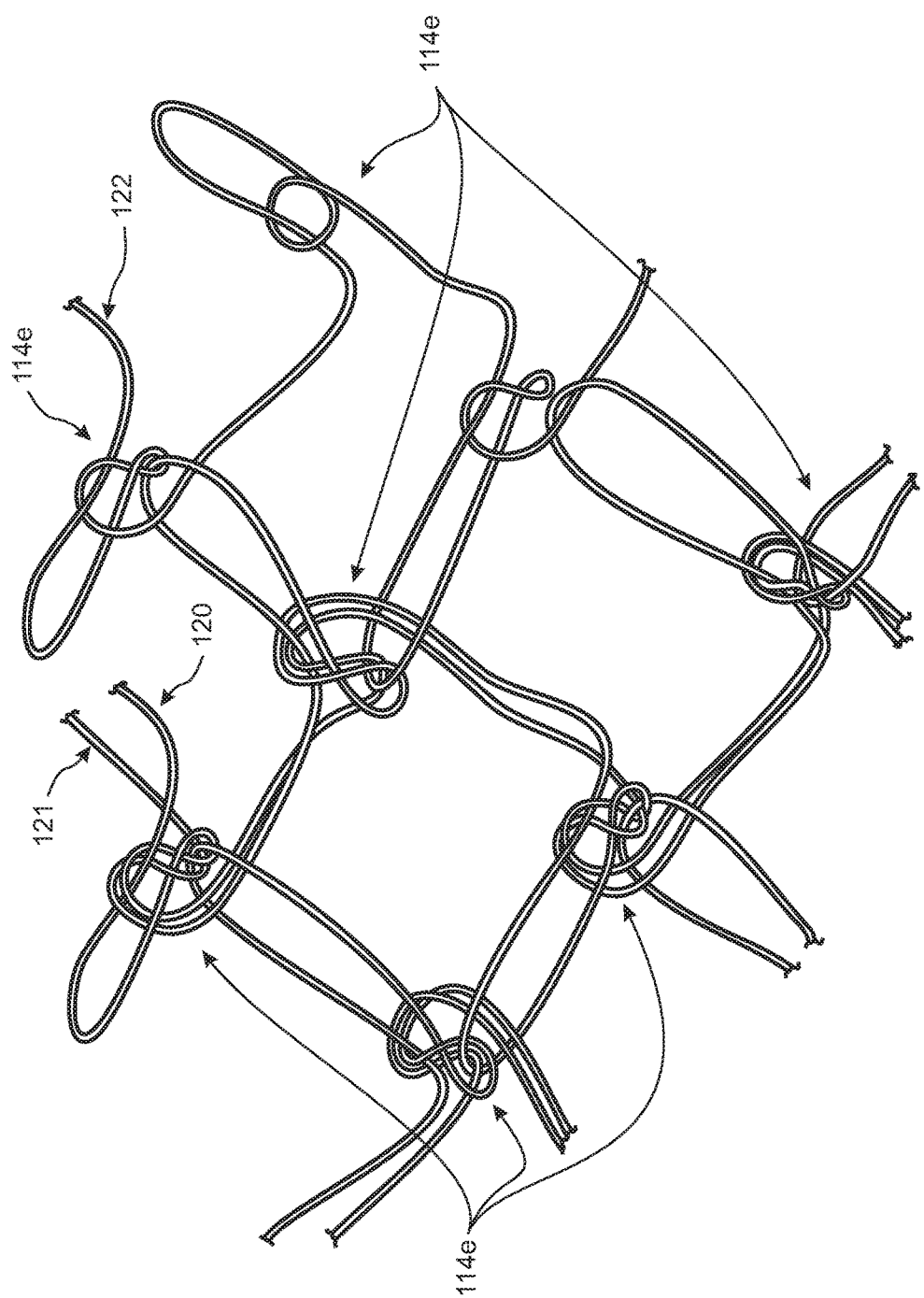
FIGURE 16.1

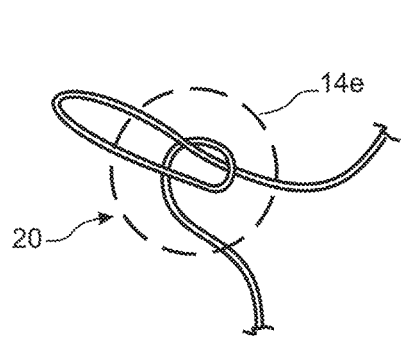
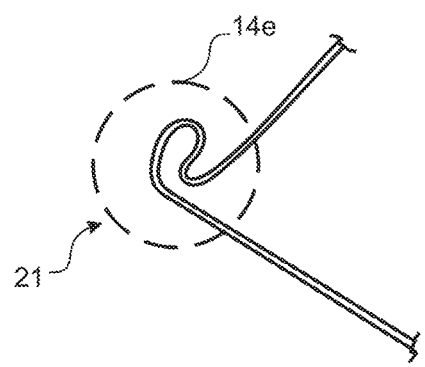
FIGURE 17A
FIGURE 17B
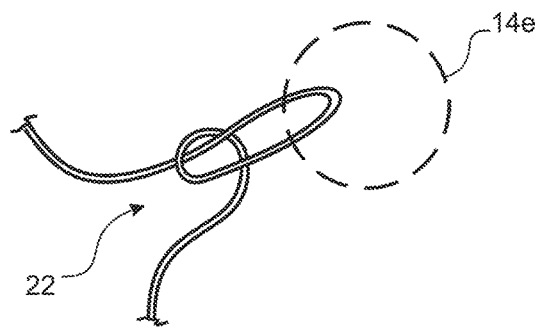
FIGURE 17C
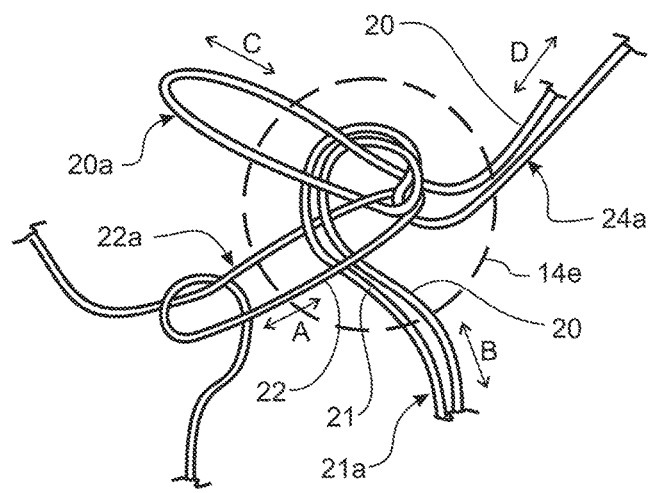
FIGURE 17D

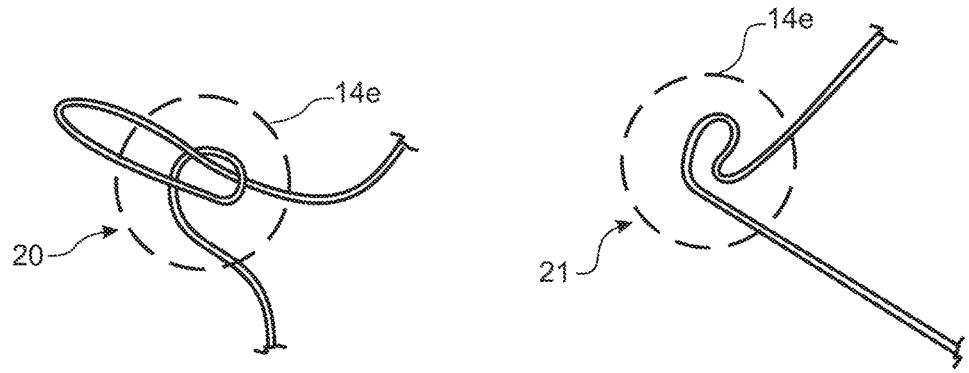
FIGURE 17.1A    FIGURE 17.1B
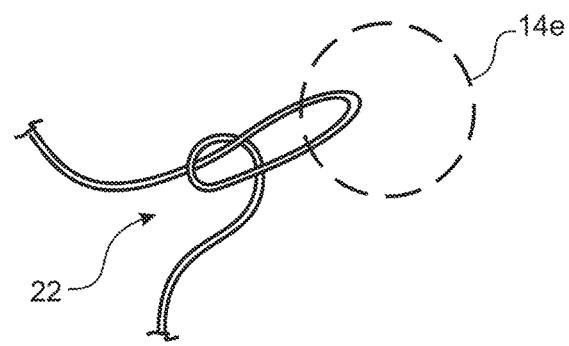
FIGURE 17.1C
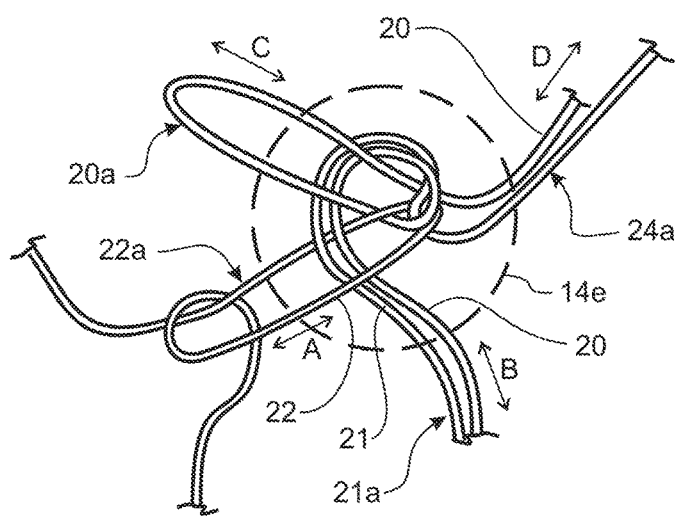
FIGURE 17.1D

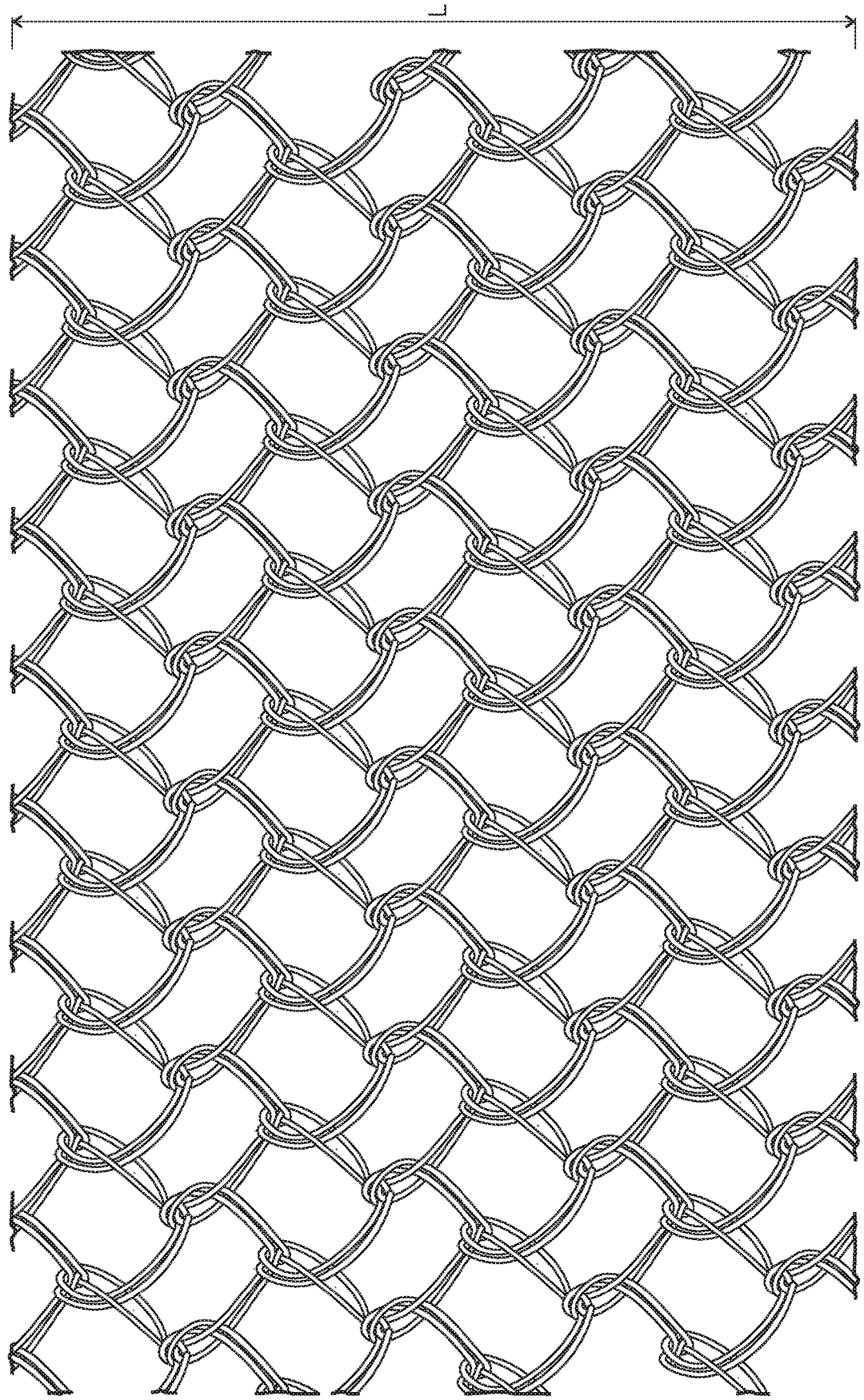
FIGURE 18.1

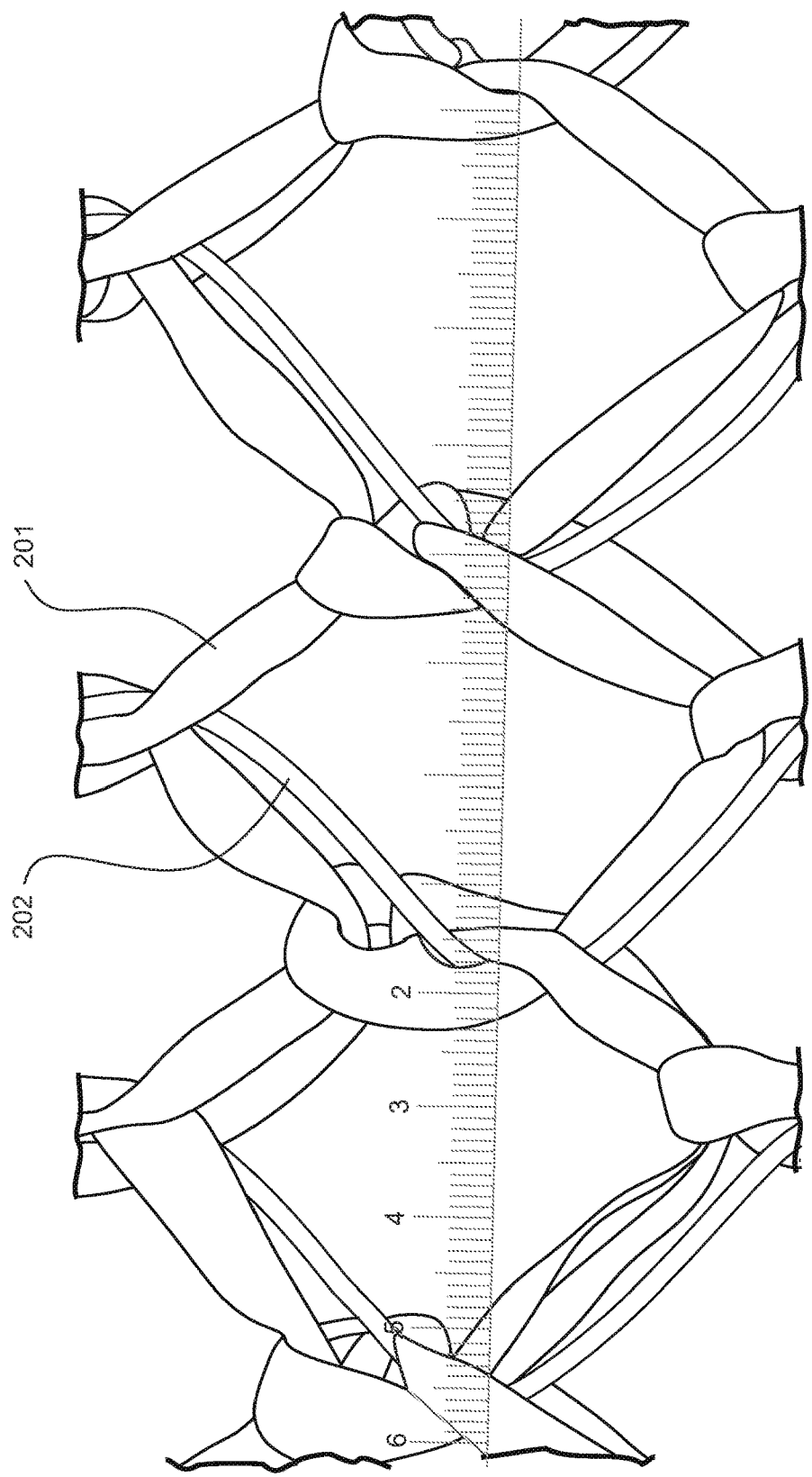
FIGURE 19.1

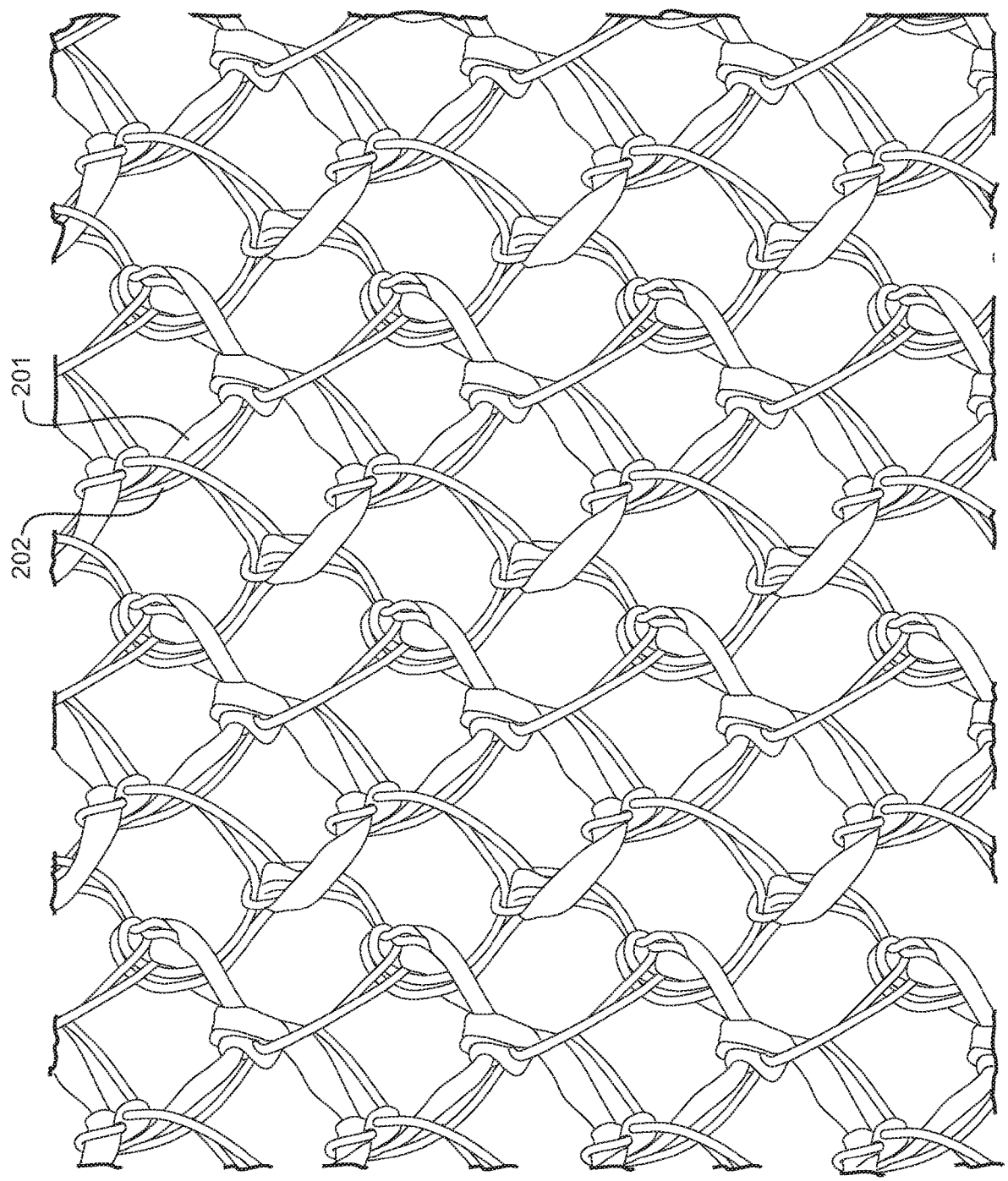
FIGURE 19.2

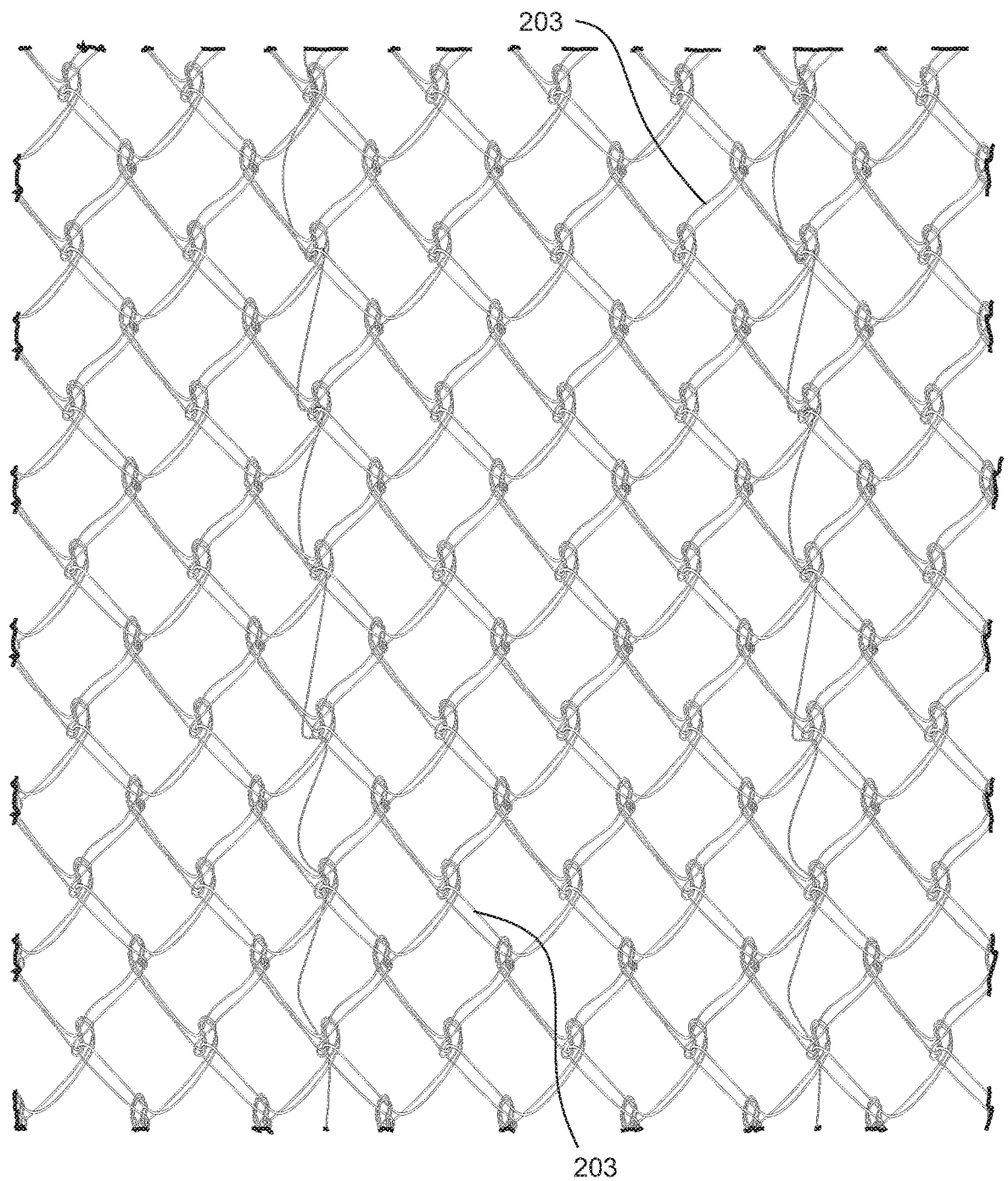
FIGURE 20.1

NETTING MATERIAL

RELATED APPLICATIONS

This application derives priority from New Zealand patent application number 626307, and from PCT application number PCT/IB2015/052804, both of which are incorporated herein by reference.

FIELD OF INVENTION

The invention relates to netting materials and particularly but not exclusively to netting materials for use as hail, sunlight (shade), bird or insect, or wind barrier netting or in other agricultural applications.

BACKGROUND

Netting may be placed near plants to protect for example annual plants, perennial plants, fruit trees, or grape vines, from birds, insects, excessive sun, wind, or hail. Typically the netting is supported over the plant(s) and/or as a vertical and/or angled wall or walls near the plant(s), by for example cables or wires between posts positioned along the rows of plants in a garden, field crop, orchard or vineyard, or is draped over the plant(s).

SUMMARY OF INVENTION

An object of the present invention is to provide a netting material which will at least provide the industry with a useful choice.

In a first aspect, the present invention consists in a netting material having a length dimension and a width dimension smaller, or much smaller, than the length dimension, the width of the netting material being at least 1 m and which has a construction profile across the width of the netting, wherein in the construction profile, one or more construction elements varies across the width of the netting, a construction element in a first region of at least 20 cm width of the netting being different to the construction element in a second region of at least 20 cm width of the netting, the construction element being one of a yarn thickness, a yarn width, a yarn transmittance, a yarn pigmentation, a yarn reflectance, a yarn absorbance, a netting aperture size, a netting construction pattern and a netting cover factor.

In some embodiments, the width of the material is at least 2 m, or at least 3 m, or at least 4 m, or at least 5 m, or at least 6 m, or at least 7 m, or at least 8 m, or at least 10 m, or at least 15 m, or at least 20 m, or at least 25 m.

In some embodiments, the construction profile exists in a region of the width of the material that excludes the outermost 40 cm, or the outermost 50 cm, or the outermost 60 cm, or the outermost 70 cm, or the outer most 80 cm, or the outermost 100 cm, of width of each side the width of the material.

Shade Factor Profile

In some embodiments, the construction profile provides a shade factor profile across the width of the netting which varies across the width of the netting, a shade factor in the first region of the netting being higher than a shade factor in the second region of the netting.

In some embodiments, the netting has a shade factor profile which is substantially uniform along the length of the netting In some embodiments, for visible (400 to 700 nm) solar radiation, the average shade factor of the first region is at least 5 or 10 or 15 or 20 or 30 or 40 or 50 or 80 percentage points more than the average shade factor of the second region.

In some embodiments, for solar radiation of the wavelength range 280-320 nm, or 280-400 nm, or 320-400 nm, the average shade factor of the first region is at least 5 or 10 or 15 or 20 or 30 or 40 or 50 or 80 percentage points more than the average shade factor of the second region.

In some embodiments, for solar radiation of the wavelength range 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm, the average shade factor of the first region is at least 5 or 10 or 15 or 20 or 25 or 30 or 35 or 45 or 50 or 60 or 70 or 80 percentage points more than the average shade factor of the second region.

In some embodiments, in the shade factor profile, the average shade factor of the first region of at least 20 cm width is between 5% more and 4 times more than the average shade factor of the second region of at least 20 cm width.

In some embodiments, in the shade factor profile, the average shade factor of at least the first region is between 20% and 50% more than the average shade factor of the second region.

In some embodiments, the width of the first region is at least 30 cm, or 40 cm, or 50 cm, or 60 cm, or 70 cm, or 80 cm, or 1 m, or 1.2 m, or 1.5 m, or 3 m, or 4 m, or 5 m, or 6 m, or 8 m, or 10 m, and the width of the second region is at least 30 cm, or 40 cm, or 50 cm, or 60 cm, or 70 cm, or 80 cm, or 1 m or 1.2 m or 1.5 m, or 3 m, or 4 m, or 5 m, or 6 m, or 8 m, or 10 m.

In some embodiments, in the shade factor profile, the average shade factor of the first region is between 1.05 and 2 times more than the average shade factor of the second region, and between 1.1 and 4 times the average shade factor of a third region of at least 20 cm width.

In some embodiments, in the shade factor profile, the average shade factor of the first region is between 1.1 to 1.5 times the average shade factor of the second region, and between 1.1 to 2 times the average shade factor of the third region.

In some embodiments, the average shade factor of the first region is about 25% more than the average shade factor of the second region, and about 67% more than the average shade factor of the third region.

In some embodiments, the average shade factor of the first region is about 25%, and the average shade factor in the second region is about 20%, and the average shade factor in the third region is about 15%.

In some embodiments, the width of the first region is at least 50 cm and the width of the second region is at least 50 cm and the width of the third region is at least 50 cm.

In some embodiments, the shade factor of the region of highest shade factor in the shade factor profile is between 10% and 90%.

In some embodiments, the shade factor of a region of lower shade factor in the shade factor profile is between 5% and 50%.

Heat Reflectivity Profile

In some embodiments, the construction profile provides a heat reflectivity profile across the width of the netting which varies across the width of the netting, the heat reflectivity of the first region of at least 20 cm width being higher than the heat reflectivity in the second region of at least 20 cm width.

In some embodiments, the material absorbs at least 30% of solar radiation in the wavelength range 280 to 400 nm.

In some embodiments, the netting has a heat reflectivity profile which is substantially uniform along the length of the netting.

In some embodiments, in the heat reflectivity profile, the average heat reflectivity of the first region of at least 20 cm width is at least 5% or 10% or 15% or 20% or 30% or 40% or 50% or 60% or 80% or 100% more than the average heat reflectivity of the second region of at least 20 cm width, or is 1.2 times or 1.5 times or 2.0 times, or 2.5 times, or 3.0 times, or 4.0 times more than the average heat reflectivity of the second region of at least 20 cm width.

In some embodiments, the average heat reflectivity of at least the first region of at least 20 cm width is between 1.05 to 4 times more than the average heat reflectivity of the second region of at least 20 cm width.

In some embodiments, the width of the first region comprises between 10 to 90%, or 20 to 80%, or 40 to 60% of the width of the material.

In some embodiments, the average heat reflectivity of the first region is between 20% and 50% more than the average heat reflectivity of the second region.

In some embodiments, the width of the first region is at least 50 cm and the width of the second region is at least 50 cm.

In some embodiments, the width of the first region is between 1 and 2 m and the width of the second region is between 1 and 2 m.

In some embodiments, in the heat reflectivity profile, the average heat reflectivity of the first region of at least 20 cm width is between 1.05 and 2 times more than the average heat reflectivity of the second region of at least 20 cm width, and between 10% more and 4 times more than the average heat reflectivity of a third region of at least 20 cm width.

In some embodiments, the average heat reflectivity of the first region of at least 20 cm width is between 10% more and 50% more than the average heat reflectivity of the second region of at least 20 cm width, and between 50% more and 2 time more than the average heat reflectivity of the third region of at least 20 cm width.

In some embodiments, the average heat reflectivity of the first region of at least 20 cm width is about 25% more than the average heat reflectivity of the second region of at least 20 cm width, and about 67% more than the average heat reflectivity of the third region of at least 20 cm width.

In some embodiments, the average heat reflectivity of the first region is about 20-40%, and the average heat reflectivity of the second region of at least 20 cm width is about 10-30%, and the average heat reflectivity of the third region of at least 20 cm width is about 5-15%.

In some embodiments, the width of the first region is at least 50 cm and the width of the second region is at least 50 cm and the width of the third region is at least 50 cm.

In some embodiments, the width of the first region is at least 80 cm and the width of the second region is at least 80 cm and the width of the third region is at least 80 cm.

In some embodiments, the average heat reflectivity of the region of highest heat reflectivity in the heat reflectivity profile is between 10% and 40%.

In some embodiments, the average heat reflectivity of the region of lower heat reflectivity in the heat reflectivity profile is between 5% and 20%.

In some embodiments, the heat reflectivity is the percentage of solar radiation across the wavelength range 700 to 800 nm which is reflected by the netting.

In some embodiments, heat reflectivity is the percentage of solar radiation across the wavelength range 700 to 900 nm which is reflected by the netting.

In some embodiments, heat reflectivity is the percentage of solar radiation across the wavelength range 1000 to 1600 nm which is reflected by the netting.

In some embodiments, heat reflectivity means the percentage of solar radiation across the wavelength range 1400 to 1600 nm which is reflected by the netting.

In some embodiments, heat reflectivity is the percentage of solar radiation across the wavelength range 700 to 2500 nm which is reflected by the netting.

Yarn Thickness Profile

In some embodiments, the construction profile comprises different thickness yarns, the first region of the netting material comprising a first yarn and the second region comprising a second yarn, the first yarn being thicker than the second yarn.

In some embodiments, a third region of the netting comprises a third yarn and the second yarn is thicker than the third yarn.

In some embodiments, the netting material is woven from warp yarns and weft yarns and the warp yarns in the first region of the netting are thicker than the warp yarns in the second region of the netting.

In some embodiments, the warp yarns in the second region are thicker than the warp yarns in a third region of the netting.

In some embodiments, the weft yarns have a uniform thickness throughout the netting.

In some embodiments, the first yarn comprises a weight in the range 300 to 1000 denier and the second yarn has a weight of 50 to 300 denier.

In some embodiments, the first yarn comprises a weight of 300 to 1000 denier and the second yarn has a weight in the range 150 to 300 and the third yarn has a weight in the range 50 to 150 denier.

In some embodiments, the first yarn has a thickness in the range 0.3 mm to 0.5 mm and the second yarn has a thickness in the range 0.1 mm to 0.3 mm.

In some embodiments, the first yarn comprises a thickness in the range 0.3 mm to 0.4 mm and the second yarn has a thickness of 0.2 mm to 0.3 mm and the third yarn has a thickness in the range 0.1 mm to 0.2 mm.

In some embodiments, the width of the first region is at least 50 cm and the width of the second region is at least 50 cm and the width of the third region (if present) is at least 50 cm.

In some embodiments, the width of the first region is at least 80 cm and the width of the second region is at least 80 cm and the width of the third region (if present) is at least 80 cm.

Yarn Width Profile

In some embodiments, the construction profile comprises different width yarns, the first region of the netting material comprising a first yarn and the second region comprising a second yarn, the first yarn being wider than the second yarn.

In some embodiments, a third region of the netting comprises a third yarn and the second yarn is wider than the third yarn.

In some embodiments, the netting material is woven from warp yarns and weft yarns and the warp yarns in the first region of the netting are wider than the warp yarns in the second region of the netting.

In some embodiments, the warp yarns in the second region are wider than the warp yarns in a third region of the netting.

In some embodiments, the weft yarns have a uniform width throughout the netting.

In some embodiments, the first yarn has a width in the range 0.5 mm to 3 mm and the second yarn has a thickness in the range 0.1 mm to 1.5 mm.

In some embodiments, the first yarn comprises a width in the range 0.5 mm to 3 mm and the second yarn has a thickness in the range 0.3 mm to 1.5 mm and the third yarn has a thickness in the range 0.1 mm to 0.3 mm.

In some embodiments, the first region comprises yarns having a rectangular cross section and the second region comprises yarns having a circular cross section.

In some embodiments, the width of the first region is at least 50 cm and the width of the second region is at least 50 cm and the width of the third region is at least 50 cm.

In some embodiments, the width of the first region is at least 80 cm and the width of the second region is at least 80 cm and the width of the third region is at least 80 cm.

Solar Radiation Transmission Profile

In some embodiments, the construction profile comprises yarns having different solar radiation transmission properties, the first region of the netting material comprising a first yarn and the second region comprising a second yarn, the first yarn having a lower solar radiation transmittance than the second yarn.

In some embodiments, a third region of the netting material comprises a third yarn, and the second yarn has a lower solar radiation transmittance than the third yarn.

In some embodiments, the netting material is woven from warp yarns and weft yarns and the warp yarns in the first region of the netting have a lower solar radiation transmittance than the warp yarns in the second region of the netting.

In some embodiments, the warp yarns in the second region have a lower solar radiation transmittance than the warp yarns in a third region of the netting material.

In some embodiments, the weft yarns have uniform solar radiation transmission properties throughout the netting.

In some embodiments, the different solar radiation transmission properties are different properties of transmission of solar radiation across the wavelength range 280 to 400 nm, or 400 to 700 nm, or 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm.

In some embodiments, the first yarn transmits between 0% and 50% of UV and visible light, and the second yarn transmits between 30 and 95% of UV and visible light.

In some embodiments, the first yarn transmits between 0% and 50% of UV light, and the second yarn transmits between 30 and 95% of UV light.

In some embodiments, the first yarn transmits 0% to 40% of UV and visible light, and the second yarn transmits between 30 and 70% of UV and visible light and the third yarn transmits between 60% and 95% of UV and visible light.

In some embodiments, the first yarn transmits 0% to 40% of UV light, and the second yarn transmits between 30 and 70% of UV light and the third yarn transmits between 60% and 95% of UV light.

In some embodiments, the width of the first region is at least 50 cm and the width of the second region is at least 50 cm and the width of the third region (if present) is at least 50 cm.

In some embodiments, the width of the first region is at least 80 cm and the width of the second region is at least 80 cm and the width of the third region (if present) is at least 80 cm.

Solar Radiation Absorbance

In some embodiments, the construction profile comprises yarns having different solar radiation absorbance properties, the first region of the netting material comprising a first yarn and the second region comprising a second yarn, the first yarn having a higher solar radiation absorbance than the second yarn.

In some embodiments, a third region of the netting material comprises a third yarn, and the second yarn has a higher solar radiation absorbance than the third yarn.

In some embodiments, the netting material is woven from warp yarns and weft yarns and the warp yarns in the first region of the netting have a higher solar radiation absorbance than the warp yarns in the second region of the netting.

In some embodiments, the warp yarns in the second region have a higher solar radiation absorbance than the warp yarns in a third region of the netting material.

In some embodiments, the weft yarns have uniform solar radiation absorbance properties throughout the netting.

In some embodiments, the different solar radiation absorbance properties are different properties of absorbance of solar radiation across the wavelength range 280 to 320 nm, or 320 to 400 nm, or 280 to 400 nm, or 400 to 700 nm, or 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm.

In some embodiments, the first yarn absorbs between 30 and 95% of UV and visible light, and the second yarn absorbs between 0% and 50% of UV and visible light.

In some embodiments, the first yarn absorbs between 30 and 95% of UV light, and the second yarn absorbs between 0% and 50% of UV light.

In some embodiments, the first yarn absorbs between 30 and 95% of visible light (400-700 nm), and the second yarn absorbs between 0% and 50% of visible light (400-700 nm).

In some embodiments, the first yarn absorbs between 30 and 95% of solar radiation across the wavelength range 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm, and the second yarn absorbs between 0% and 50% of solar radiation across the same wavelength range.

In some embodiments, the first yarn absorbs 60% to 95% of UV and visible light, and the second yarn absorbs between 30 and 70% of UV and visible light and the third yarn absorbs between 0% and 40% of UV and visible light.

In some embodiments, the first yarn absorbs between 60% and 95% of UV light, and the second yarn absorbs between 30% and 70% of UV light and the third yarn absorbs between 0% and 40% of UV light.

In some embodiments, the first yarn absorbs 60% to 95% of solar radiation across the wavelength range 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm, and the second yarn absorbs 30 to 70% of solar radiation, on average, across the same wavelength range and the third yarn absorbs 0% to 40% of of solar radiation, on average, across the same wavelength range.

In some embodiments, the width of the first region is at least 50 cm and the width of the second region is at least 50 cm and the width of the third region (if present) is at least 50 cm.

In some embodiments, the width of the first region is at least 80 cm and the width of the second region is at least 80 cm and the width of the third region (if present) is at least 80 cm.

Pigment Profile

In some embodiments, the netting comprises pigmented yarn, and the construction profile comprises different pigmentation, the first region of the netting material comprising a first yarn and the second region comprising a second yarn, the first yarn comprising a higher level of pigmentation or a different type of pigment than the second yarn.

In some embodiments, the first region and second regions of the netting material comprise different colour.

In some embodiments, a third width region of the netting comprises a third yarn, and the second yarn comprising a higher level of pigmentation, a different type of pigment, and/or a different colour, than the third yarn.

In some embodiments, the netting material is woven from warp yarns and weft yarns and the warp yarns in the first region of the netting comprising a higher level of pigmentation, a different type of pigment, and/or a different colour, than the warp yarns in the second region of the netting.

In some embodiments, the warp yarns in the second region comprising a higher level of pigmentation, a different type of pigment, and/or a different colour, than the warp yarns in a third region of the netting material.

In some embodiments, the weft yarns have uniform level of pigmentation throughout the netting.

In some embodiments, the first yarn comprises a carbon black pigmentation level of 1% to 3% by weight and the second yarn comprises a carbon black pigmentation level of less than 1% by weight.

In some embodiments, the first yarn comprises a carbon black pigmentation level of 2% to 3% by weight and the second yarn comprises a carbon black pigmentation level of 1% to 2% by weight and the third yarn comprises a carbon black pigmentation level of less than 1% by weight.

In some embodiments, the first yarn comprises a white pigmentation level of 5% to 30% by weight and the second yarn comprises a white pigmentation level of less than 5% by weight.

In some embodiments, the first yarn comprises a white pigmentation level of 10% to 30% by weight and the second yarn comprises a white pigmentation level of 5% to 10% by weight and the third yarn comprises a white pigmentation level of less than 5% by weight.

In some embodiments, the first and second yarns comprise yarns pigmented after the first and second yarns were constructed into the netting material.

In some embodiments, the first and second yarns comprise yarns pigmented before being constructed into the netting material.

In some embodiments, the width of the first region is at least 50 cm and the width of the second region is at least 50 cm and the width of the third region (if present) is at least 50 cm.

In some embodiments, the width of the first region is at least 80 cm and the width of the second region is at least 80 cm and the width of the third region (if present) is at least 80 cm.

Solar Radiation Reflectivity

In some embodiments, the construction profile comprises yarns having different solar radiation reflectivity, the first region of the netting material comprising a first yarn and the second region comprising a second yarn, the first yarn being more reflective of solar radiation than the second yarn.

In some embodiments, a third region of at least 20 cm width of the netting material comprises a third yarn, and the second yarn being more reflective of solar radiation than the third yarn.

In some embodiments, the netting material is woven from warp yarns and weft yarns, the warp yarns in the first region of the netting being more reflective of solar radiation than the warp yarns in the second region of the netting.

In some embodiments, the warp yarns in the second region are more reflective of solar radiation than the warp yarns in a third region of the netting.

In some embodiments, the weft yarns have uniform solar radiation reflectivity throughout the netting.

In some embodiments, the differing solar radiation reflectivity is differing solar radiation reflectivity across wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm.

In some embodiments, the first yarn reflects at least 30% of solar radiation across wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm, and the second yarn reflects less than 30% solar radiation across that same wavelength range.

In some embodiments, the first yarn reflects at least 40% of solar radiation across the wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm, and the second yarn reflects at least 20% of solar radiation across the same wavelength range but does not reflect more solar radiation across that range than the first yarn, and the third yarn reflects less than 20% of solar radiation on average across the same wavelength range.

In some embodiments, in the construction profile, solar radiation reflectivity of the first yarn across the wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm is at least 5% or 10% or 15% or 20% or 30% or 40% or 50% or 60% or 80% or 100% more than the solar radiation reflectivity of the second yarn across that same wavelength range.

In some embodiments, the solar radiation reflectivity of the first yarn across the wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm is between 1.05 to 4 times more, or between 1.05 to 3 times more, or between 1.05 to 2.5 times more, or between 1.05 more to 2 times more, or between 1.05 more to 1.2 times more, than the solar reflectivity of the second yarn across that same wavelength range.

In some embodiments, the width of the first region comprises between 10 to 90%, or 20 to 80%, or 25 to 50% of the width of the material.

In some embodiments, the solar radiation reflectivity across the wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm of the first yarn is between 20% and 50% more than the solar radiation reflectivity of the second yarn across that same wavelength range.

In some embodiments, the width of the first region is at least 50 cm and the width of the second region is at least 50 cm, and the width of the third region (if present) is at least 50 cm.

In some embodiments, the width of the first region is between 1 and 2 m and the width of the second region is between 1 and 2 m.

In some embodiments, in the solar radiation reflectivity profile across the wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm, the solar reflectivity of the first region of at least 20 cm width is between 1.05 and 2 times more than the solar radiation reflectivity across that same range of the second region of at least 20 cm width, and between 1.1 and 4 times more than the solar radiation reflectivity across that same range of a third region of at least 20 cm width.

In some embodiments, the solar radiation reflectivity across the wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm of the first region of at least 20 cm width is between 10% more and 50% more than the solar radiation reflectivity across that same range of the second region of at least 20 cm width, and between 50% more and 2 time more than the solar radiation reflectivity across that same range of the third region of at least 20 cm width.

In some embodiments, the solar radiation reflectivity across the wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm of the first region of at least 20 cm width is about 25% more than the solar radiation reflectivity across that same range of the second region of at least 20 cm width, and about 67% more than the solar radiation reflectivity across that same range of the third region of at least 20 cm width.

In some embodiments, the solar radiation reflectivity of the first region across the wavelength range 280 to 400 nm, or 400 to 700 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm is about 20-40%, and the solar radiation reflectivity across that same range of the second region of at least 20 cm width is about 10-30%, and the solar radiation reflectivity across that same range of the third region of at least 20 cm width is about 5-15%.

In some embodiments, the width of the first region is at least 50 cm and the width of the second region is at least 50 cm and the width of the third region is at least 50 cm.

In some embodiments, the solar radiation reflectivity across the wavelength range 280 to 400 nm, or 400 to 700 nm, of the region of highest solar radiation reflectivity in the reflectivity profile is between 10% and 40%.

In some embodiments, the solar radiation reflectivity across the wavelength range 280 to 400 nm, or 400 to 700 nm, of the region of lower solar radiation reflectivity in the reflectivity profile is between 5% and 20%.

In some embodiments, the first yarn reflects at least 30% solar radiation on average across the UV, visible and very near infrared ranges, and the second yarn reflects less than 30% solar radiation on average across the UV, visible and very near infrared ranges.

In some embodiments, the first yarn reflects at least 40% solar radiation on average across the UV, visible and very near infrared ranges, and the second yarn reflects at least 20% solar radiation on average across the UV, visible and very near infrared ranges, and the third yarn reflects less than 20% solar radiation on average across the UV, visible and very near infrared ranges.

In some embodiments, the first yarn and/or the second yarn transmits at least 10% of solar radiation across the wavelength range about 800-2500 nm.

Aperture Size Profile

In some embodiments, the construction profile comprises different sized apertures, the first region of the netting material comprising a first aperture size and the second region of the netting material comprising a second aperture size, the second aperture size being larger than the first aperture size.

In some embodiments, a third region of the netting material comprises a third aperture size, and the third aperture size being larger than the second aperture size.

In some embodiments, the netting material is woven from warp yarns and weft yarns and the spacing between adjacent warp yarns in the second region of the netting is larger than the spacing between adjacent warp yarns in the first region of the netting.

In some embodiments, the spacing between warp yarns in a third region of the netting is larger than the spacing between adjacent warp yarns in the second region of the netting.

In some embodiments, the weft yarns have uniform spacing throughout the netting.

In some embodiments, the aperture size in the second region of the netting material is between 1.1 and 4 times the aperture size in the first region of the netting material.

In some embodiments, the aperture size in the second region of the netting material is between 1.1 and 1.5 times the aperture size in the first region of the netting material.

In some embodiments, the aperture size in the second region of the netting material is between 1.1 and 1.5 times the aperture size in the first region of the netting material and the aperture size in the third region of the netting is between 1.2 and 4 times the aperture size in the first region of the netting.

In some embodiments, the aperture size in the second region of the netting material is between 1.1 and 1.5 times the aperture size in the first region of the netting material and the aperture size in the third region of the netting is larger than that of the second region and between 1.3 times and 2 times the aperture size in the first region of the netting.

In some embodiments, the aperture size in the second region of the netting material is between 1.15 and 1.35 times the aperture size in the first region of the netting material and the aperture size in the third region of the netting is between 1.4 and 1.6 the aperture size in the first region of the netting.

In some embodiments, the first region of the netting comprises an aperture size of about 4 mm, and the second region of the netting comprises an aperture size of about 5 mm.

In some embodiments, the first region of the netting comprises an aperture size of 4 mm, and the second region of the netting comprises an aperture size of 5 mm, and the third region of the netting comprises an aperture size of 6 mm.

In some embodiments, the width of the first region is at least 50 cm and the width of the second region is at least 50 cm and the width of the third region (if present) is at least 50 cm.

In some embodiments, the width of the first region is at least 80 cm and the width of the second region is at least 80 cm and the width of the third region (if present) is at least 80 cm.

"Combination" Profile

In some embodiments, the construction profile comprises different thickness yarns with different pigmentation, a first region of the netting material comprising a first yarn and a second region comprising a second yarn, the first yarn being thicker than the second yarn, and the second yarn comprising a higher pigmentation level than the first yarn.

In some embodiments, the construction profile comprises different width yarns with different pigmentation, the first region of the netting material comprising a first yarn and the second region comprising a second yarn, the first yarn being wider than the second yarn, and the second yarn comprising a higher pigmentation level than the first yarn.

In some embodiments, the construction profile comprises different sized apertures and difference pigmentation, the first region of the netting material constructed from a first yarn to comprise a first aperture size and the second region of the netting material constructed from a second yarn to comprise second aperture size, the second aperture size being larger than the first aperture size and the second yarn having a higher pigmentation level than the first yarn.

In some embodiments, the transmittance of the netting material is more uniform across the width of the netting than in an equivalent netting in which the pigmentation level of the first and second yarns is the same.

In some embodiments, the width of the first region is at least 50 cm and the width of the second region is at least 50 cm and the width of the third region (if present) is at least 50 cm.

In some embodiments, the width of the first region is at least 80 cm and the width of the second region is at least 80 cm and the width of the third region (if present) is at least 80 cm.

'Location of Region'

In some embodiments, the first region is a centrally located region and the second region is a peripheral region along at least one side of the central region, or on opposing sides of the central region.

In some embodiments, the second region is a centrally located region and the first region is a peripheral region along at least one side of the central region, or on opposing sides of the central region.

In some embodiments, the first region is, or is located predominantly on, one side of the netting material between a longitudinal centre of the netting and one longitudinal edge of the netting, and the second region is another side, or is located predominantly on another side, of the netting material between the longitudinal centre of the netting and the other longitudinal edge of the netting.

In some embodiments, the first region is a central region of the netting, and the third region is a peripheral region of the netting either side of the central region, and the second region is an intermediate region of the netting located either side of the central region and between the central region and each peripheral region.

In some embodiments, the second region is a central region of the netting, and the third region is a peripheral region of the netting either side of the central region, and the first region is an intermediate region of the netting located either side of the central region and between the central region and each peripheral region.

'Construction of Netting'

In some embodiments, the netting material is a knitted netting material.

In some embodiments, the netting material is one or more of a shade netting, a bird netting, a wind break netting, an insect netting and a hail netting.

In a second aspect, the present invention consists in a netting material which is of a knitted mesh construction, knitted such that at yarn intersections in the netting multiple yarns of which the netting is formed are knitted around each other to define the netting mesh apertures so that the netting is stretchable in multiple directions, and wherein connecting yarn portions between said yarn intersections extend substantially linearly between intersections, and wherein at least one of the multiple yarns of which the netting is formed comprises a tape, and/or in addition to the multiple yarns of which the netting is formed (whether comprising a tape as above or otherwise) the netting also comprises multiple yarns or tapes extending through the netting (as a 'lay-in') woven through the mesh apertures and/or around intersections of the multiple yarns of which the netting is formed, and wherein the netting comprises a greater amount of said tape or said lay-in in at least one of a first region and a second region of the netting than in the other one of said first and second regions.

In some embodiments, the netting comprises a greater amount of said tape or said lay-in in said second region than in said first region.

In some embodiments, the first region is a longitudinal central region of the netting material.

In some embodiments, the netting comprises said tape or said lay-in in at least one of a first region and a second region of the netting and no said tape or lay-in in the other one of said first and second regions.

In some embodiments, the netting comprises a greater amount of said tape or said lay-in in at least one of the first region, the second region or a third region of the netting than in another of said first, second, or third regions.

In some embodiments, the netting comprises a greater amount of said tape or said lay-in in said first region than in each of said second and third regions.

In some embodiments, the netting comprises a greater amount of said tape or said lay-in said first region, a lesser amount of tape in said second region than in said first region, and a lesser again amount of tape in said third region than in said second region.

In some embodiments, at least one of the multiple yarns of which the netting is formed comprises a tape, another or the other of the multiple yarns of which the netting is formed comprises monofilament yarn having a circular cross-section shape.

In some embodiments, the lay-in yarns or tapes extend through the netting substantially in the same general direction to one another.

In some embodiments, the lay-in yarns or tapes comprise tapes having a rectangular or square cross-section.

In some embodiments, the lay-in yarns or tapes comprise monofilament having a circular or oval cross-section.

In some embodiments, the netting is knitted from multiple yarns all extending along a length of the netting.

In some embodiments, in the netting each yarn follows an approximate zig-zag path along the length of the netting, looping at each intersection in the netting comprising the yarn, to a further netting yarn intersection one on one side and one on another side.

In some embodiments, each intersection is formed by knitting together of three yarn parts passing through the intersection:
- a first yarn which enters the intersection along a first axis and exits the intersection along the same first axis, so that a first connecting portion to a first adjacent intersection comprises adjacent lengths of the same yarn,
- a second yarn which enters the intersection along a second axis, passes through the loop within the intersection of the first yarn, and extends to and returns from a second adjacent intersection along a third axis so that a second connecting portion to that adjacent intersection comprises adjacent lengths of the same yarn, and exits the intersection along a fourth axis, and
- a third yarn which enters the intersection along the second axis so that a third connecting portion from a third adjacent intersection comprises portions of both the second and third yarns, passes through the loop in the intersection of the first yarn, and exits the intersection along fourth axis with the second yarn, so that a fourth connecting portion to a fourth adjacent intersection comprises portions of both the second and third yarns.

In some embodiments, each intersection is formed by knitting together of three yarn parts passing through the intersection:
- a first yarn which enters the intersection along a first axis, firstly creates an extra loop and exits the intersection along the same first axis, so that a first connecting portion to a first adjacent intersection comprises adjacent lengths of the same yarn,
- a second yarn which enters the intersection along a second axis, passes through the loop within the intersection of the first yarn, and then goes behind the loop created by the first yarn to create an extra loop and then extends to and returns from a second adjacent intersection along a third axis so that a second connecting portion to that adjacent intersection comprises adjacent lengths of the same yarn, and exits the intersection along a fourth axis, and
- a third yarn which enters the intersection along the second axis so that a third connecting portion from a third adjacent intersection comprises portions of both the second and third yarns, passes through the loop in the intersection of the first yarn, and exits the intersection along fourth axis with the second yarn, so that a fourth connecting portion to a fourth adjacent intersection comprises portions of both the second and third yarns.

In some embodiments, each yarn intersection in the netting is connected to adjacent and surrounding yarn intersections by connecting yarn portions each comprising at least two yarn lengths.

In some embodiments, each yarn intersection in the netting is connected to adjacent and surrounding yarn intersections by connecting yarn portions each comprising at least two yarn lengths that are at least free of knots or loops for 2 mm or more in length between the intersections.

In some embodiments, in immediately adjacent rows of yarn intersections in a second direction substantially orthogonal to said first direction, the yarn intersections of said immediately adjacent rows are staggered relative to one another.

High Coverage-Low Weight Leno Weave Netting

In a third aspect, the present invention consists in a netting material having a length dimension and a width dimension smaller, or much smaller, than the length dimension comprising:
- weft tapes, and
- groups of warp yarns spaced apart across the width of the netting material, the groups of warp yarns and the weft tapes woven together in a leno weave, the warp yarns in each group of warp yarns crossing at a cross-over point between adjacent weft tapes, wherein
- the distance between adjacent cross over points is less than the width of the weft tapes so that the weft tapes are folded at each group of warp yarns, and the spacing between adjacent groups of warp yarns sufficient to allow the weft tapes to substantially unfold so that edges of adjacent weft tapes overlap or abut between adjacent groups of warp yarns.

In some embodiments, the warp yarns are monofilaments.

In some embodiments, the distance between adjacent cross over points is less than the width of the weft tapes so that the weft tapes are folded at each group of warp yarns, and the spacing between adjacent groups of warp yarns sufficient to allow the weft tapes to substantially unfold so that edges of adjacent weft tapes overlap or abut between adjacent groups of warp yarns.

In some embodiments, the width of the tape is at least twice the distance between adjacent cross over points.

In some embodiments, the distance between adjacent groups of warp yarns is at least three times, or five times, or ten times, or fifteen times, or twenty times the width of the weft tapes.

In some embodiments, the warps yarns are woven tightly around the weft tapes so that the weft tapes are folded at each group of warp yarns, and the spacing between adjacent groups of warp yarns sufficient to allow the weft tapes to substantially unfold so that adjacent weft tapes overlap or abut between adjacent groups of warp yarns.

In some embodiments, the netting material has a cover factor of at least 5%, 10%, 20%, 30%, 40%, or 60%, or 85%, or 90% or 95%, or about 95%, or between 5 and 40%, or between 40% and 95%, or between 85% to 98%.

In some embodiments, the netting material has a weight of less than 100 gsm, or 95 gsm, or 90 gsm, or 85 gsm, or 80 gsm, or about 80 gsm.

In some embodiments, the warp yarns are monofilaments.

In some embodiments, each group of warp yarns comprises two or more warp yarns.

In some embodiments, each group of warp yarns is a pair of warp yarns.

In some embodiments, the spacing between the groups of warp yarns is varied across the width of the netting material to provide a varying cover factor across the netting material.

In some embodiments, said material has a width dimension smaller than its length dimension, and wherein said material has a first lengthwise extending region and a second lengthwise extending region, each lengthwise extending region having a width of at least 20 cm, or 50 cm, or 80 cm, and wherein the spacing between adjacent groups of warp yarns in the first region is less than that of the second region, and wherein the cover factor in the first region is more than that of the second region.

In some embodiments, said material has a width dimension smaller than its length dimension, and wherein said material has a first lengthwise extending region and a second lengthwise extending region, each lengthwise extending region having a width of at least 20 cm, or 50 cm, or 80 cm, and wherein the spacing between adjacent groups of warp yarns in the first region is less than that of the second region, and wherein the cover factor in the first region is less than that of the second region.

In a fourth aspect, the present invention consists in a netting material having a length dimension and a width dimension smaller, or much smaller, than the length dimension comprising:

weft tapes, groups of warp yarns spaced apart across the width of the netting material, the groups of warp yarns and the weft tapes woven together in a leno weave, the warp yarns in each group of warp yarns crossing at a cross-over point between adjacent weft tapes, wherein the width of the weft tapes, the distance between adjacent cross over points and the spacing between adjacent groups of warp yarns giving a cover factor of at least 70% and a weight of less than 100 grams per square metre.

The fourth aspect may comprise any one or more of the features described for the third aspect of the present invention.

In a fifth aspect, the present invention consists in a netting material comprising a first netting material in a lengthwise centre region and a netting material according to the third and/or the fourth aspect of the present invention in a region on either side of the first netting material, wherein the first netting material has a cover factor less than 50%.

In some embodiments, the lengthwise centre region has a width of about 300 mm to 3 m, or about 500 mm to 2 m, or about 1 m to 1.5 m, or about 1 m.

In some embodiments, the first netting is a knitted netting material knitted from monofilaments.

Air Permeability

In a sixth aspect, the present invention consists in a netting material having a length dimension and a width dimension smaller, or much smaller, than the length dimension, the width of the netting material being at least 1 m and which has a construction profile across the width of the netting, wherein in the construction profile, one or more construction elements varies across the width of the netting, a construction element in a first region of at least 2 cm, or at least 4 cm, width of the netting being different to the construction element in a second region of at least 40 cm width of the netting, the construction element being one of a yarn thickness, a yarn width, a netting aperture size, a netting construction pattern and a netting cover factor and wherein the construction profile comprises varying permeability to air, and wherein the first region of at least 2 cm, or at least 4 cm, width is centrally located and of higher permeability to air than the second region, and wherein the second region is a region located with at least 20 cm of its width on opposing sides of the first region.

In some embodiments, the aperture size of the first region is of a size or shape small enough to prevent bee passage through the netting, or is smaller than 6 mm, or is smaller than 5 mm, or is smaller than 4 mm, or where the aperture size and shape is such that the maximum dimension that may be measured across the aperture is smaller than 6 mm, or is smaller than 5 mm, or is smaller than 4 mm.

In some embodiments, the width of the first region is between a lower value of 4 cm and an upper value being 20% of the width of the material.

In some embodiments, the width of the material is between 2 and 4 m, and the width of the first region is between 4 cm and 50 cm.

In some embodiments, the material has a length at least 10 or 20 times its width.

In some embodiments, the width of the material is at least 2 m, or at least 3 m, or at least 4 m, or at least 5 m, or at least 6 m, or at least 7 m, or at least 8 m, or at least 10 m, or at least 15 m, or at least 20 m, or at least 25 m.

In some embodiments, the construction profile exists in a region of the width of the material that excludes the outermost 40 cm, or the outermost 50 cm, or the outermost 60 cm, or the outermost 70 cm, or the outer most 80 cm, or the outer most 100 cm of width of each side the width of the material.

In some embodiments, the permeability to air of the first region is at least 1.1, or 1.5, or 2, or 3, 4, or 6 times larger than the permeability to air of the second region.

In some embodiments, the netting material comprises different sized apertures to comprise the varying air permeability, the first region of the netting material comprising apertures of a first aperture size and the second region of the netting material comprising apertures of a second aperture size, the first aperture size being larger than the second aperture size.

In some embodiments, the first aperture size is between 1.1 and 8, or between 1.1 and 5, or between 1.1 and 4, or between 1.1 and 3, or between 1.1 and 2, or between 1.1 and 1.5, times larger than the second aperture size.

In some embodiments, the first aperture size is between 2 and 20 mm, or between 18 and 40 mm.

In some embodiments, the aperture size of the second region is between 2 and 20 mm.

In some embodiments, the netting of the second region is formed from yarns which transmit less than 15% of solar radiation on average across UV, visible and very near infrared ranges.

In some embodiments, the netting of the second region is formed from yarns which transmit less than 25% of solar radiation on average across UV, visible and very near infrared ranges and which reflect at least 5% of solar radiation on average across UV, visible and very near infrared ranges.

In some embodiments, the netting of the second region is formed of yarns which transmit less than 30%, or less than 25%, of solar radiation across the wavelength range 280 to 320 nm, or 320 to 400 nm, or 280 to 400 nm, or 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm.

In some embodiments, the netting of the second region is formed of yarns which reflect more than 5% of solar radiation across the wavelength range 280 to 320 nm, or 320 to 400 nm, or 280 to 400 nm, 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm.

In some embodiments, the netting material of the second region is formed of yarns comprising between 0.2% and 15% of a white pigment that reflects solar radiation in the wavelength range 700 to 2500 nm.

In some embodiments, the netting of the first region is formed of yarns which comprise no pigment.

In some embodiments, the netting of the first region is formed of yarns comprising an UV absorbing additive.

In some embodiments, the UV absorbing additive is substantially transparent.

In some embodiments, the netting of the first region is formed from yarns which reflect at least 5% of solar radiation on average across UV, visible and very near infrared ranges.

In some embodiments, the yarns of the first region comprise at least 0.2% by weight of a white pigment.

In some embodiments, the yarns of the second region comprise between 0.2% and 30% by weight of a white pigment.

In some embodiments, in addition to the multiple yarns of which the netting is formed, the netting also comprises multiple yarns extending through the netting (as a 'lay-in') woven through the apertures of the netting and/or around intersections of the multiple yarns of which the netting is formed, and wherein the netting comprises a greater amount of said lay-in in the second region of the netting.

In some embodiments, the netting comprises no lay-in in the first region.

In some embodiments, in the second region the lay-in is threaded though every second row, or every third, row, or every fourth row, or every fifth row, or any combination thereof, of the knitting.

In a seventh aspect, the present invention consists in a netting material comprising repeating units of the netting material according to any one or more of the previous aspects of the present invention.

In an eighth aspect, the present invention consists in a netting material having a length at least 10 or 20 times greater than a width, having a first shade factor in a first lengthwise extending section of the material which is greater than a second shade factor or factors in second and third lengthwise extending sections of the material on either side of the first lengthwise extending section of the material.

In a ninth aspect, the present invention consists in a netting material having a length at least 10 or 20 times greater than a width, having a first heat reflectivity in a first lengthwise extending section of the material which is greater than a second heat reflectivity or factors in second and third lengthwise extending sections of the material on either side of the first lengthwise extending section of the material.

The netting material according to any of the above aspects may be a knitted netting material.

Method of Use

In a tenth aspect, the present invention consists in a method of maintaining a low air temperature about a plant or row of plants comprising locating a netting material according to the sixth aspect of the present invention, to substantially cover the plant but leaving a gap of between 10 cm and 3 m, or between 20 cm and 2 m, or between 30 cm and 1 m, or between 10 cm and 50 cm between the edge of the netting material and the ground.

In an eleventh aspect, the present invention consists in a method of protecting a crop comprising draping or installing a netting material according to the third and/or the fourth aspect of the present invention over a row or trees or plants with the lengthwise centre region of the netting located at the top of the row of trees or plants and the side regions extending at least partly down each side of the row of trees.

In some embodiments, the side regions extend substantially to the ground from which the crop grows.

In some embodiments, the side regions do not extend fully to the ground from which the crop grows so that there is a gap between edges of the netting material and the ground.

In some embodiments, the gap is between about 30 cm and 1.5 m.

In a twelfth aspect, the present invention consists in a method of protecting a crop comprising installing a netting material according to any one of the first to ninth aspects of the present invention over said crop.

In a thirteenth aspect, the present invention consists in a method of providing a more uniform heat environment across both sides of a row of plants located beneath the netting comprising installing above or over said plants a netting material according to embodiments of the first aspect of the present invention comprising a heat reflectivity profile such that said region or regions of higher heat reflectivity are located on the side of the row that receives the most sun exposure, or the most afternoon sun exposure.

In a fourteenth aspect, the present invention consists in a method of protecting a crop, said crop comprising a row or rows of plants arranged in an orientation that is more north-south than east-west, said method comprising installing a netting according to embodiments of the first aspect of the present invention comprising yarns having different heat reflectivity (a heat reflectivity profile) and/or yarns having different solar radiation reflectivity (a solar radiation reflectivity profile) over the crop such that the first region is located either on the west side of the plants, or such that the first region is located above the plants.

In a fifteenth aspect, the present invention consists in a method of protecting a crop, comprising draping or installing a netting over a crop of plants, said netting material positioned and having a construction profile that varies to account for the needs of the plant or fruit beneath the netting in relation to the daily movement of the sun.

In some embodiments, the plants are arranged in rows and the construction profile varies across the width of the netting.

In one aspect, the present invention may broadly consist in a netting material having a length dimension and a width dimension much smaller than the length dimension, the width of the netting material being at least 1 m and which has a construction profile across the width of the netting, wherein in the construction profile, one or more construction elements varies across the width of the netting, a construction element in a first region of at least 20 cm width of the netting being different to the construction element in a second region of at least 20 cm width of the netting, the construction element being one of a yarn thickness, a yarn width, a yarn transmittance, a yarn pigmentation level, a yarn reflectance, and a netting aperture size.

In some embodiments the construction profile provides a shade factor profile across the width of the netting, wherein in the shade factor profile, the shade factor varies across the width of the netting, the shade factor in the first region of the netting being higher than the shade factor in the second region of the netting.

In some embodiments the netting has a shade factor which is substantially uniform along the length of the netting.

The netting material having increased shade factor in some regions of the netting material may find advantageous use, as, for example, netting to cover orchards in areas of excessive sunlight or at times of excessive sunlight. The higher shade factor portions of the netting may be positioned over the top of the plants to shade the covered plants from vertical or near vertical sun, while the lower shade factor portions of the netting may be positioned down the sides of the plant where the intensity of the incident sunlight is lower. Thus the intensity of sunlight on different parts of the plant may be more evenly distributed than in the absence of the netting, or in the presence of a uniform netting.

Netting having a uniform character, while reducing the intensity of overhead light and therefore protecting fruit or leaves from sunburn or excessive sunlight, may reduce the incidence of sunlight along the sides of the plants more than desired. This is exacerbated by the narrow angle of incidence of the light onto the vertically hanging curtains of netting material at the side of the plant, which increases the effective shade factor compared with light that is incident normal to the net.

Netting of the present invention may ameliorate this to at least to a degree, by decreasing the shade factor in some areas of the netting.

In some embodiments the construction profile comprises different thickness yarns, the first region of the netting material comprising a first yarn and the second region comprising a second yarn, the first yarn being thicker than the second yarn.

In some embodiments a third region of the netting comprises a third yarn and the second yarn is thicker than the third yarn.

This netting construction may serve to provide a varying shade factor across the width of the netting, useful for the reasons set forth above. Alternatively, the heavier yarns may serve to provide a stronger netting material in the regions which typically overlay upper portions of a netted row of plants, where the material is more likely to become entangled with parts of the plants.

In some embodiments the construction profile comprises different width yarns, the first region of the netting material comprising a first yarn and the second region comprising a second yarn, the first yarn being wider than the second yarn.

In some embodiments a third region of the netting comprises a third yarn and the second yarn is wider than the third yarn.

This netting construction may serve to provide varying shade factor across the width of the netting, useful for the reasons set forth above. Alternatively, the wider yarns may serve to provide a stronger netting material in the regions which typically coincide with upper portions of a netted row of plants, where the material is more likely to become entangled with parts of the plants, or to provide strength in areas that are attached to structures to hold the netting over plants.

In some embodiments the construction profile comprises yarns having different solar radiation transmission properties, the first region of the netting material comprising a first yarn and the second region comprising a second yarn, the first yarn having a lower solar radiation transmittance than the second yarn.

In some embodiments a third region of the netting material comprises a third yarn, and the second yarn having a lower solar radiation transmittance than the third yarn.

In some embodiments the netting is formed from pigmented yarn, and the construction profile comprise different pigmentation, the first region of the netting material comprising a first yarn and the second region comprising a second yarn, the first yarn comprising a higher level of pigmentation or a different pigmentation than the second yarn.

In some embodiments a third width region of the netting comprises a third yarn, and the second yarn comprising a higher level of pigmentation or a different pigmentation than the third yarn.

For example, netting material comprising a uniform pigmentation across the width may be coloured in a colouring process to produce netting material comprising a region with a higher amount of pigmentation and a region with a lower amount of pigmentation. Alternatively, yarns of differing amounts of pigmentation may be used to knit or weave the netting comprising a region with a higher amount of pigmentation and a region with a lower amount of pigmentation.

In some embodiments the construction profile comprises yarns having different solar radiation reflectivity, the first region of the netting material comprising a first yarn and the second region comprising a second yarn, the first yarn being more reflective of solar radiation than the second yarn.

In some embodiments a third region of the netting material comprises a third yarn, and the second yarn being more reflective of solar radiation than the third yarn.

In some embodiments the construction profile comprises different sized apertures, the first region of the netting material comprising a first aperture size and the second region of the netting material comprising a second aperture size, the second aperture size being larger than the first aperture size.

In some embodiments a third region of the netting material comprises a third aperture size, and the third aperture size being larger than the second aperture size.

This netting construction may serve to provide varying shade factor across the width of the netting, useful for the reasons set forth above. Alternatively, the smaller apertures may serve to provide enhanced protection from hail, frost or sunburn on the more heavily impacted upper portions of a netted row of plants.

In some embodiments, thicker or wider yarns, or tighter knit or weave may be provided in combination with each other and/or in combination with varying pigmentation. In some embodiments this could further enhance the variation in shade factor between regions of the netting. Alternatively, thicker or wider yarns or a tighter weave or knit may be provided with a reduced amount of pigment. Stated differently, thinner or narrower yarns or a looser weave or knit may be provided with a higher level of pigmentation. According to such embodiments the netting material with improved hail resistance or strength in some regions compared to other regions may be provided while maintaining a more uniform light transmission across the width of the netting material.

For example, in some embodiments the construction profile comprises different thickness yarns with different pigmentation, a first region of the netting material comprising a first yarn and a second region comprising a second yarn, the first yarn being thicker than the second yarn, and the second yarn comprising a higher pigmentation level than the first yarn.

In some embodiments the construction profile comprises different width yarns with different pigmentation, the first region of the netting material comprising a first yarn and the second region comprising a second yarn, the first yarn being wider than the second yarn, and the second yarn comprising a higher pigmentation level than the first yarn.

In some embodiments the construction profile comprises different sized apertures and difference pigmentation, the first region of the netting material constructed from a first yarn to comprise a first aperture size and the second region of the netting material constructed from a second yarn to comprise second aperture size, the second aperture size being larger than the first aperture size and the second yarn having a higher pigmentation level than the first yarn.

According to another aspect the invention may broadly be said to consist in a netting material which, when draped over a row or rows of plants to cover the top of the row of plants and down at least a pair of opposite sides of the row of plants procures a more even distribution of incident sunlight on the plant than without the netting material.

According to another aspect the invention may broadly be said to consist in a netting material which, when draped over a row or rows of plants to cover the top of the row of plants and down at least a pair of opposite sides of the row of plants procures a more even distribution of incident sunlight on the plant than would a similar netting material having a uniform construction profile across the width of the netting.

According to another aspect the invention may broadly be said to consist in a netting material which is of a knitted mesh construction, knitted such that at yarn intersections in the netting multiple yarns of which the netting is formed are knitted around each other to define the netting mesh apertures so that the netting is stretchable in multiple directions, and wherein connecting yarn portions between said yarn intersections extend substantially linearly between intersections, and wherein at least one of the multiple yarns of which the netting is formed comprises a tape, and/or in addition to the multiple yarns of which the netting is formed (whether comprising a tape as above or otherwise) the netting also comprises multiple yarns or tapes extending through the netting (as a 'lay-in') woven through the mesh apertures and/or around intersections of the multiple yarns of which the netting is formed, and wherein the netting comprises a greater amount of said tape or said lay-in in at least one of a first region and a second region of the netting than in the other one of said first and second regions.

In some embodiments the netting comprises a greater amount of said tape or said lay-in in said second region than in said first region.

In some embodiments the first region is a longitudinal central region of the netting material.

In some embodiments the netting comprises said tape or said lay-in in at least one of a first region and a second region of the netting and no said tape or lay-in in the other one of said first and second regions.

In some embodiments the netting comprises a greater amount of said tape or said lay-in in at least one of the first region, the second region or a third region of the netting than in another of said first, second, or third regions.

In some embodiments the netting comprises a greater amount of said tape or said lay-in in said first region than in each of said second and third regions.

In some embodiments the netting comprises a greater amount of said tape or said lay-in in said first region, a lesser amount of tape in said second region than in said first region, and a lesser again amount of tape in said third region than in said second region.

According to another aspect the invention may broadly be said to consist in a netting material having a length dimension and a width dimension much smaller than the length dimension comprising:

weft tapes, and groups of warp yarns spaced apart across the width of the netting material, the groups of warp yarns and the weft tapes woven together in a leno weave, the warp yarns in each group of warp yarns crossing at a cross-over point between adjacent weft tapes, wherein the distance between adjacent cross over points is less than the width of the weft tapes so that the weft tapes are folded at each group of warp yarns, and the spacing between adjacent groups of warp yarns sufficient to allow the weft tapes to substantially unfold so that adjacent weft tapes overlap or abut between adjacent groups of warp yarns, and the netting has a construction profile which varies across the width of the netting.

In some embodiments the construction profile in a first region of at least 20 cm width of the netting is different to the construction profile in a second region of at least 20 cm width of the netting.

According to another aspect the invention may broadly be said to consist in a netting material having a length dimension and a width dimension much smaller than the length dimension comprising:

weft tapes, and groups of warp yarns spaced apart across the width of the netting material, the groups of warp yarns and the weft tapes woven together in a leno weave, the warp yarns in each group of warp yarns crossing at a cross-over point between adjacent weft tapes, wherein the width of the weft tapes, the distance between adjacent cross over points and the spacing between adjacent groups of warp yarns giving a cover factor of at least 70% and a weight of less than 100 grams per square metre.

In some embodiments the warp yarns are monofilaments.

In some embodiments the distance between adjacent cross over points is less than the width of the weft tapes so that the weft tapes are folded at each group of warp yarns, and the spacing between adjacent groups of warp yarns sufficient to allow the weft tapes to substantially unfold so that adjacent weft tapes overlap or abut between adjacent groups of warp yarns.

In some embodiments the width of the tape is at least twice the distance between adjacent cross over points.

In some embodiments the distance between adjacent groups of warp yarns is at least three times, or five times, or ten times, or fifteen times, or twenty times, the width of the weft tapes.

In some embodiments the warps yarns are woven tightly around the weft tapes so that the weft tapes are folded at each group of warp yarns, and the spacing between adjacent groups of warp yarns sufficient to allow the weft tapes to substantially unfold so that adjacent weft tapes overlap or abut between adjacent groups of warp yarns.

In some embodiments the netting material has a cover factor of at least 5%, or 10%, or 20%, or 30%, or 40%, or 60%, or 85%, or 90% or 95%, or about 95%, or between 5% and 40%, or between 40% and 95%, or between 85% to 95%.

In some embodiments the netting material has a weight of less than 100 gsm, or 95 gsm, or 90 gsm, or 85 gsm, or 80 gsm, or 75 gsm, or 70 gsm, or 65 gsm, or 60 gsm, or about 80 gsm, or about 75 gsm, or about 70 gsm, or about 65 gsm, or about 60 gsm.

In some embodiments the warp yarns are monofilaments.

In some embodiments the warp yarns are multifilaments, or a combination of multifilaments and/or monofilaments.

In some embodiments each group of warp yarns comprises two or more warp yarns.

In some embodiments each group of warp yarns is a pair of warp yarns.

In some embodiments the spacing between the groups of warp yarns is varied across the width of the netting material to provide a varying cover factor across the netting material.

In some embodiments the spacing between adjacent groups of warp yarns is greater than a minimum spacing, the minimum spacing being defined by a minimum cover factor, wherein increasing the spacing between adjacent groups of warp yarns above the minimum spacing increases the cover factor and decreasing the spacing between adjacent groups of warp yarns below the minimum spacing increases the cover factor.

According to another aspect the invention may broadly be said to consist in a netting material comprising a first netting material in a lengthwise centre region and a leno woven netting material as described in any one or more of the above statements, the leno woven netting material in a region on either side of the first netting material, wherein the first netting material has a cover factor less than 50%.

In some embodiments the lengthwise centre portion has a width of about 300 mm to 3 m, or about 500 mm to 2 m, or about 1 m to 1.5 m, or about 1 m.

In some embodiments the first netting is a knitted netting material knitted from monofilaments.

According to another aspect the invention may broadly be said to consist in a method of protecting a crop comprising draping or installing a netting material as defined in any one of the above statements over a row of trees or plants with the lengthwise centre portion of the netting located at the top of the row of trees or plants and the side portions extending at least partly down each side of the row of trees.

In some embodiments the side portions extend substantially to the ground from which the trees or plants grow.

In some embodiments the side regions do not extend fully to the ground from which the trees or plants grow so that there is a gap between edges of the netting material and the ground.

In some embodiments wherein the gap is about 1 m.

In some embodiments the netting is knitted or woven from a yarn formed from a resin comprising at least one pigment The at least one pigment may be white. For example $TiO_2$ (titanium dioxide or 'titanium white'), or high reflecting $TiO_2$, and with or without colour pigments.

The yarn may reflect at least 30% solar radiation on average across the UV (wavelength about 280-400 nm), visible (wavelength about 400-700 nm) and very near infrared (wavelength about 700-800 nm) ranges. The first yarn may transmit at least 10% on average of solar radiation across the wavelength range about 800-2500 nm.

The yarn may absorb solar radiation when the material is placed over or adjacent plants. For example, the yarn may be formed from a resin comprising carbon black pigments at a level of 0.1 to 3% by weight.

In some embodiments the first yarn reflects more solar radiation than it transmits and absorbs in the UV, visible, and very near infrared ranges.

In some embodiments the yarn is formed from a resin comprising more than 4% by weight of a white pigment for a UV reflecting pigment. TiO2 can be added in levels at 0.2% to 6%.

In some embodiment the yarn is formed from a resin comprising more than 8% by weight of a white pigment.

In certain embodiments the yarn comprises a resin and at least 0.2%, 1%, 3%, 5%, 10%, at least 12% or at least 14%, or at least 16%, or at least 18% or 20% or 25% or 30% by weight of a white pigment.

In certain embodiments the white pigment may be present in the form of particles of size 0.02-5 microns or 0.1-3 microns.

Preferably the yarn is formed from a resin incorporating at least one white pigment, which resin has been formed by mixing a masterbatch consisting essentially of 10 to 90% by weight of white pigment and a first polymer, with a second polymer such that the masterbatch comprises between about 2 to 50% by weight of the total mixture.

In broad terms, in another aspect, the invention comprises a method of treating a plant or fruit or vegetables thereon which comprises providing over and/or adjacent the plant as bird netting, insect netting, shade netting, windbreak netting, or hail protection netting a netting material as set forth above.

By "netting" is meant material having a cover factor (as herein defined) of up to 98% but typically less than 95%, 90%, 80%, 70%, 60%, 50%, 40%, 30%, 20%, 10% or 5%.

The term "netting" as used herein includes woven materials, knitted materials and non-woven materials. The term includes coated and uncoated materials. The term also includes extruded netting, comprising crossed strands heat welded or chemically bonded together. The term also includes knitted products such as nettings comprised of pillars knitted in the warp direction held together with yarns that cross back and forth between those pillars (i.e. pillar knitted fabric), and nettings that have square hasped apertures, nettings that have diamond shaped apertures, and nettings that hexagonal shaped apertures. It further includes nettings that comprise yarn (including tape) lay-ins where the yarn (or tape) is not knitted or looped or is knotted and looped into the fabric. By "cover factor" is meant the percentage of the overall area of the netting material which comprises knitted, woven, or non-woven monofilament, yarn, or tape or a combination, forming the netting itself, judged from perpendicular to the plane of the netting when laid out flat, as opposed to air space in between the netting. Thus if a netting has a cover factor of 30% then the air space through the netting would be 70% of the total area of the netting.

Preferably the netting is knitted from multiple yarns all extending along a length of the netting. In a preferred form each yarn follows an approximate zig-zag path along the length of the netting, with alternating yarn intersections and connecting yarn portions.

Preferably, each yarn intersection in the netting is connected to adjacent and surrounding yarn intersections by connecting yarn portions each comprising at least two yarn lengths.

Preferably the netting comprises rows of the yarn intersections adjacent to one another in a first axis or direction across the netting, typically across a machine or manufacturing axis or direction of the netting. Preferably in immediately adjacent rows of yarn intersections in a second direction substantially orthogonal to said first direction, typically a machine or manufacturing axis or direction of the netting, the yarn intersections of the adjacent rows are staggered relative to one another.

Preferably the width of the netting is substantially uniform along the length of the netting.

In one form the netting is formed from elastic yarn. In another form, the netting is formed from non-elastic yarn. In another form the netting is formed from yarn that has some elongation when stretched.

In some embodiments the yarn may be any of the following: black, white, white (UV or non-UV reflecting white) in colour, coloured, formed from a non-pigmented material, formed from plastic, or formed from a range of polymers.

In one form the netting is formed by twin, triple, or multiple or single monofilament fibre yarns. In one form the yarn is monofilament. Preferably, the monofilament has a substantially circular cross-section. More preferably the yarn has diameter in the range of approximately 0.1 mm to 1 mm, even more preferably 0.2 mm to 0.8 mm, and even more preferably 0.2 mm to 0.4 mm, and more preferably 0.2 to 0.3 mm and most preferably 0.15 mm to 0.25 mm In denier, the yarn is preferably in the range of approximately 50 to 1000 denier, more preferably 50 to 700 denier, even more preferably 100 to 500 denier, even more preferably 100 to 300 denier, even more preferably 150 to 250 denier or even more preferably 200 to 300 denier.

In some embodiments, the netting is formed by a yarn as described immediately above in the warp direction (for example a leno weave), and tapes in the weft direction (or vise versa). In some embodiments the width of the weft tapes is between 1 and 5 mm, 5 and 10 mm. In other embodiments width of the weft tapes is between 1 and 30 mm, 1 and 25 mm, 1 and 20 mm, 1 and 15 mm, 1 and 10 mm, 1 and 5 mm, or 1 and 3 mm. In some embodiments the thickness of the weft tapes is about 25 to 75 microns. In such embodiments the denier of the warp yarns is preferably 50 to 1000, or 100 to 700, or 400 to 600, or about 500.

Typically the netting is machine-knitted for example on a warp knitting machine or a weft insertion warp knitting machine.

Preferably the weight of the netting is in the range of approximately 10 to 200 grams per $m^2$. In alternative embodiments, the weight of the netting is in the range of approximately 15 to 80 grams per $m^2$, or 20 to 60 grams per $m^2$, or 20 to 40 grams per $m^2$, or 30 to 40 grams per $m^2$, or 25 to 35 grams per $m^2$.

In some embodiments the yarn may incorporate a compound or compounds added to cause or increase the extent to which the material reflects and/or absorbs radiation from the earth (terrestrial (long wave or infrared) radiation). Thus when the netting is placed over plants it will assist in retaining heat beneath the material, which may be desirable for some plants or applications.

In some embodiments the yarn may incorporate a compound or compounds added to cause or increase the extent to which the netting allows transmission and/or absorption of radiation from the earth (terrestrial (long wave or infrared) radiation). Thus when the netting is placed over or adjacent to plants it will assist in releasing the heat beneath the netting, which may be desirable for some plants or applications.

In other embodiments the yarn may incorporate a compound or compounds added to cause or increase the extent to which the netting reflects and/or absorbs solar radiation. Thus when the netting is placed over plants it will assist in cooling beneath the material, which may be desirable for some plants or applications.

In other embodiments the yarn may incorporate a compound or compounds added to cause or increase the extent to which the netting allows transmission and/or absorption of solar radiation. Thus when the material is placed over plants it will assist in increasing the heat beneath the material, which may be desirable for some plants or applications.

In a further aspect the invention broadly consists in a method of protecting plants comprising the step of at least partially covering a plant or row of plants with a crop protection netting of a form as set forth above.

In one form the step of covering the plant(s) comprises securing the netting over the entirety of the plant(s) and securing or fixing it to the ground surface surrounding the plants.

In another form the step of covering the plant(s) comprises suspending or supporting the netting over the top of the plant(s) as a canopy using a supporting structure or framework.

In another form the step of covering the plant(s) comprises securing the netting over the plant(s) to cover the top of the plants and go part way down the side of the plants.

The term "yarn" as used in this specification, and grammatical variations thereof, unless the context suggests otherwise is intended to mean multi or mono filament yarn, threads or fibres. The term "yarn" unless the context suggests otherwise, is intended to include longitudinally extending single filament elements having circular or oval or similar, or three or four sides when viewed in cross-section, such as a rectangular or square cross-section, also longitudinally extending elements having a multisided cross-section such as a triangular or hexagonal cross-section for example, and also longitudinally extending elements having a circular or oval or similar cross-section (sometimes referred to hereafter as monofilament). For the avoidance of any doubt, the term "yarn" includes tape.

The yarns may be formed from any suitable polyolefin (including resins) such as polyethylene or polypropylene, for example, or a mixture thereof, or an ethylene alpha-olefin, or a polyester, or a biopolymer, or a blend of any of the foregoing. Certain plastics are particularly useful when present as minor or major components. Ethylene vinyl acetate (EVA), ethylene butyl acrylate (EBA) and ethylene methyl acrylate (EMA) are useful for imparting elasticity and other properties. Polyesters and polystyrene, styrene-butadiene (SB), acrylonitrile-butadiene-styrene (ABS), styrene-acrylonitrile (SAN), polyethylene terephthalate (PET), polymethylmethacrylate (PMMA) and polycarbonate. Starch and other plant polymers are useful to increase biodegradability. Alternatively, to the extent compatible with the required transparency/opacity the yarns may comprise in part or whole of paper, wood or cellulose fibre, starch based polymers, casein, latex or in any combination of the above and/or with petroleum derived plastic polymers to the extent compatible according to the required transparency/opacity. The polymer or polymer blend may incorporate agents such as one or more pigments, UV stabilisers, or processing aids.

The term "tape" or "tapes" is intended to include longitudinally extending single filament elements having four sides when viewed in cross-section, such as a rectangular or square cross-section, also longitudinally extending elements having a multisided cross-section such as a triangular or hexagonal cross-section for example, and also longitudinally extending elements having an oval or similar cross-section. With reference to a woven sheet material the term "tape" is intended to mean a longitudinal element woven into the sheet material, for example a warp element extending longitudinally in the sheet material or a weft element extending across the sheet material.

The phrase "aperture size" as used in this specification, unless the context suggests otherwise, is intended to refer to the diameter of the largest circle that can be scribed within an aperture in a mesh when the mesh is taut but not stretched in both a lateral and a longitudinal direction. For example, for a square aperture, the size of the aperture is the length of a side, and for a rectangular aperture, the aperture size is the length of the shorter side of the aperture. So the aperture size of a square aperture with 5 mm sides is 5 mm, and the aperture size of a 5 mm by 10 mm aperture is also 5 mm. An equilateral triangle with sides of approximately 8.7 mm and the aperture size of a hexagonal aperture with sides of approximately 2.9 mm are also examples of apertures having a size of 5 mm. An aperture may be irregularly shaped, the above regularly shaped apertures are provided as examples only. When the phrase "aperture size", or grammatical variations of the phrase, are used with respect to a region of netting material, the phase refers to the average aperture size of that region, unless the context otherwise requires.

In some embodiments, each aperture in a netting material according to the invention generally has a relatively short perimeter relative to its area such that each aperture has a small ratio of the square of the length of the perimeter of the aperture to the area of the aperture. For example, the lowest possible ratio is exhibited by a circular aperture at approximately 12.6:1. A square has a ratio of approximately 16:1, and a two-by-one rectangle has a ratio 18:1. More elongated apertures have higher ratios, for example a five-by-one rectangle has a ratio of the square of the length of the perimeter to the area of 29:1. A netting material according to some embodiments of the present invention has a ratio of the length of the square of the perimeter to the area of the aperture of typically less than 25.

The term "reflective", and grammatical variations thereof, as used in this specification means that the netting filament or yarn themselves, excluding the air spaces, is reflective of, on average, at least 10%, 20%, or 30%, or 40%, or 50% or alternatively at least 55% or alternatively at least 60% of visible light (i.e. solar radiation across the wavelength range 400 to 700 nm) or of solar radiation on at least one side of the netting, unless the context otherwise requires. In one embodiment of a reflective netting, the yarn may reflect at least 40% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm. The netting may reflect more solar radiation than it transmits and absorbs in the UV, visible, and very near infrared ranges. The material may transmit at least 15% or at least 20% of solar radiation on average in the wavelength range about 800-2500 nm. Some or all of a reflective yarn may be formed from a resin comprising a white pigment, which resin has been formed by mixing a masterbatch consisting essentially of 10 to 90% by weight of a white pigment. "Reflectance", or "reflective", or other grammatical variations thereof, as used herein includes diffuse reflectance, unless the context otherwise requires. The term may be used with respect to specific wavelength ranges. Where "reflective", or grammatical variations thereof, is used with reference to a specified wavelength range, it means the percentage of solar radiation, on average, that is reflected across that range from the yarns which make up the material, i.e. excluding the air spaces between the material.

"Transmittance", and grammatical variations thereof, as used herein includes diffuse transmittance, unless the context otherwise requires. Where "transmittance", or grammatical variations thereof, is used with reference to a specified wavelength range, it means the percentage of solar radiation, on average, that is transmitted across that range from the yarns that make up the material, i.e. excluding the air spaces between the material.

The term "absorbance" as used in this specification refers to the amount of solar radiation, on average, across a particular wavelength range incident upon a yarn, excluding the air spaces in the netting, that is not reflected or transmitted by the yarn. Where "absorbance" is used with reference to a specified wavelength range, it means the percentage of solar radiation, on average, that is absorbed across that range by the yarns which make up the material, i.e. excluding the air spaces between the material.

The term "shade factor" means the percentage of solar radiation across a particular wavelength range incident on a netting (or region thereof), as a whole, from a direction perpendicular to the plane of the netting, when the netting is a spread flat, which is stopped (i.e. due to reflection or absorption) by the netting from reaching the surface under the netting. Thus if a netting region (or region thereof) has a shade factor of 20% for the wavelength range 280 to 400 nm, then 80% of the solar radiation across the 280 to 400 nm incident on that region reaches the underlying surface. The term may be used specifically with reference to ultra violet solar radiation (280 to 400 nm), or visible solar radiation (400 to 700 nm), or infrared solar radiation of wavelength 700 to 2500 nm, or wavelength ranges within or combining each of those ranges.

Differing shade factor across regions may be achieved through use of means including, but not limited to, differing yarn thickness, differing yarn width, differing yarn reflectance/absorbance/transmittance, differing pigment type, differing pigment concentration, differing aperture size, differing knit or weave pattern or density, use of lay-ins, or differing cover factor.

Unless stated otherwise, the term "heat reflectivity" means the percentage of solar radiation that is reflected by the netting (or region of a netting) as a whole, or by the yarns making up the netting. The term "heat reflectivity" may be used with reference to specific wavelength ranges, such as 700 to 800 nm, or 700 to 900 nm, or 700 to 1000 nm, or 700 to 1200 nm, or 700 to 1500 nm, or 700 to 2000 nm, or 700 to 2500 nm, or 1000 to 1500 nm, or 1000 to 2000 nm, or 1000 to 2500 nm, or 1500 to 2000 nm, or 2000 to 2500 nm. Where "heat reflectivity" is used with reference to a specified range, it means the percentage of solar radiation, on average, across that wavelength range. Differing heat reflectivity across regions may be achieved through use of means including, but not limited to, differing yarn thickness, differing yarn width, differing yarn reflectance, differing pigment type, differing pigment concentration, differing aperture size, differing knit or weave pattern or density, use of lay-ins, or differing cover factor.

The term "centrally located" as used in this specification in reference to netting material means located either at or near to a central region of the material, or located (or mostly located) otherwise than at the peripheral edge of the material, unless the context requires otherwise. In the context of a rectangular piece of netting material that has a length many times its width, a "centrally located" region will generally be one that is located either at or near to the centre across the material's width or located otherwise than at a peripheral region at the extremities of the materials width, and extending at least in part longitudinally along the length of the material.

When the term "air permeability" is used herein with reference to comparing two different regions, the term is used with respect to comparing permeability of areas the same size in each region, unless the context otherwise requires.

The term "UV range", or "ultra-violet light", or grammatical variations thereof, as used herein means solar radiation in the wavelength range 280-400 nm. The term "visible range" or "visible light", or grammatical variations thereof, as used herein means solar radiation in the wavelength range 400-700 nm. The term "very near infrared range", or grammatical variations thereof, as used herein means solar radiation in the wavelength range 700-800 nm.

The term "different colour" as used herein, or grammatical variations thereof, includes different shades, tones, tints and hues, unless the context requires otherwise. It also includes different transparencies or translucencies.

The term "colour" as used herein includes colourless, unless the context requires otherwise.

The term "pigment", and grammatical variations thereof, as used herein includes dye, unless the context requires otherwise. Similarly, terms such as "differing pigmentation" and similar such references to pigment, include differences in the amount or colour of a dye.

When a "difference in pigment", or a "difference in pigment concentration", is discussed, these terms, or grammatical equivalents thereof, include comparison of yarns without pigment (i.e. zero % pigment concentration) to yarns with pigment.

The term "thickness", and grammatical variations thereof, as used herein with respect to yarns of circular cross section refers to the cross sectional diameter of those yarns. When the term "thickness" is used with respect to a yarn having an oval or rectangular cross-section (e.g. a tape), it refers to the "height" of such a yarn when viewed in cross-section and when the yarn is lying flat. The "width" of such a yarn lying flat is referred to herein as its width.

The term "region" as used herein, for example as used in the terms "first region", "second region" or "third region", refers to a portion of the width of the material that is consistent in its makeup of a particular construction element across that portion.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The following is a description of the spectrophotometer system and measuring method used for measuring solar radiation transmittance and reflectance values across the ranges quoted in the specification unless otherwise stated. The method can be used for wavelengths within the range 220 to 2500 nm.

In this specification, diffuse transmittance and diffuse reflectance data is measured of filaments or tapes themselves of the netting material. For filaments, filaments are aligned side by side with minimal gaps between them to create a surface area large enough for a monochromatic beam to focus upon. The method of measurement is described below. Diffuse reflectance and diffuse transmittance of a region of netting material as a whole can be calculated by determining the proportion of area covered by the tapes or filaments versus that not covered by tapes or filaments.

The spectrophotometer system is based around a GSA/McPherson 2051 1 metre focal length monochromator fitted with a prism predisperser and also stray light filters. The light source is a current regulated tungsten halogen lamp. The bandwidth is adjustable up to 3 nm. The monochromatic beam from the monochromator is focused onto the sample or into the integrating sphere using off-axis parabolic mirrors. The integrating spheres are coated with pressed halon powder (PTFE powder). Halon powder is also used as a white reflectance reference material. The detector is usually a silicon photodiode connected to an electrometer amplifier and digital volt meter. The whole system is controlled using software written in LabVIEW. The detectors used can be photomultiplier tubes, silicon diodes or lead sulphide detectors.

Diffuse Reflectance

Diffuse reflectance is measured using an integrating sphere with an internal diameter of 75 mm with the sample tilted at an angle of 6° to the incident light (specular reflectance included). The reference sample is pressed halon powder and a black cone is used to correct for stray light. Up to four test samples are mounted on a pneumatic driven sample changer along with the white reference and black cone.

Diffuse Transmittance

Diffuse transmittance is measured using an integrating sphere with an internal diameter of 120 mm and coated with pressed halon powder. The sample is mounted on one port and the incident light port is at an angle of 90° around the sphere. The sphere rotates by 90° in the horizontal plane to allow the focused incident light to enter the sphere through the incident light port or the incident light to be transmitted through the sample and enter the sphere. The detector is mounted at the top of the sphere.

Absorbance

Absorbance is calculated as a back calculation from the calculated transmittance and reflectance values.

BRIEF DESCRIPTION OF THE DRAWINGS

The invention is further described by way of example with reference to the accompanying drawings in which:

FIG. 16.1 is a closer view of a small portion of a variation of the crop protection netting with extra looping than shown in FIG. 15, and in which three separate monofilament yarns or strands of the netting are shown each in a different shade.

FIGS. 17A to 17C each show the path of one of the three yarns in an individual intersection in the netting, and FIG. 17D shows enlarged an individual intersection, again with each yarn or strand shown in a different shade as in FIG. 5.

FIGS. 17.1A to 17.1C each show the path of a one of the three yarns in an individual intersection in the variation of the crop protection netting with extra looping, and FIG. 17.1D shows enlarged an individual intersection, again with each yarn or strand shown in a different shade as in FIG. 16.1.

FIG. 18.1 is another plan view of a portion of the variation of the crop protection netting of FIGS. 16.1 and 17.1.

FIG. 19.1 is a closer view of a smaller portion of the crop protection netting of the invention of FIG. 19.

FIG. 19.2 is a plan view of a portion a variant of the crop protection netting of the invention of FIGS. 19 and 19.1.

FIG. 20.1 is a closer view of a smaller portion of the crop protection netting of the invention of FIG. 20.

FIG. 26 illustrates.

FIG. 26 illustrates. The netting illustrated in FIG. 28 is similar to that illustrated in FIG. 20, but includes a lay-in through every aperture.

DETAILED DESCRIPTION OF EMBODIMENTS

A netting material suitable for providing over and/or adjacent the plant as bird netting, may be knitted, woven, or non-woven, from synthetic yarn such as monofilament or tape, or combination thereof.

In some embodiments netting of the invention may comprise apertures through the material of about 22 mm in size. In other embodiments netting of the invention may comprise apertures through the material of about 12, 15, 16, 18 or 20 mm in size. In some embodiments netting of the invention may comprise apertures through the material in the range 3 to 30 mm in size. In some embodiments the apertures are small enough to prevent the passage of bees through the material, for example the apertures may be less than 6 mm, or less than 5.0 mm or less than 4 mm, in size.

Some part of the yarn from which the netting is formed may have high transmittance (being translucent or transparent), and transmit at least 30 or 40%, more preferably at least 50% or 60% or 70% or 80% or 90% or more of UV and visible light.

Figure 3:
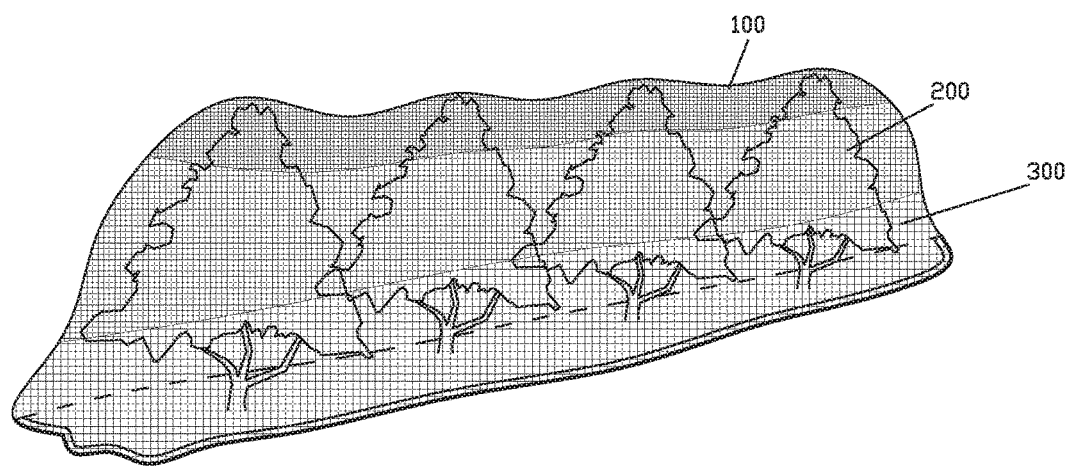
FIG. 3 is a schematic showing netting according to FIG. 1 draped over a row of trees, with regions of different shade factor being located respectively above and alongside the trees.

Typically and as illustrated in FIG. 3, the netting is draped over the plants or is supported over the plant(s) and/or as a vertical and/or angled wall or walls near the plant(s), by for example cables or wires between posts positioned along the rows of plants in a garden, field crop, orchard or vineyard, or is draped over the plant(s), as bird netting, insect netting (for repelling for example mosquitoes, or as for example bee exclusion netting). Netting may be placed near plants to protect for example annual plants, perennial plants, fruit trees, or grape vines, vegetable plants, from birds or insects.

In some embodiments, some elements of the netting may be reflective or highly reflective ie formed from reflective yarn. Thus UV and visible light incident on that yarn is reflected. A small portion of incident light hits the reflective yarns of the netting and is reflected away, but most light passes directly through the netting air space or through the yarn of the netting to the plants and fruit. Some of the light undergoes a change in direction due to reflection from the netting but nonetheless enters the netting canopy but is diffused, and hits the plants and particularly fruit or vegetables below or adjacent the netting canopy and creates an environment that is favourable for plant growth and/or fruit or vegetable development.

Figure 8:
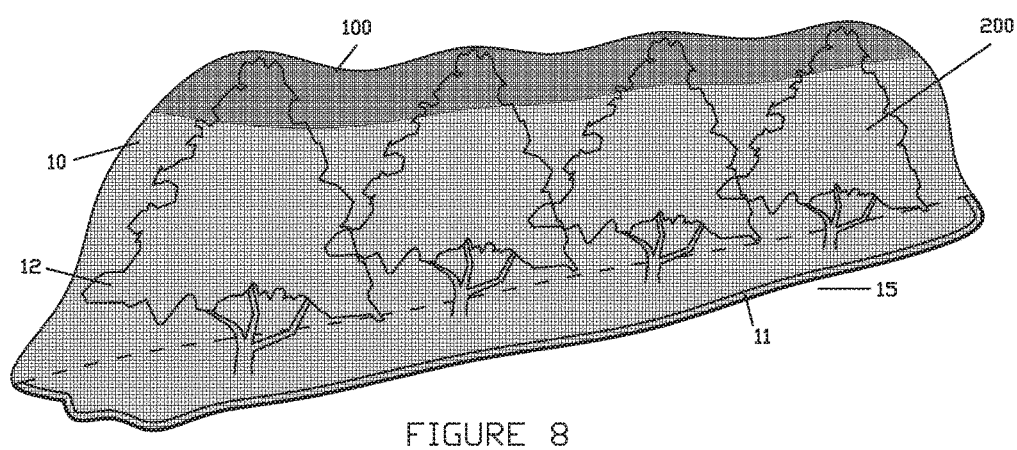
FIG. 8 is a schematic showing netting according to one embodiment of the present invention draped over a row of trees, with regions of different shade factor being located respectively above and alongside the trees.

Referring to FIGS. 3 and 8, a length of crop protection netting 10 is shown placed over a row of fruit trees 12. The netting may be manufactured in a length and width to suit typical applications or a range of lengths and/or widths. Typically the width of the netting is between about 2 and 20 metres and the length of the netting is longer. For insect exclusion typically the netting must be large enough to extend over an entire plant or row of plants as shown, and be secured, fastened or anchored at or toward the peripheral edges 11 of the netting with stakes, pegs, soil or other fixing devices to the ground 15 surrounding the periphery of the plant or plants such that bees or other insects cannot fly under the netting into the trees. Alternatively, the edges 11 of the netting may drape onto the ground and need not necessarily be secured in any way other than under its own weight. As shown in the Figures, the netting 10 may be draped over the trees such that it is in contact with and supported in place by the trees it covers.

Figure 11:
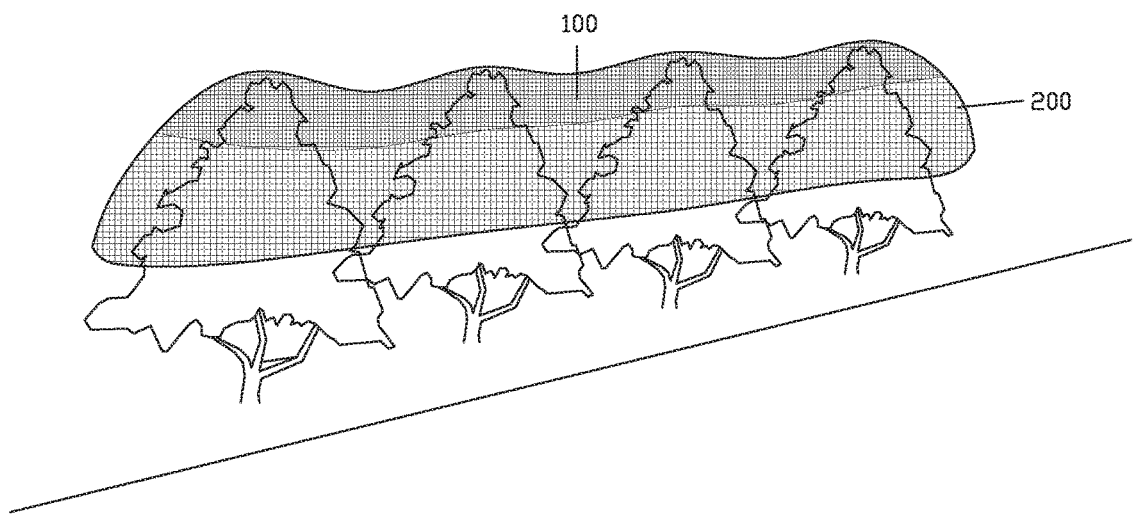
FIG. 11 is a schematic illustration showing netting according to one embodiment of the present invention draped over a row of trees, with regions of different shade factor being located respectively above and alongside the trees, the netting hanging part way down the sides of the row of trees.

In some applications, the netting is draped over the trees but does not hang down right to the ground. For example, the netting 10 drapes about half way from the top of the row of trees 12 to the ground as illustrated in FIG. 11.

Optionally edge portions of the netting may be reinforced or formed with different material to assist in fixing the netting to the ground.

The netting material has a length dimension and a width dimension smaller, or much smaller, than the length dimension. The netting may be supplied in rolls. According to embodiments of the invention, the netting has a construction profile across the width of the netting. The phrase 'construction profile' means the construction of the netting changes or varies or is different from one region of the netting to another region of the netting, across the width of the netting. For example, with reference to FIG. 1, netting 10 comprises a central region 100 comprising a relatively high density construction. The perimeter regions 300 of the netting 10 comprise a relatively low density construction. And intermediate regions 200 of the netting 10 between the perimeter regions 200 and the central region 100 comprise an intermediate density construction in comparison to the other regions. In one embodiment the aperture size of the netting in the relatively high density construction region is smaller than the aperture size of the netting in the intermediate and low density construction regions. And the aperture size of the netting in the intermediate density construction region is smaller than the aperture size in the low density construction region.

In some embodiments, the construction profile achieves a shade factor profile across the width of the netting. The phrase 'shade factor profile' means the shade factor of the netting changes or varies or is different from one region of the netting to another region of the netting across the width of the netting. This concept is illustrated graphically by the chart or graph of FIG. 2, which is a plot of shade factor profile across the width of the netting of FIG. 1. The represented netting material has a shade factor profile, where the shade factor in a second region of the netting is less than the shade factor in a first region of the netting and higher than the shade factor in a third region of the netting. Specifically, the shade factor in the central region 100 of the netting is greater than the shade factor in the intermediate portions 200 of the netting either side of the central portion, and the shade factor in the intermediate portions 200 of the netting is greater than the shade factor in the peripheral portions 300 of the netting.

FIG. 3 illustrates the netting 10 draped over a line of trees, with regions 100, 200, 300 of different shade factors indicated. An alternative embodiment is illustrated in FIG. 8 in which the shade factor profile comprises two different shade factor regions, 100, 200; the netting comprises a central portion or region of relatively high shade factor netting, and perimeter portions either side of the central region of relatively low shade factor netting. A portion of the netting of FIG. 8 is further illustrated in FIG. 9 in close up, and the shade factor profile is represented in FIG. 10. A further embodiment is illustrated in FIG. 11, in which the shade factor profile comprises two different shade factor regions, 100, 200; the netting comprises a central portion or region of relatively high shade factor netting, and perimeter portions either side of the central region of relatively low shade factor netting. The embodiment of FIG. 11 differs to the embodiment of FIG. 8 in that the width of the netting is such that in use the netting material does not hang to the ground. In use of this embodiment, the lower area of the trees is not shaded.

In a most preferred embodiment, the netting 10 has a shade factor which is substantially uniform along the length of the netting, as illustrated in the accompanying Figures. This netting is most suitable for covering a row of trees or plants. However, in an alternative embodiment the netting may be specifically adapted for covering a single tree, and have a central region of a first shade factor, and a perimeter portion completely surrounding the central portion of a second shade factor.

In one embodiment, in the shade factor profile, the average shade factor of at least one region of about 20 cm width is at least about 5% more than the average shade factor of another region of about 20 cm width. In an alternative embodiment, in the shade factor profile, the average shade factor of at least one region of about 20 cm width is at least about 10% more than the average shade factor of another region of about 20 cm width.

In some embodiments, the average shade factor of at least the first region of 20 cm width is between 105% (i.e. 1.05 times) and 400% (i.e. 4 times) the average shade factor of the second region of 20 cm width. For example, in some embodiments the average shade factor of at least the first region is between 120% (i.e. 1.2 times) and 150% (i.e. 1.5 times) the average shade factor of the second region.

In some embodiments, the average shade factor of at least a first region of 20 cm width is between 105 (i.e. 1.05 times)

to 200% (i.e. 2 times) the average shade factor of a second region of 20 cm width, and between 110% (i.e. 1.1 times) to 400% (i.e. 4 times) the average shade factor of a third region of at least 20 cm width. For example, a netting configuration like that illustrated schematically in FIGS. 1 and 3 may comprise a shade factor profile comprising a shade factor of 30% at the edge regions 300, a shade factor of 50% in the intermediate regions 200, and a shade factor of 80% in the central region 100. In one preferred embodiment, the netting comprises a shade factor of 15% at the edge regions 300, a shade factor of 20% in the intermediate regions 200, and a shade factor of 25% in the central region 100. In this preferred embodiment, the central region has a shade factor that is about 167% (i.e. 1.67 times) the shade factor of the edge region, and a shade factor that is about 133% (i.e. 1.33 times) the shade factor of the intermediate region. Stated differently, the central region has a shade factor that is 10 percentage points more than the shade factor of the edge region, and 5 percentage points more than the shade factor of the intermediate region.

Figure 9:
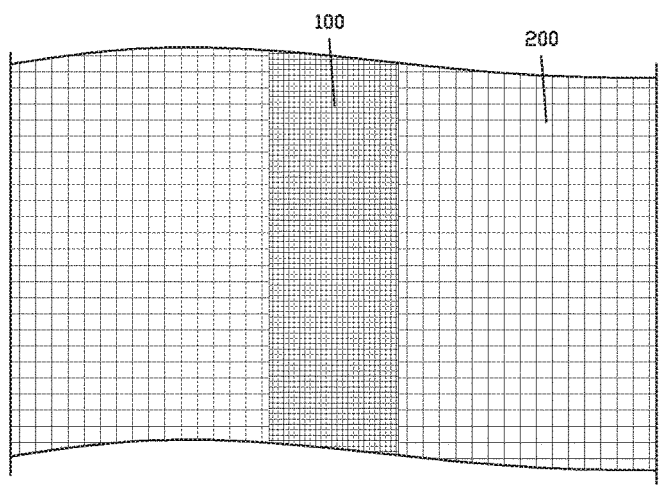
FIG. 9 is a schematic plan view of a length of netting comprising a central portion having a higher shade factor than regions either side of the central region.
Figure 10:
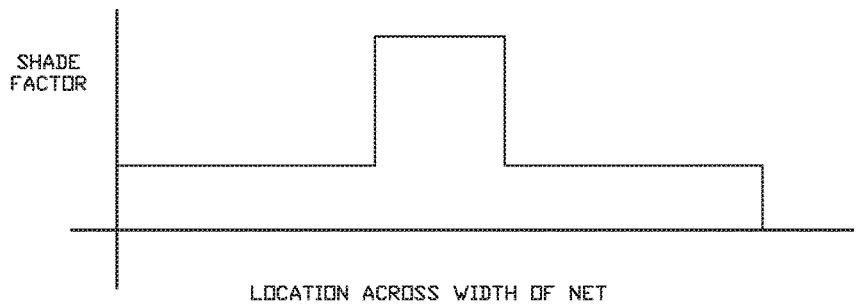
FIG. 10 is a plot of a shade factor profile across the width of a section of hypothetical netting like the netting represented in FIGS. 8 and 9, the plot illustrating how the shade factor of the netting varies across the width of the netting.

In an alternative preferred embodiment for a netting configuration like that illustrated schematically in FIGS. 9 and 10, the netting comprises a shade factor of 15% at the edge regions 300, a shade factor of 20% in the central region 100. In this alternative preferred embodiment, the central region has a shade factor that is about 125% (i.e. 1.25 times) of the shade factor of the edge region.

In another embodiment, the average shade factor of at least a first region of 50 cm width is between 105 to 200% (i.e. 1.05 to 2 times) the average shade factor of a second region of 20 cm width, and between 110% to 400% (i.e. 1.1 to 4 times) the average shade factor of a third region of at least 50 cm width. For example, the peripheral regions may have a shade factor of 15%, the intermediate regions may have a shade factor of 20%, and the central region may have a shade factor of 25%.

In one embodiment, the shade factor of the region of highest shade factor in the shade factor profile is between 10% and 60%. And in one embodiment the shade factor of a region of lower shade factor in the shade factor profile is between 5% and 50%. In another embodiment, the shade factor of the region of highest shade factor in the shade factor profile is between 20% and 40%, and the shade factor of a region of lower shade factor in the shade factor profile is between 10% and 20%.

Figure 4:
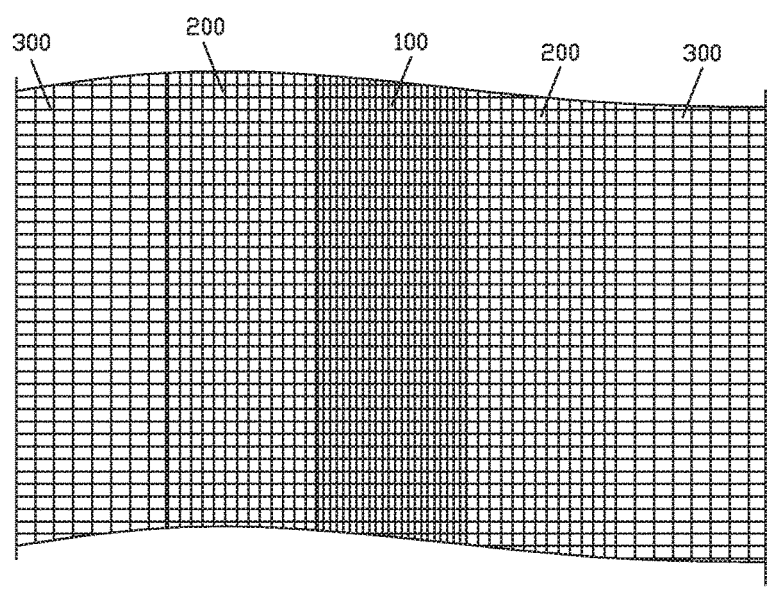
FIG. 4 is a schematic plan view of a length of netting illustrating woven construction with a higher density of construction at central region than at a peripheral region.

In some embodiments, the netting is woven or knitted, and the shade profile is contributed to, at least in part, by different densities of knit or weave in different regions of the netting. For example, the netting of FIG. 1 may be constructed by knitting. The apertures in the knitted netting are of different sizes across the width of the netting to create the shade profile. That is, a tighter or denser knit is used in one region of the netting compared to another region of the netting. In the alternative embodiment of FIG. 4, the netting may be woven to form netting having different aperture sizes in different regions of the netting. In a preferred embodiment, the weft yarns are spaced at an approximately constant spacing along the length of the netting, and the spacing between the warp yarns running longitudinally is varied across the width of the netting to create the construction profile.

In a preferred embodiment, in a region of higher shade factor the netting comprises an aperture size of about 5 mm, and in a region of lower shade factor the netting comprises an aperture size of about 6 mm. In a further embodiment, in a region of higher shade factor the netting comprises an aperture size of 5 mm, and in a region of lower shade factor the netting comprises an aperture size of 7 mm, and in a region of intermediate shade factor, the netting comprises an aperture size of 6 mm. In a further embodiment, in a region of higher shade factor the netting comprises an aperture size of 4 mm, and in a region of lower shade factor the netting comprises an aperture size of 6 mm, and in a region of intermediate shade factor, the netting comprises an aperture size of 5 mm.

In some embodiments, to achieve different shade factors in the shade factor profile, different thickness yarns are used to construct different regions of the netting. For example, a central region may be formed from a yarn having a heavier gauge or thickness compared to the thickness of the yarn used in the construction of an intermediate region. And the intermediate regions may be formed from a yarn having a heavier gauge or thickness compared to the thickness of the yarn used in the construction of peripheral regions.

Figure 5:
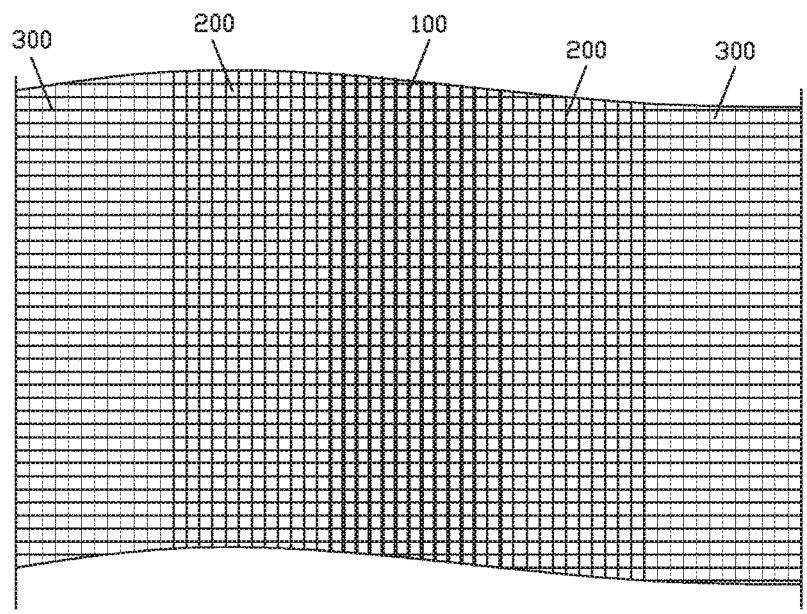
FIG. 5 is a schematic plan view of a length of netting illustrating woven construction with a higher thickness of yarns at a central region than at peripheral regions.

In one embodiment, as illustrated in FIG. 5, the netting material may comprise a woven construction, in which the longitudinal threads or warp yarns in one region of the netting are of a different thickness to the warp yarns in another region of the netting, and the lateral threads or weft yarns are of an approximately constant thickness throughout the netting. In an alternative embodiment, the netting comprises a knitted construction, illustrated in FIG. 8. The warp yarns in the woven construction vary in regions across the width of the netting, to create the shade factor profile.

In some embodiments, to achieve different shade factors in the shade factor profile, different width yarns are used to construct different regions of the netting. For example, a central region may be formed from a wider yarn compared to the width of the yarn used in an intermediate region. And the intermediate regions may be formed from a wider yarn compared to the width of the yarn used in the construction of peripheral regions.

In one alternative embodiment, the shade factor profile is contributed to, at least in part, by constructing the netting from yarns having different light (i.e. solar radiation) transmission properties in different regions of the net.

Figure 6:
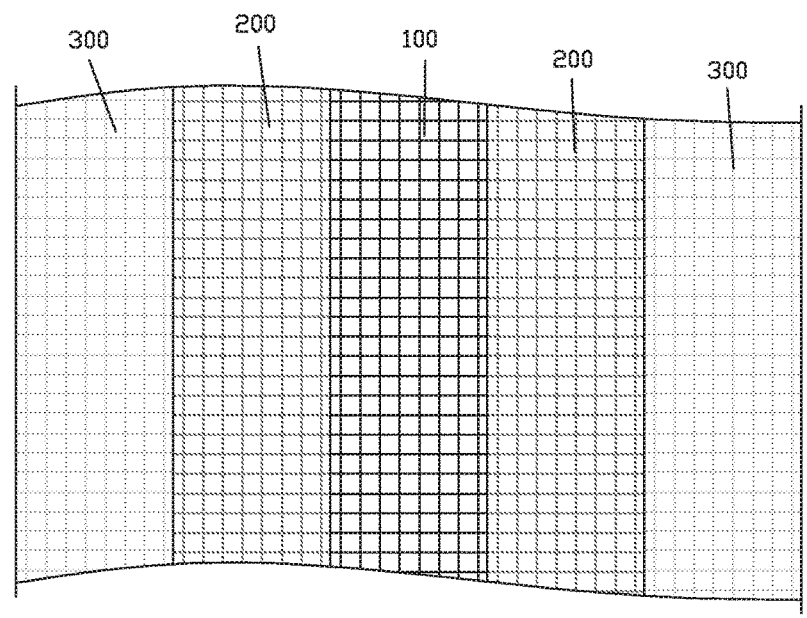
FIG. 6 is a schematic plan view of a length of netting illustrating a construction where the thickness of yarns and density of weave or knit is uniform, but the yarns in the central portion are more opaque or reflective than the yarns at the peripheral region.
Figure 7:
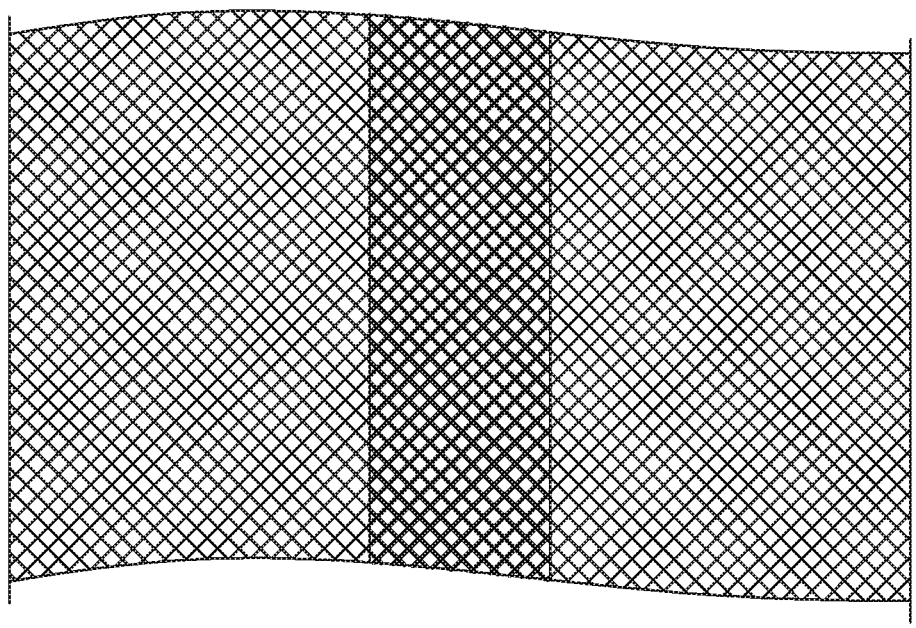
FIG. 7 is a schematic plan view of a length of netting illustrating a knitted construction with thicker yarns at a central region than at peripheral regions.

In one embodiment, the netting comprises pigmented (or dyed) yarn, and the shade factor profile is contributed to, at least in part, by different pigmentation yarns in different regions of the net, as illustrated schematically in FIG. 6. The central portion 100 is formed or constructed from a yarn having a relatively high level or amount of pigmentation compared to other regions of the netting. The periphery regions 300 of the netting are formed or constructed from a yarn having a relatively low level or amount of pigmentation compared to other regions of the netting. And the intermediate portions 200 of the netting are formed or constructed from a yarn having an intermediate level or amount of pigmentation compared to the central and periphery portions. In the embodiment illustrated in FIG. 6, the netting construction may be a woven or knitted construction.

Pigmentation may vary across the width of a netting by varying the amount or concentration of pigment or pigments used across different regions (including no pigment in some regions and including pigment in others), by varying the type of pigment or pigments used, or by varying the colour of pigment or pigments uses. As already mentioned above, the term pigment as used herein includes dyes.

Further, the netting may be formed from yarn having light reflection properties and the shade factor profile is contributed to, at least in part, by different light reflectivity yarns in different regions of the net, again represented schematically by FIG. 6.

In the various example embodiments described above, the shade factor is higher in the centre of the netting material than other regions of the netting. Such embodiments may be useful for protecting plants or trees from sunshine during times of the day when the sun is at its highest with the central higher shade factor region of the netting positioned at the top of the trees. The higher shade factor portions of the netting may be positioned over the top of the plants to shade the covered plants from vertical or near vertical overhead sun, while the lower shade factor portions of the netting may be positioned down the sides of the plant where the intensity of the incident sunlight is lower. For clarity, nettings of the invention may be left in place for days, weeks, months, or years, providing effective sun protection for that period. Typically, the netting will be left in place for a season, or part of a season.

Figure 12:
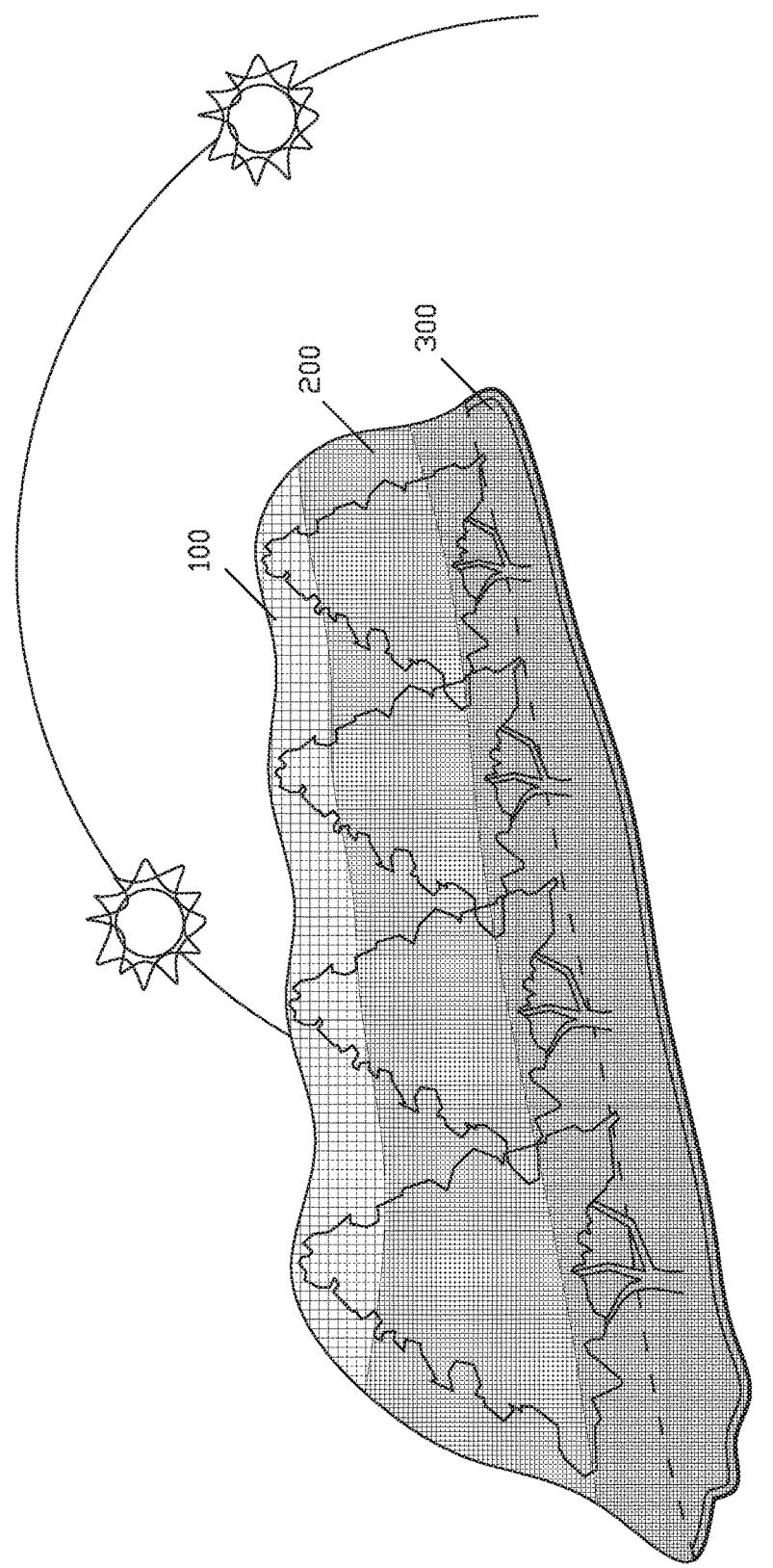
FIG. 12 is a schematic illustration showing netting according to one embodiment of the present invention draped over a row of trees, with regions of different shade factor being located respectively above and alongside the trees.

However, in some embodiments, the region of highest shade factor may be positioned to be located in use along the sides of trees, for example as illustrated in FIG. 12. In such an embodiment, the shade factor in regions 200 either side of the centre region of the netting is greater than the shade factor in the central portion 100 of the netting. The shade factor in the central portion 100 of the netting may be greater than or less than the shade factor in peripheral portions 300 of the netting. Such an embodiment may be useful for protecting trees or hanging fruit during the morning and afternoon when the sun is more directly incident on the sides of trees. A netting material having a higher shade factor in the centre region 100 than peripheral regions 200 may drape over the row of trees without hanging fully to the ground, for example as in FIG. 11.

Figure 13:
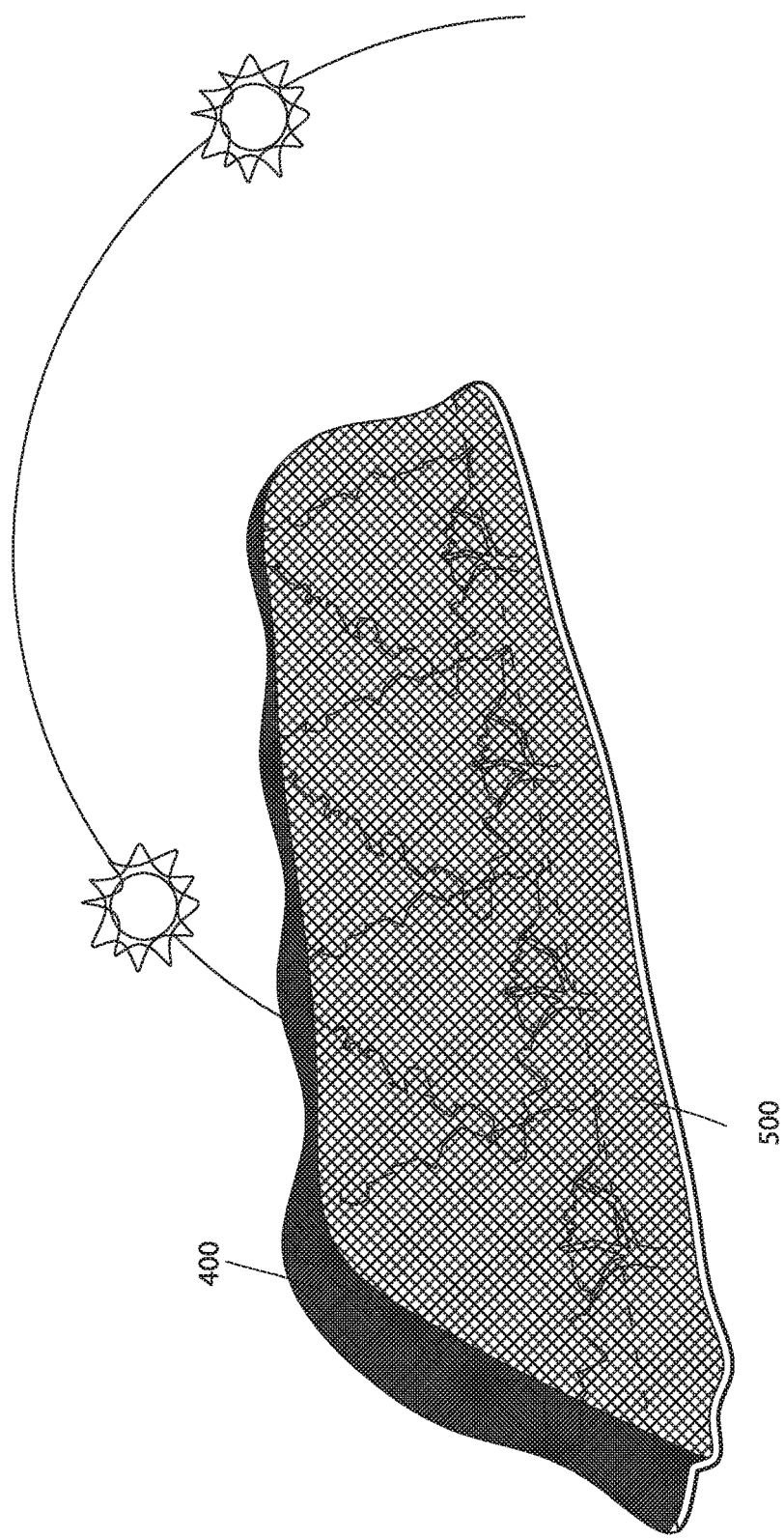
FIG. 13 is a schematic illustration showing netting according to one embodiment of the present invention draped over a row of trees, with regions of different shade factor being located either side of the row of trees.
Figure 13A:
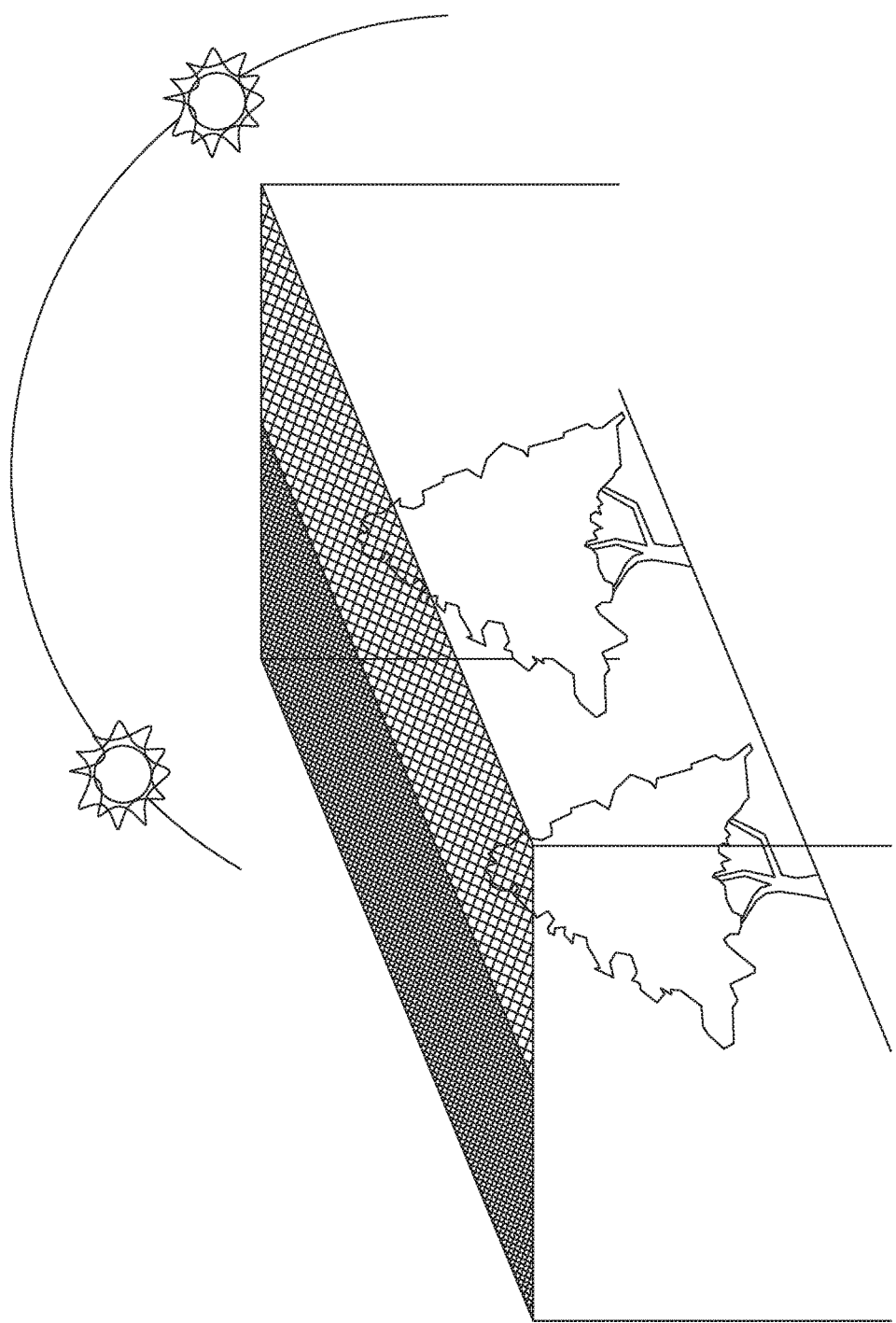
FIG. 13A is a schematic illustration showing netting according to one embodiment of the present invention installed over a row of trees, with regions of different shade factor being located either side of the row of trees.

In the example embodiment of FIG. 13, the shade factor on one side of the netting 400 is higher than the shade factor on the other side 500 of the netting. Such an embodiment may be useful for rows of trees that run east to west. In the northern hemisphere, the higher shade factor side of the netting may be placed on the south side of the row of trees where more shade protection is required. In the southern hemisphere, the higher shade factor side of the netting may be placed on the north side of the row of trees. In FIG. 13, the embodiment illustrated is a drape net. Net of the invention may also be installed as an overhead net, suspended by overhead wires for example, as illustrated by FIG. 13A.

Figure 26:
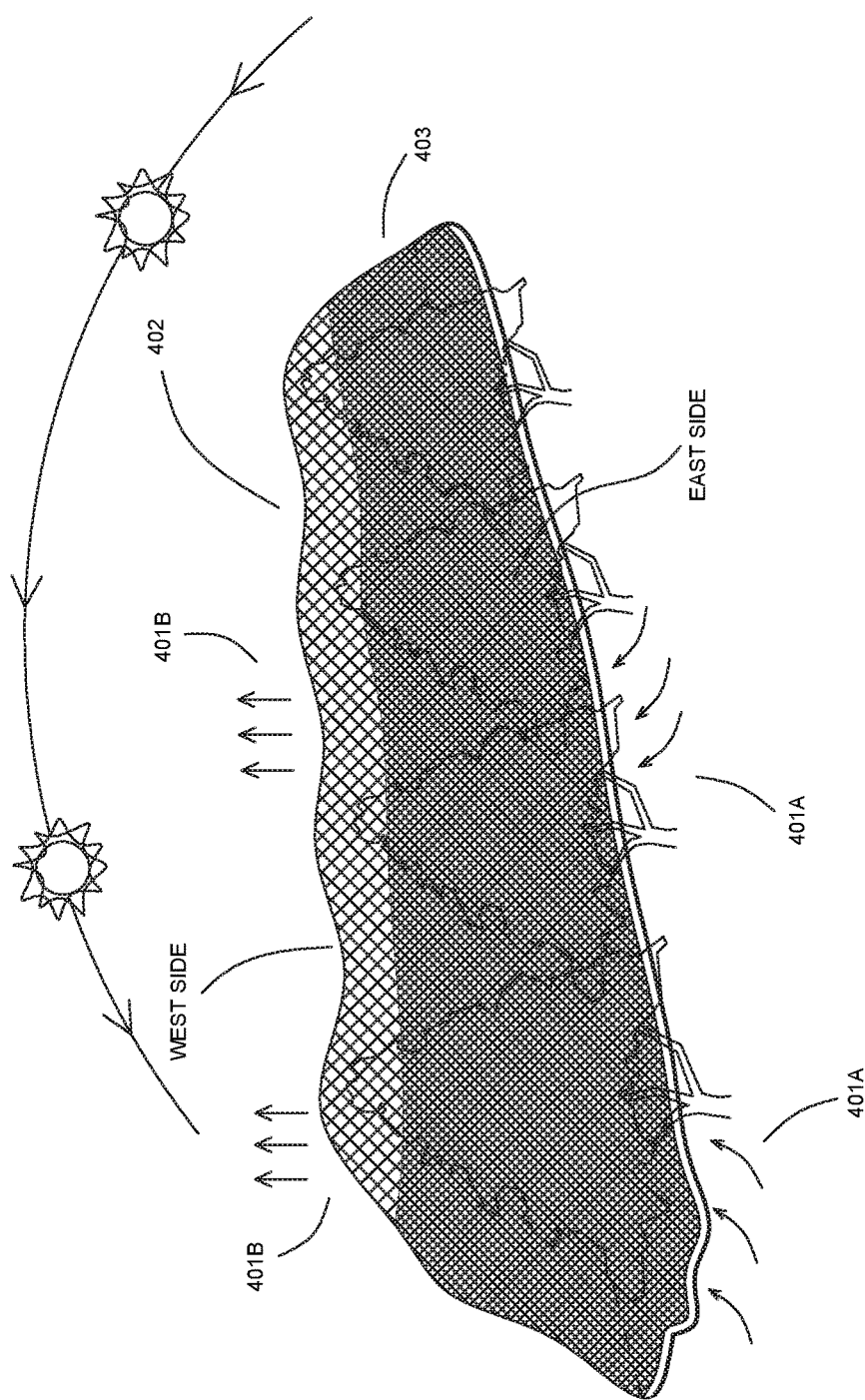
FIG. 26 is a schematic drawing showing netting according to one embodiment of the present invention draped over a row of trees with regions of different shade factor being located either side of the row of trees and where the central region has larger apertures such that the central region can act as a venting region

In some embodiments it is preferable to maintain a low air temperature growing environment. For example, cherry trees require low temperatures to bear fruit. Other temperate fruit trees have similar requirements. In order to maintain a low temperature, in some embodiments, the shade factor in the peripheral regions (e.g. 200 in FIG. 11) is greater than the shade factor in the central portion 100 of the netting. In winter months when the sun is lower, the requirement to provide shading on top of trees may be less, and increased shading at the sides of trees can assist to reduce warming the environment around the trees. Accordingly, a more open construction netting (i.e. a construction of greater air permeability) or venting region at the top of the trees compared to the sides may be preferred, such that the top of the netting may vent air and the sides may provide shade. Greater air permeability may be achieved by having the venting region constructed with apertures of a greater size than those of the peripheral region. The apertures of greater size may have a maximum size that is small enough to prevent bee passage, for example they may be less than 6 mm, or less than 5 mm, or less than 4 mm. Alternatively, if the peripheral region is comprised of thicker or wider yarns than the venting region, greater air permeability in the venting region may be achieved by using thinner or narrower yarns in the venting region than those used in the peripheral region. This configuration can improve air flow from below the trees to above the trees as the more open netting at the top of the trees allows rising warm air to escape from the tree canopy, further assisting in reducing temperature. FIG. 26 illustrates such airflow, showing air flowing from under the trees (the air being illustrated by arrows 401A) and out of the venting region (402) at the top (illustrated by arrows 401B).

Figure 27:
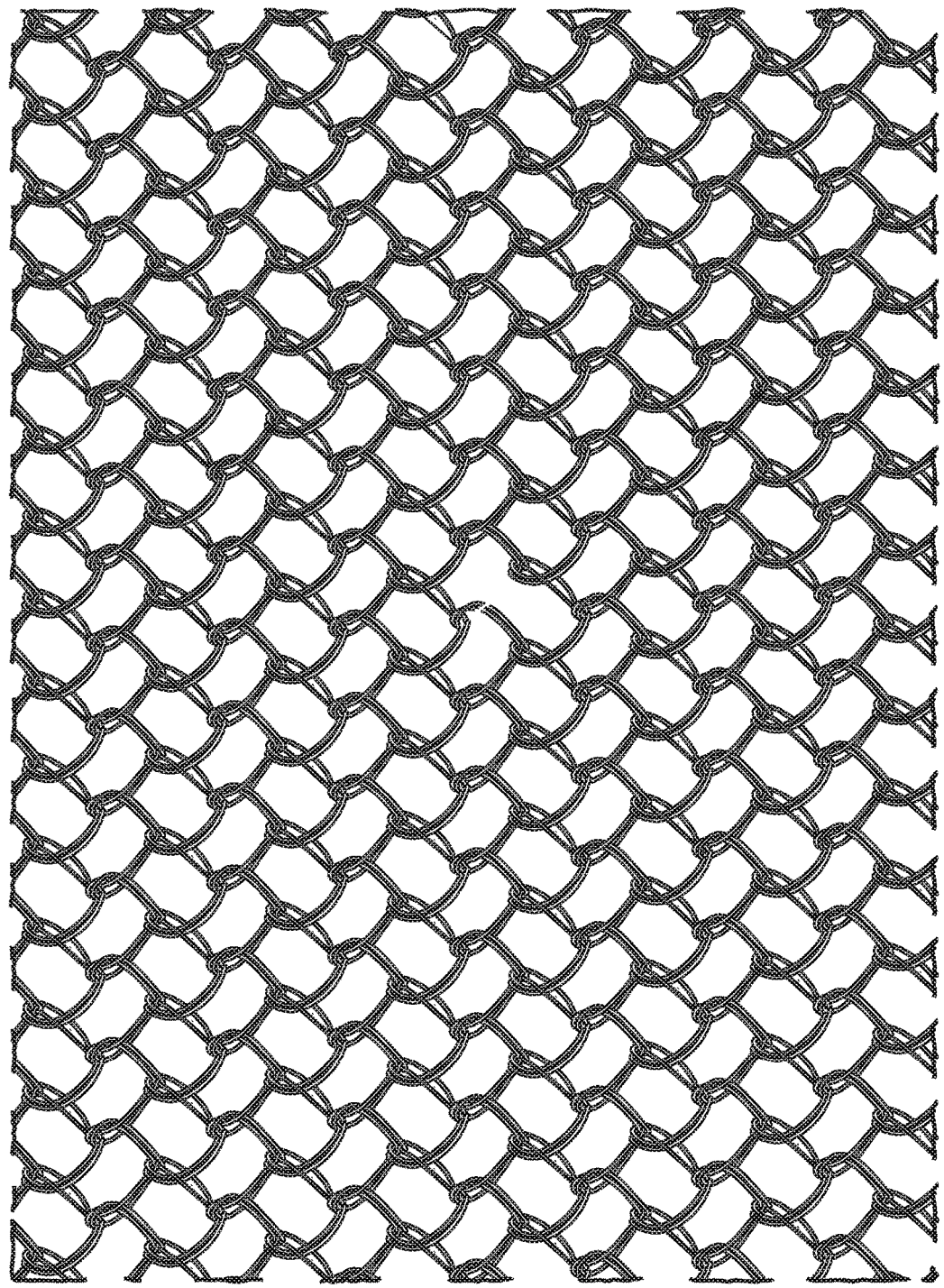
FIG. 27 is a photograph showing an enlarged view of the venting region of the embodiment that the schematic
Figure 28:
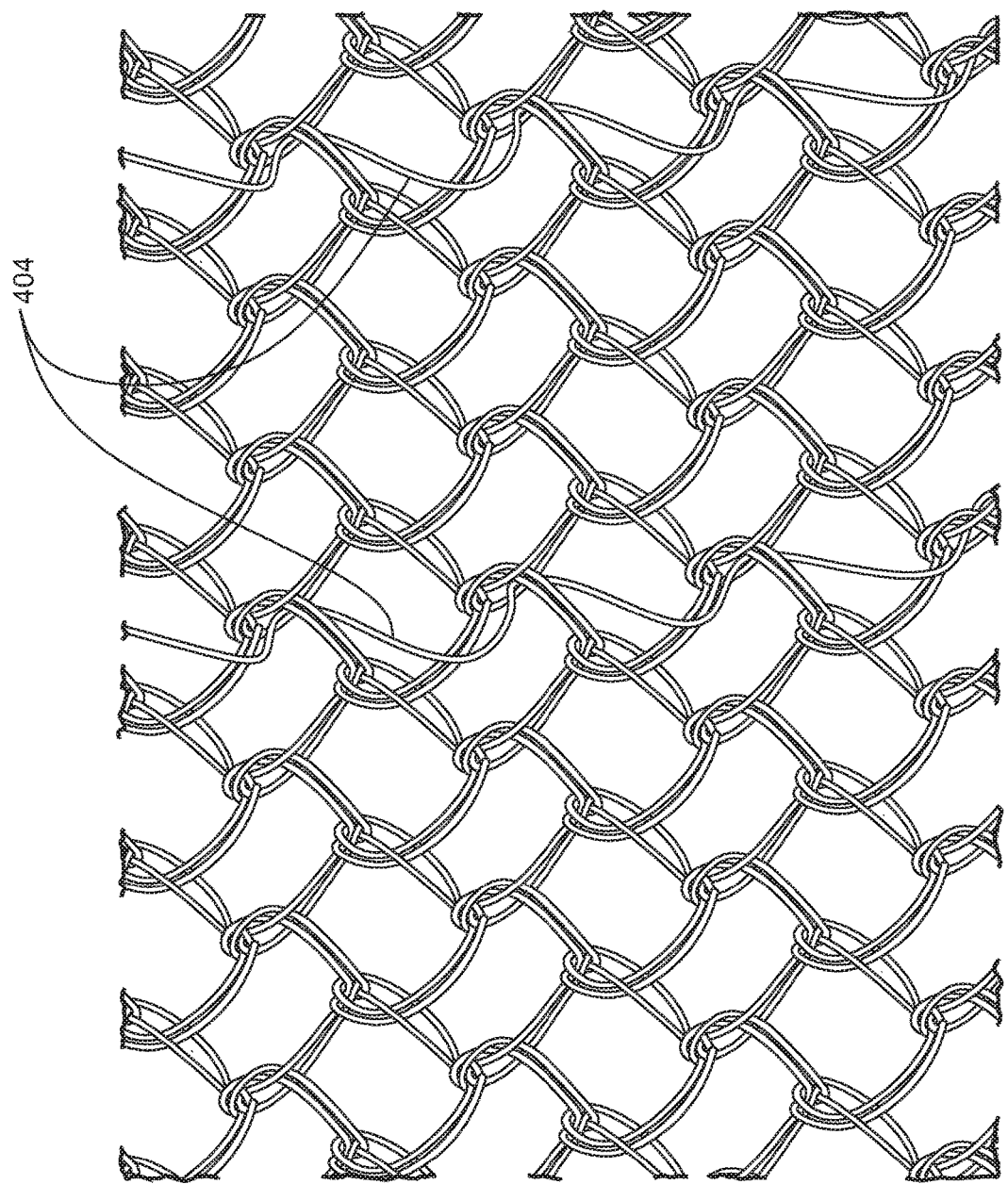
FIG. 28 is a photograph showing an enlarged view of the side (or peripheral) region of the embodiment that the schematic

In some embodiments the venting region of the netting material has a width of about 200 mm to 3 m, or 500 mm to 2 m, or 1 m to 1.5 m or about 1 m or about 0.5 m wide. In some embodiments the venting region is a centrally located region. In some embodiments the aperture size of the venting region (402) is between 1.1 and 4 times the size of the aperture size of the peripheral region (403). In some embodiments the aperture size of the peripheral region is between 2 mm and 20 mm, and the aperture size of the venting region is between 1.1 and 4 times larger, or between 1.1 and 2.9 times larger, or between 1.1 and 2.5 times larger. In some embodiments the peripheral region is formed of yarns having low transmittance (for example, less than 15%) of solar radiation on average across the UV, visible and near infrared ranges. Optionally, the yarns of the peripheral region may also have relatively high reflectance (for example, greater than 40%) of solar radiation on average across the UV, visible and near infrared ranges. In some embodiments the peripheral region is formed from yarns comprising between 0.1% and 4.0% carbon black. In some embodiments, the venting region may comprise no pigment, may comprise a UV absorbing pigment, or may comprise between 0.2% and 30% of a white pigment. In some embodiments the peripheral region includes, in addition to the multiple yarns which form the netting of the second region, a lay-in woven through or across the apertures of the netting and/or around intersections of the multiple yarns which form the netting. In some embodiments the lay-in is yarn with a circular or similar cross-section; in others it is a tape (e.g. rectangular cross-section). The lay-in may be located in every row of knitting of the second region, or every second row, or every third row, or every fourth row, or every fifth row, or any combination thereof. The first region may have no lay-ins, or may comprise some lay-ins, as long as the air permeability is greater in the venting region. The use of a lay-in in the material is an effective way to reduce the aperture size of the second region while using the same basic knit pattern used in both first and second regions. In one preferred embodiment the shade factor in the peripheral regions is greater than the shade factor in the central portion 402 of the netting, and the width of the netting is such that in use the netting material does not hang or drape fully to the ground so that a gap exists between the edge of the netting and the ground. The gap combined with the open top of the netting provided by the lower shade factor at the top of the tree provides for air flow through the trees to reduce air temperature. In other words, the venting region of the netting material with sun shading provided at the sides of the netting does not trap warm air underneath which could cause air temperatures to rise. In some embodiments the width of the netting is such that in use the gap between the edge of the netting material and the ground below is about 1 m. FIGS. 27 and 28 are close up views of a netting of one embodiment as illustrated in FIG. 26. FIG. 27 is a close up photograph of the venting region of the netting, and showing the construction of that region. FIG. 28 is a close up photograph of the peripheral region of the netting, and showing the construction of that region. In this embodiment the venting and peripheral regions are comprised of netting having the same basic construction but the peripheral region also employs a lay-in (404) in every second row of knitting, such that the netting of the peripheral region has a smaller average aperture size and a greater shade factor compared to the venting region which has a lower shade factor and greater air permeability. In this embodiment, the netting of the venting region has an aperture size of about 4 mm, and in the peripheral region the average aperture size (accounting for lay-in) is smaller than the venting region because of the lay-in. The material from which the venting region is comprised may for example be polyethylene without pigment (or with a clear or colourless pigment), producing a region of clear netting, and providing a pleasing aesthetic effect. The material from which the peripheral region is comprised may for example be polyethylene comprising carbon black and provide a high level of shading to plants beneath the netting.

The construction profile may also vary in UV light reflectivity, visible light reflectivity, or infrared light reflectivity, or any combination thereof.

In some embodiments the construction profile achieves different heat reflectivity across the width of the netting. Differing heat reflectivity across the width may be achieved through use of yarns having different heat reflectivity (in particular, infrared radiation reflectivity) properties. Differing heat reflectivity across the width may also be achieved through use of regions having different yarn density, different cover factor (through differing knit/weave pattern, or different width/thickness of yarns), different levels of pigment, or through use of pigments that have differing heat reflectivity characteristics, or any combination of these factors. Through use of regions of different heat reflectivity, and considering factors such as the orientation of a row of plants relative to the path of the sun, it becomes possible to influence the temperature of the environment in which a plant is growing based on daily or seasonal variations.

In some embodiments, the region of highest heat reflectivity may be located above the plants or trees.

In other embodiments the region of highest heat reflectivity may be located on the side of the plants or trees that receive the most sun. For example, heat reflectivity may be greater on one side of a notional longitudinal centre line of the material than the other side. On a row of plants or trees aligned in a north-south orientation, the material may be installed over the row such that the region of higher heat reflectivity faces towards the afternoon sun (i.e. the west side) thereby reducing the impact of afternoon heat on the plants. On a row of plants or trees aligned in a east-west orientation, the material may be installed over the row such that the region of higher heat reflectivity is on the side that faces towards the predominant direction of the sun (i.e. south side for Northern hemisphere, north side for Southern hemisphere).

In some embodiments differing heat reflectivity is achieved by having a greater concentration of pigment in the yarns on one side of a notional centre line such that the yarns comprising the netting on that side reflect 60 to 80% of solar radiation across the wavelength range 700-1000 nm and a lower concentration of pigment on the other side of the notional centre line such that that the yarns comprising the netting on the other side reflects 20 to 40% of solar radiation across the wavelength range 700-1000 nm. For a north-south planted row of plants, the side of the netting with the greater heat reflectivity may be arranged to be on the west side of the row to provide protection from the afternoon sun. For east-west planted rows, the side of the netting with greater heat reflectivity may be arranged to be on the southern side for Northern Hemisphere, and on the northern side for the Southern hemisphere.

In situations where even further heat protection is required, the netting may comprise three regions of different heat reflectivity. For example, with reference to the north-south oriented row discussed above, a region of highest heat reflectivity may be located in a longitudinal central region of the netting which in use sits above the top of the plants providing protection from the midday sun, a region of intermediate heat reflectivity may be located on one side of the longitudinal central region of the netting to hang beside the plants on the west side to provide protection from the afternoon sun, and a third region of lowest heat reflectivity may be located on the other side of the longitudinal central region of the netting to provide protection from the morning sun.

In a preferred embodiment, differing levels of heat reflectivity may be achieved using different concentrations of pigment in the different regions of the netting. In one embodiment the netting is comprised of yarns comprising a white pigment, with a first region comprising yarns having a pigment concentration sufficient such that the tapes/yarns reflect approximately 30% of solar radiation, on average, across the wavelength range 400 to 700 nm, and a second region comprising yarns having a pigment concentration sufficient such that the tapes/yarns reflect approximately 70% of solar radiation, on average, across in the wavelength range 400 to 700 nm.

The horticultural advantages of netting having differing levels of heat reflectivity may include the mitigation of one or more of heat stress, moisture stress and/or transpiration stress that a plant may otherwise suffer when exposed to too much heat. The mitigation or elimination of such aspects assists with the provision of an environment that may enhance the growth and development of a plant or the fruit on it. Also, differing levels of heat reflectivity may provide a more uniform heat environment over an entire plant which may also assist with management of heat related stress responses. The provision of a material having regions of differing heat reflectivity allows heat shielding on the areas of a plant that may suffer most, but minimal interference in the areas that do not need such protection. The afternoon sun tends to generate more heat stress and at times sunburn to fruit than the morning sun. Accordingly more protection to the afternoon sun enables the better value to be achieved from the shade material.

As explained above, a netting material comprising a construction profile may provide a useful shade factor profile for protecting plants from excessive sunlight during different times of the day. However, netting comprising a construction profile may also be useful for protecting plants or trees from hail stones or frozen rain in extremely cold climates or conditions. Such netting may comprise a central region of comprising a relatively high density construction. The perimeter regions 300 of the netting may comprise a relatively low density construction. And intermediate regions 200 of the netting between the perimeter regions 200 and the central region 100 may comprise an intermediate density construction in comparison to the other regions. The aperture size of the netting in the relatively high density construction region is smaller than the aperture size of the netting in the intermediate and low density construction regions. And the aperture size of the netting in the intermediate density construction region is smaller than the aperture size in the low density construction region. In some embodiments for hail netting, the central portion comprises an aperture size of 5 mm, the intermediate regions comprise an aperture size of 6 mm, and the perimeter regions of the netting comprise an aperture size of 7 mm. In an alternative embodiment, the central portion comprises an aperture size of 4 mm, the intermediate regions comprise an aperture size of 5 mm, and the perimeter regions of the netting comprise an aperture size of 6 mm. The smaller aperture size protects the tops of the plant or trees beneath the netting material from hail coming from directly above the plants.

In some embodiments, netting comprising regions of different thickness yarns may also be useful for protection from frozen rain or hail. For example, with reference to FIG. 5, a central region may be formed from a yarn having a heavier gauge or thickness compared to the thickness of the yarn used in the construction of an intermediate region. And the intermediate regions may be formed from a yarn having a heavier gauge or thickness compared to the thickness of the yarn used in the construction of peripheral regions. The heavier yarns provide a higher strength and more protection compared to lighter yarns used in other areas of the netting.

In some embodiments, thicker or wider yarns, or tighter knit or weave may be provided in combination with each other and/or in combination with varying pigmentation levels. In some embodiments this could further enhance the variation in shade factor between regions of the netting. Alternatively, thicker or wider yarns or a tighter weave or knit may be provided with a reduced amount of pigment. Stated differently, thinner or narrower yarns or a looser weave or knit may be provided with a higher level of pigmentation. According to such embodiments the netting material with improved hail resistance or strength in some regions compared to other regions others may be provided while maintaining a more uniform light transmission across the width of the netting material.

For example, in some embodiments the construction profile comprises different thickness yarns with different pigmentation, a first region of the netting material comprising a first yarn and a second region comprising a second yarn, the first yarn being thicker than the second yarn, and the second yarn comprising a higher pigmentation level than the first yarn.

In some embodiments the construction profile comprises different width yarns with different pigmentation, the first region of the netting material comprising a first yarn and the second region comprising a second yarn, the first yarn being wider than the second yarn, and the second yarn comprising a higher pigmentation level than the first yarn.

In some embodiments the construction profile comprises different sized apertures and difference pigmentation, the first region of the netting material constructed from a first yarn to comprise a first aperture size and the second region of the netting material constructed from a second yarn to comprise second aperture size, the second aperture size being larger than the first aperture size and the second yarn having a higher pigmentation level than the first yarn.

The netting is typically machine-knitted on a warp knitting machine or other knitting-machine. The netting comprises an array of mesh apertures. The mesh apertures of the preferred embodiment are shaped with a combination of rounded base and pointed peak, forming four sides with four yarn intersections points and are substantially uniform in shape and size.

In some embodiments, between the yarn intersections the connecting yarn portions may extend substantially linearly or be knitted or knotted.

The sides of the mesh apertures between the yarn intersection points may comprise single or twin yarns, or be comprised of triple or multiple yarns in alternative embodiments.

In four-sided forms of mesh apertures, the shape of the apertures may be substantially square, rectangular or any other shape. It will also be appreciated that the mesh apertures may be knitted to have more than four sides, and with yarn intersection points in alternative forms of the knitted mesh construction to create more complex mesh aperture shapes, for example but not limited to hexagonal shaped apertures.

The netting is stretchable or extendible in both the width axis or direction and the length axis or direction. The length direction is typically the machine or manufacturing direction.

In the preferred embodiment comprising equi-length four sided mesh apertures, the mesh size of the equi-length four sided mesh apertures is defined by the length of the sides between the intersections, measured when the netting is in a taut but non-stretched state in both length and width directions. Preferably the length of each side may be in the range of approximately 3 mm to 20 mm.

The yarn from which the netting is knitted is typically a monofilament yarn of any suitable material. Typically, the yarn is extruded from a polymer resin. Each yarn may be a single monofilament, or alternatively may comprise twin or multiple monofilaments.

Monofilament yarns may be circular in cross-section or otherwise shaped. For circular cross-section monofilament yarns, the yarn preferably has a diameter in the range of approximately 0.1 mm to 1 mm, even more preferably 0.2 mm to 0.8 mm, and even more preferably 0.2 mm to 0.4 mm, and even more preferably 0.15 to 0.3 mm and most preferably 0.15 mm to 0.25 mm. In denier (grams per 9000 metres of the yarn) the yarn is preferably in the range of approximately 50 to 1000 denier, more preferably 50 to 700 denier, even more preferably 100 to 500 denier, even more preferably 100 to 300 denier, even more preferably 150 to 250 denier or most preferably 200 to 300 denier. Monofilament yarn may be stretchable or non-stretchable in length, and may be elastic or non-elastic. The netting is relatively lightweight. Preferably the weight of the netting is in the range of approximately 10 to 200 grams per $m^2$. In alternative embodiments, the weight of the netting is in the range of approximately 15 to 80 grams per $m^2$, or 20 to 60 grams per $m^2$, or 20 to 40 grams per $m^2$, or 30 to 40 grams per $m^2$, or 25 to 35 grams per $m^2$.

The crop protection netting may have a cover factor (as herein defined) of less than 40%, less than 30%, less than 20%, less than 10%, or less than 5%. In some embodiments, the netting may have a first lengthwise extending region having a cover factor of 80 to 95% and comprising generally at least 70% of the width of the material, and a second lengthwise extending region having a cover factor of 10 to 30% and comprising generally between 200 mm and 1 m of the width of the material.

As described, netting of the invention may include at least one reflective yarn. The reflective yarn may be of a polymer containing one or more pigments which give the material desired properties, such as desired light reflective properties for example. In some embodiments, the pigment may be a white pigment. Reflective netting may provide various benefits to the trees or plants being covered and/or enhances the visibility of the netting to insects or birds. This may increase the effectiveness of the netting as insect deterrent or to reduce bird entanglement or both. For example, the reflective yarn may reflect at least 10% or at least 50% of solar radiation on average across the UV (wavelength about 280-400 nm), visible (wavelength about 400-700 nm) and very near infrared (wavelength about 700-800 nm) ranges, and which transmits at least 10% on average of solar radiation across the wavelength range about 800-2500 nm. In some embodiments the yarn may reflect more solar radiation than it transmits and absorbs in the UV, visible, and very near infrared ranges. In some embodiments the yarn may transmit at least 15% or at least 20% of solar radiation on average in the wavelength range about 800-2500 nm. In some embodiments the yarn may reflect at least 10% on average of solar radiation across the wavelength range about 800-2500 nm. In some embodiments the yarn may comprise a resin having 0.25% to 6% by weight of at least one white pigment.

In some embodiments the material may also incorporate a compound or compounds added to increase the extent to which the material reflects and/or absorbs radiation from the earth when the material is placed over or adjacent to plants.

In some embodiments the material may also incorporate a compound or compounds added to increase the extent to which the material transmits and/or absorbs radiation from the earth when the material is placed over or adjacent to plants.

As referred to previously in some embodiments the material may also incorporate a compound or compounds added to increase the extent to which the material reflects and/or absorbs solar radiation when the material is placed over or adjacent to plants.

As referred to previously in some embodiments the material may also incorporate a compound or compounds added to increase the extent to which the material transmits and/or absorbs solar radiation when the material is placed over or adjacent to plants.

As crop protection netting, the netting of the invention is particularly suitable covering trees or other plants for sun protection or for insect and bird exclusion or hail protection. The netting may be stretchable so that as trees or plants covered by the netting grow the netting can stretch to accommodate growth.

Described above are netting materials and embodiments thereof with a shade factor which varies across the width of the netting. A particular embodiment of such a netting is now described in detail. First however related crop protection netting(s) are described with reference to FIGS. 14 to 18 and then FIGS. 19 and 20, to aid understanding of the knit structure of the subsequently described netting of the invention which uses this knit structure and also has a shade factor which varies across the width of the netting.

Figure 14:
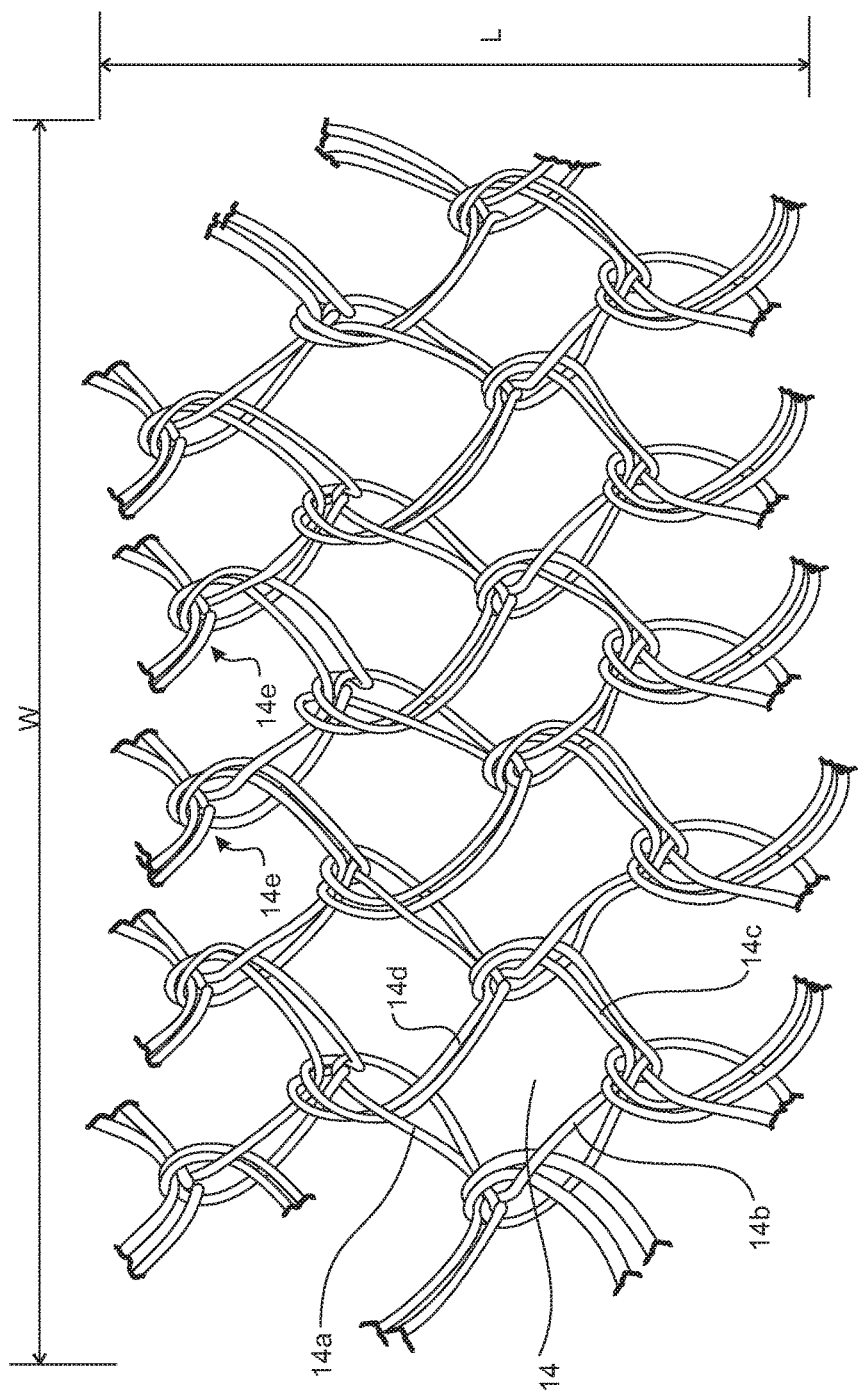
FIG. 14 is a plan view of a portion of related crop protection netting in a taut but un-stretched state.
Figure 15:
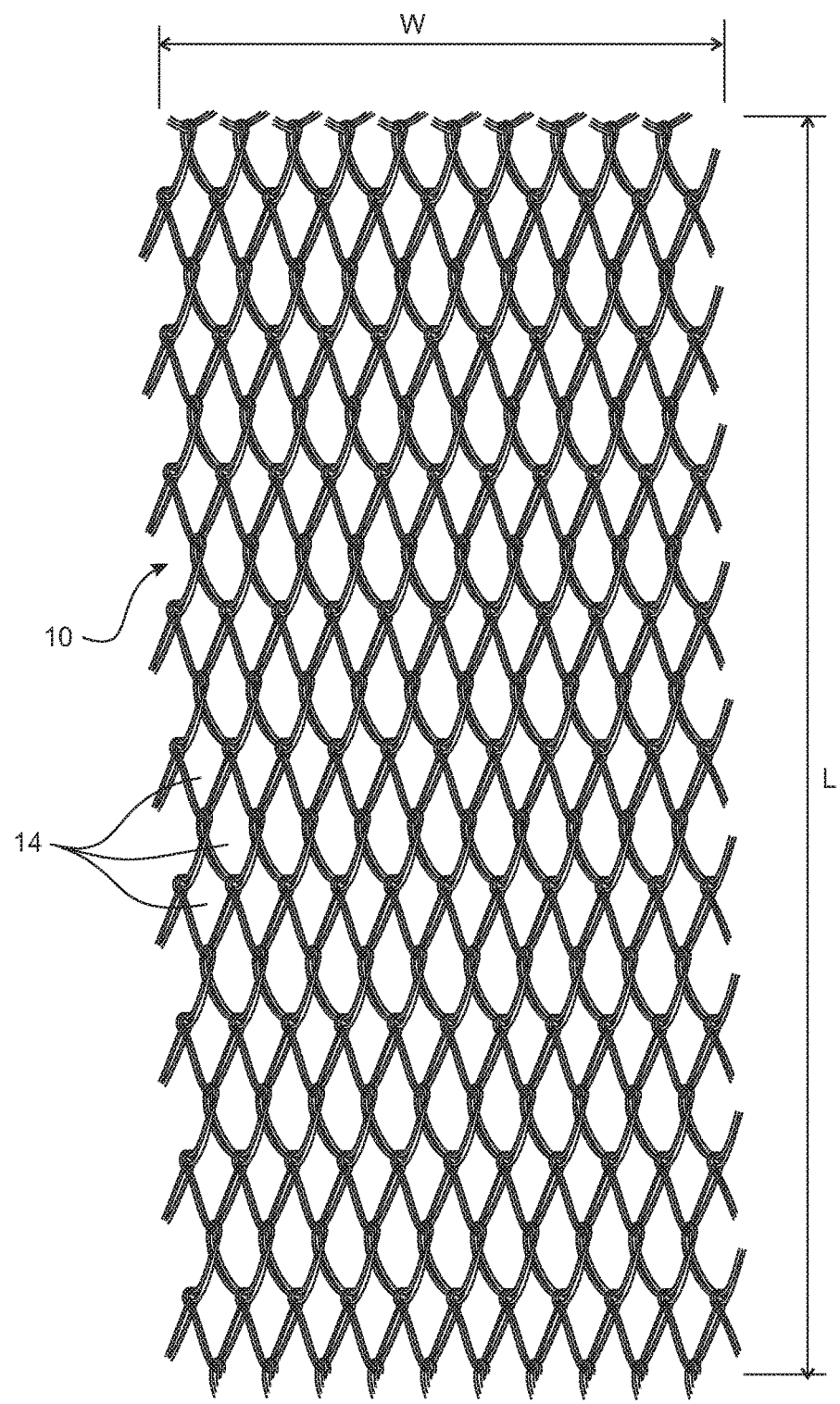
FIG. 15 is a plan view of a portion of the crop protection netting of FIG. 14 that has been stretched outwardly in the direction of arrows L.

FIG. 14 is a plan view of a portion of crop protection netting in a taut but un-stretched state and FIG. 15 is a plan view of a portion of the netting stretched outwardly in the direction of arrows L. Optionally edge portions (not shown) of the netting may be reinforced or formed with different material to assist in fixing the netting to the ground. As shown, the entire netting or majority of the netting if the edges are reinforced is formed from a knitted mesh construction shown.

Figure 18:
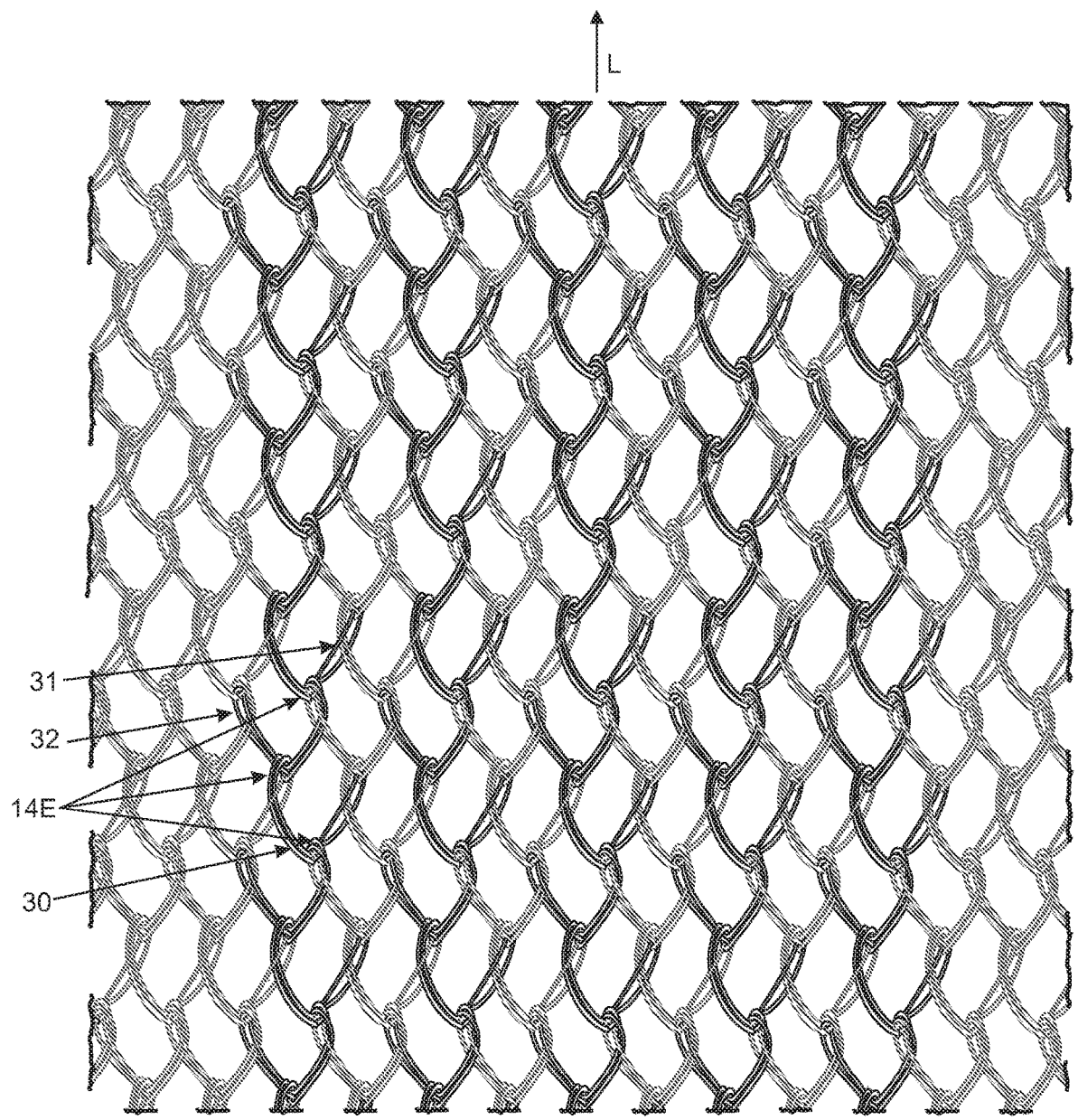
FIG. 18 is another plan view of a portion of the crop protection netting of FIGS. 15 to 18.

The netting is typically machine-knitted on a warp knitting machine or other knitting-machine. The netting comprises an array of mesh apertures 14. The mesh apertures 14 of the preferred embodiment are shaped as seen in FIG. 18, with a combination of rounded base and pointed peak, forming four sides with four yarn intersections points and are substantially uniform in shape and size. This shape could be said to be a diamond pattern. The orientation of the mesh apertures 14 relative to the length L and width W directions of the netting need not be as shown in FIG. 14.

Referring particularly to FIG. 14 each shaped mesh aperture 14 is defined substantially by four sides 14a-14d of substantially equal length of yarn, which are connected by four knit intersections 14e. At the knit intersections 14e the yarns of which the netting is formed are looped around each other. Between the yarn intersections 14e the connecting yarn portions 14a-14d extend substantially linearly and are not continuously knitted or knotted (as in the prior art netting types referred to above). The sides 14a-d may have non-equal lengths in alternative forms of the netting. As shown, the sides 14a-14d between the intersections 14e comprise twin yarns, but be comprised of triple or multiple yarns in alternative embodiments. In the four-sided form of the mesh apertures, the shape of the apertures may be substantially square, rectangular or any other shape. It will also be appreciated that the mesh apertures may be knitted to have more than four sides, and with intersections 14e in alternative forms of the knitted mesh construction to create more complex mesh aperture shapes, for example but not limited to hexagonal shaped apertures.

Figure 15A:
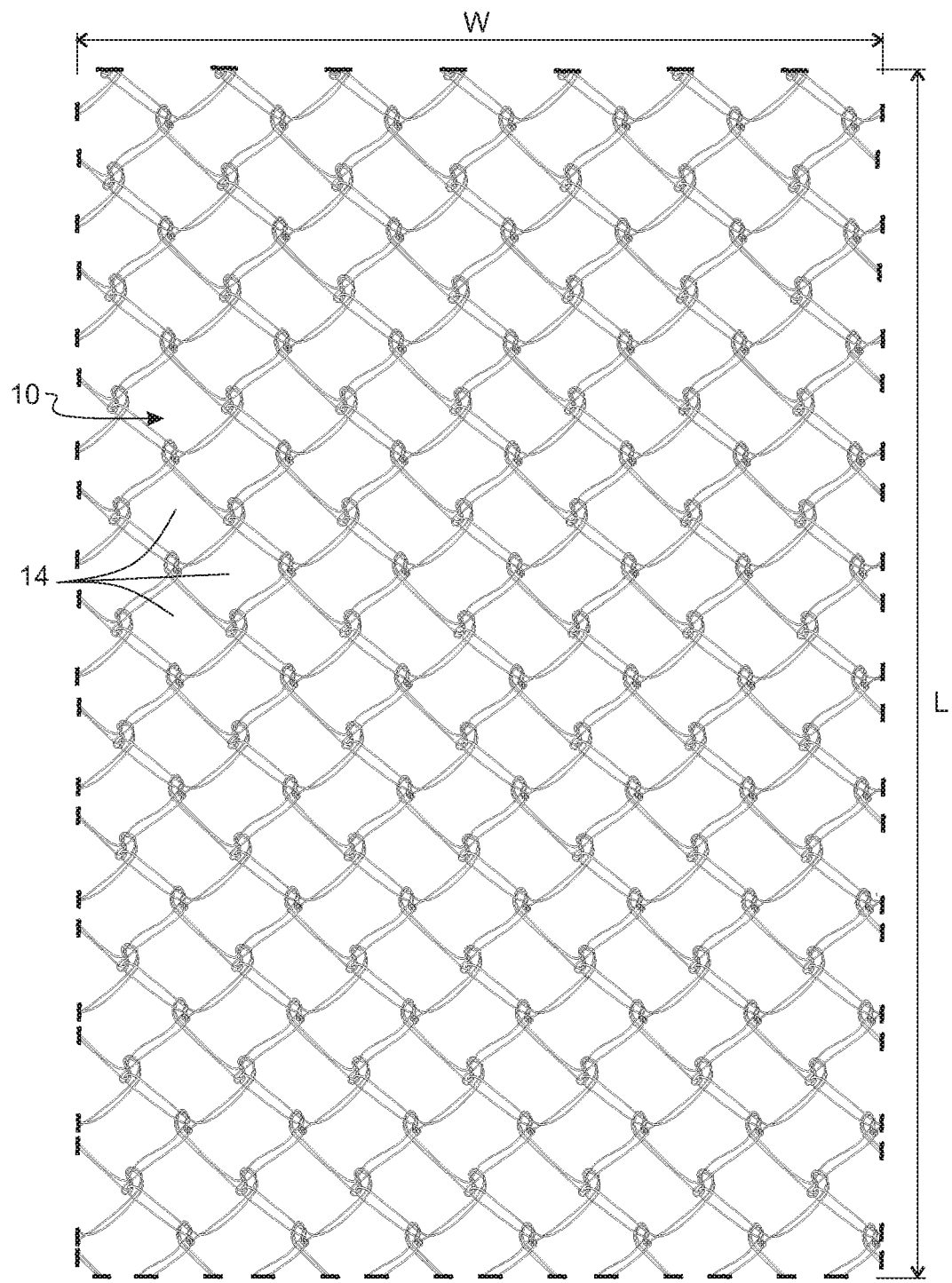
FIG. 15A is a plan view of a portion of the crop protection netting of FIG. 14 that has been stretched outwardly in the direction of arrows L the opposite of FIG. 15.

The netting is stretchable or extendible in both the width axis or direction indicated by arrow W and the length axis or direction indicated by arrow L in FIGS. 14 and 15 which is typically the machine or manufacturing direction. FIG. 15 shows a portion of the crop protection netting of FIG. 14 that has been stretched in the length direction L (causing some contraction or reduction in the width direction W and also causing the mesh apertures 14 to change shape). FIG. 15a shows a portion of the crop protection netting of FIG. 14 that has been stretched in the width direction W (causing some contraction or reduction in the length direction L and also causing the mesh apertures 14 to change shape.

In the preferred embodiment shown the mesh size of the equi-length four sided mesh apertures 14 is defined by the length of the sides 14a-d between the intersections 14e, measured when the netting is in a taut but non-stretched state in both length and width directions. Preferably the mesh size may be in the range of approximately 1, 2, or 3 mm to 20 mm, 3 mm to 10 mm, more preferably approximately 3 mm to 8 mm, even more preferably 4 mm to 6 mm, even more preferably 3 mm to 5 mm, even more preferably approximately 3.5 mm to 4.5 mm. In one preferred form for pollinating insect exclusion the mesh size may be approximately 4 mm.

The yarn from which the netting described above is knitted is typically a monofilament yarn of any suitable material as previously mentioned. Typically, the yarn is extruded from a polymer resin. Each yarn yarns may be single monofilaments, or alternatively may comprise twin or multiple monofilaments. The monofilament yarns may be circular in cross-section or otherwise shaped. For circular monofilament yarns, the yarn preferably has a diameter in the range of approximately 0.1 mm to 1 mm, even more preferably 0.2 mm to 0.8 mm, and even more preferably 0.2 mm to 0.4 mm, and more preferably 0.15 to 0.3 mm and most preferably 0.15 mm to 0.25 mm. In denier (grams per 9000 metres of the yarn) the yarn is preferably in the range of approximately 50 to 1000 denier, more preferably 50 to 700 denier, even more preferably 100 to 500 denier, even more preferably 100 to 300 denier, even more preferably 150 to 250 denier or most preferably 200 to 300 denier. The monofilament yarn may be stretchable or non-stretchable in length, and may be elastic or non-elastic depending on requirements. The netting is relatively lightweight. The weight of the netting is preferably in the range of approximately 10 to 100 grams per m², more preferably 15 to 80 grams per m², even more preferably 20 to 60 grams per m², even more preferably 20 to 40 grams per m², even more preferably 30 to 40 grams per m² and even more preferably 25 to 35 grams per m² and most more preferably 30 to 40 grams per m².

The crop protection netting may have a cover factor (as herein defined) of less than 80%, less than 50%, less than 30%, less than 20%, less than 10%, or less than 5%.

Figure 16:
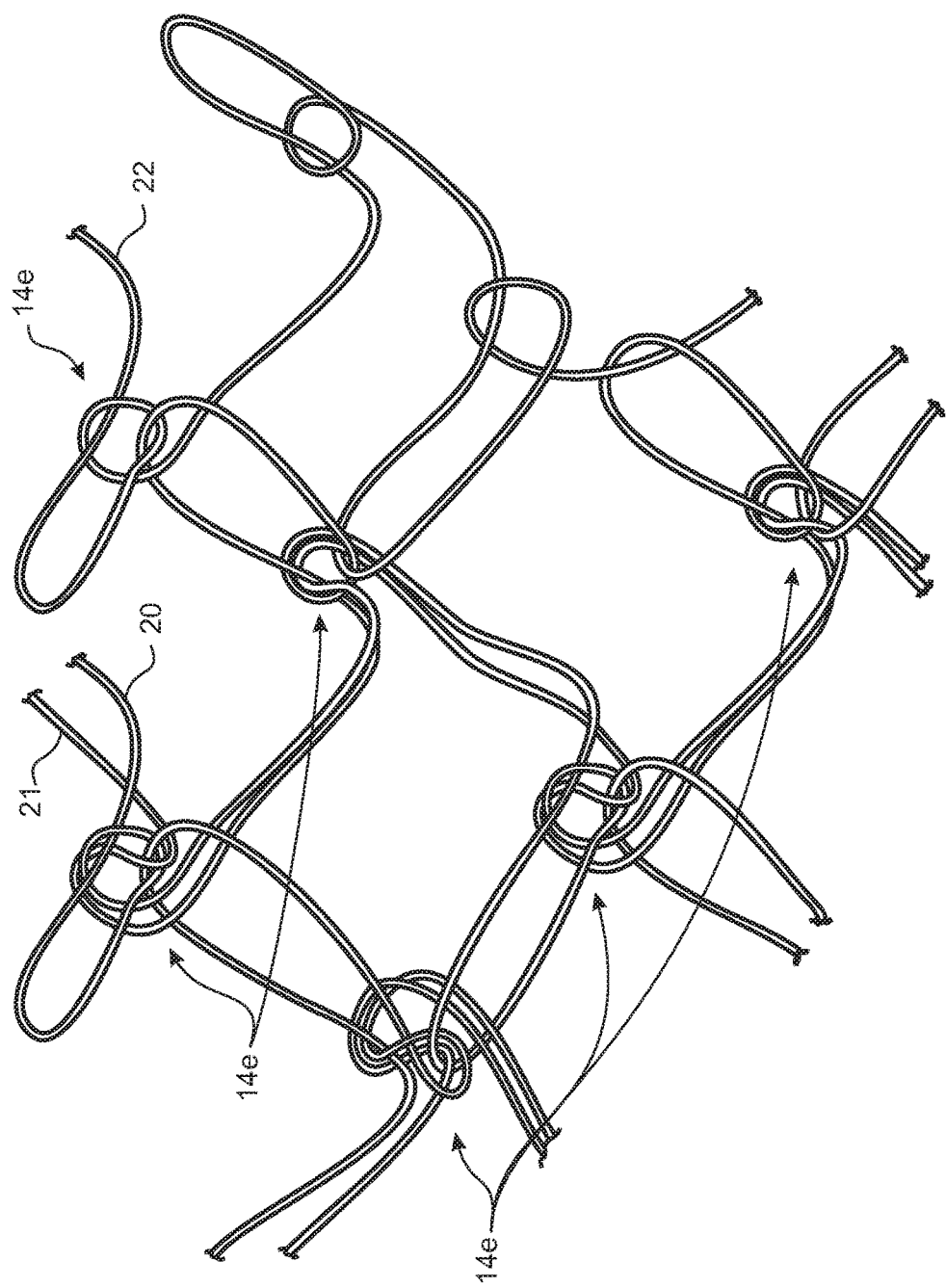
FIG. 16 is a closer view of a smaller portion of the crop protection netting than shown in FIG. 15, and in which three separate monofilament yarns or strands of the netting are shown each in a different shade.

Referring now particularly to FIG. 16 which is a closer view of a small portion of the netting with three separate monofilament yarns or strands of the netting shown, and FIGS. 17a-c which each show the path of a one of the three yarns in an individual intersection in the netting and FIG. 17d which shows enlarged an individual intersection circled by a dashed, each intersection is formed by knitting together of three yarn parts (of three yarns extending lengthwise beside each other) passing through the intersection:

- a first yarn 22 which enters the intersection along a first axis A and exits the intersection along the same first axis, so that a first connecting portion 22a to a first adjacent intersection (of the four connecting portions to the intersection from four immediately adjacent and surrounding intersections) comprises adjacent lengths of the same yarn 22
- a second yarn 20 which enters the intersection along a second axis B, passes through (and around) the loop within the intersection of the first yarn 22, and extends to and returns from a second adjacent intersection along a third axis C so that a second connecting portion 20a to that adjacent intersection comprises adjacent lengths of the same yarn 20, and exits the intersection along a fourth axis D, and
- a third yarn 21 which enters the intersection along second axis B so that a third connecting portion 21a from a third adjacent intersection comprises portions of both yarns 20 and 21, passes through the loop in the intersection of the first yarn 22, and exits the intersection along fourth axis D with yarn 20, so that a fourth connecting portion 24a to a fourth adjacent intersection comprises portions of both yarns 20 and 21.

Referring now particularly to FIG. 16.1 that is showing a variation on the knit pattern of FIG. 16, this variation of FIG. 16.1 has extra looping. FIG. 16.1 is a closer view of a small portion of the netting with three separate monofilament yarns or strands of the netting shown and intersection indicated at 114e, FIGS. 17.1 a-c each show the path of a one of the three yarns in an individual intersection in the netting, and FIG. 17.1d shows an enlarged an individual intersection circled by a dashed line again, each intersection is formed by knitting together of three yarn parts (of three yarns extending lengthwise beside each other) passing through the intersection:

- a first yarn 122 which enters the intersection and does an extra loop before entering axis 1A, then extends along a first axis 1A and exits the intersection along the same first axis, so that a first connecting portion 122a to a first adjacent intersection (of the four connecting portions to the intersection from four immediately adjacent and surrounding intersections) comprises adjacent lengths of the same yarn 122
- a second yarn 120 which enters the intersection along a second axis 1B, passes through (and around) the loop within the intersection of the first yarn 122, and goes behind the loop created by the first yarn 122 to create an extra loop then extends to and returns from a second adjacent intersection along a third axis 1C so that a second connecting portion 120a to that adjacent intersection comprises adjacent lengths of the same yarn 120, and exits the intersection along a fourth axis 1D, and
- a third yarn 121 which enters the intersection along second axis 1B so that a third connecting portion 121a from a third adjacent intersection comprises portions of both yarns 120 and 121, passes through the loop in the intersection of the first yarn 122, and exits the intersection along fourth axis 1D with yarn 120, so that a fourth connecting portion 124a to a fourth adjacent intersection comprises portions of both yarns 120 and 121.

The extra looping in FIGS. 18.1 and 17.1 creates a similar net to FIGS. 16 and 17 but the extra looping gives a reduction in how stretchable the net is and this may in some applications be a more desired option. A plan view of Figure of 16.1 and 17.1 is shown in FIG. 18.1.

Another feature of the netting construction of the preferred embodiment is that each yarn intersection in the netting is connected to adjacent and surrounding yarn intersections by the connecting yarn portions 4a-d each comprising at least two yarn lengths. In a preferred embodiment, each yarn intersection in the netting is connected to adjacent and surrounding yarn intersections by connecting yarn portions each comprising at least two yarn lengths that are at least free of knots or loops for 2 mm or more in length between the intersections.

This intersection knitting is repeated at each intersection in the netting. FIG. 16 shows the path of individual yarns in a larger portion of the netting. FIG. 18 shows a section of the material in which some individual yarns are shown in a contrasting colour from which it can be seen how individual yarns proceed down the length L of the material in the warp direction. Arrow L in FIG. 18 also indicates the machine or manufacturing direction. The many individual yarns all extend along the length of the netting and each yarn follows an approximate lengthwise zig-zag path path, looping at each intersection in the netting comprising the yarn to one side and then to another side so that is linked to the two adjacent pairs of yarns on both sides. Referring to FIG. 18 it can be seen that there is a pattern of zig-zags of two yarn parts, such as indicated at 30, between intersections 14e, with a loop, such as indicated at 31, to one side and then a loop, such as indicated at 32, to the other side, from successive intersections.

Figure 19:
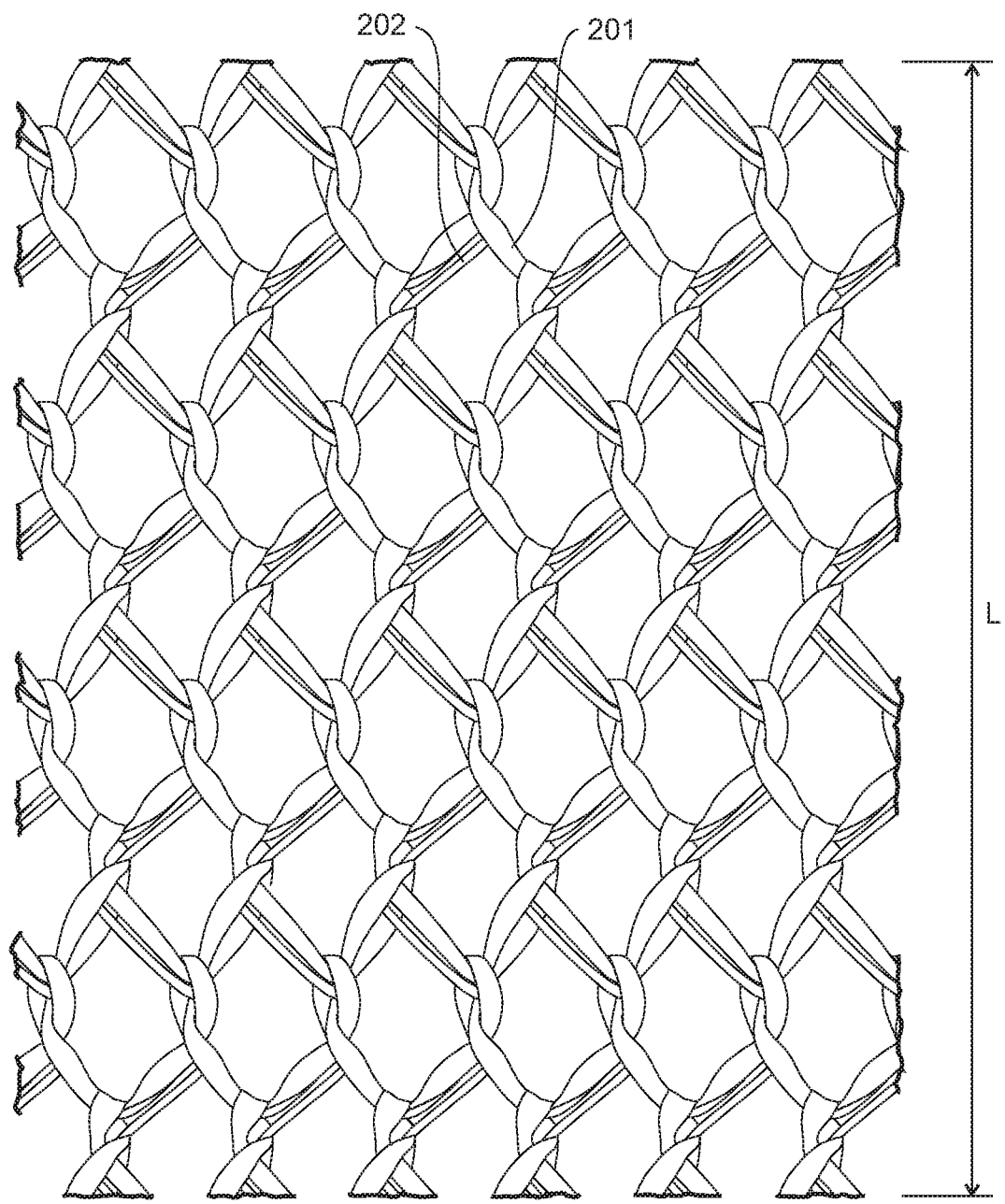
FIG. 19 is a plan view of a portion an embodiment of crop protection netting of the invention which is knitted from monofilament and tape, in a taut but un-stretched state in accordance with an embodiment of the invention.

FIG. 19 is a plan view of a portion an embodiment of a crop protection netting which is knitted from a combination of monofilament and tape, in a taut but un-stretched state, and FIG. 19.1 is a closer view of a smaller portion of the crop protection netting of FIG. 19. In this embodiment one of the multiple yarns 201 of which the netting is formed comprises a tape. The other one or two or more yarn or yarns comprise monofilament 202 (or may comprise multi-stranded yarn). For example relative to the netting of FIG. 16 one of the three yarns or strands 20, 21, and 22 of that figure is a tape, while the other two remain monofilament (or multifilament). Alternatively two of the yarns 20, 21, and 22 are tape while the other yarn remains monofilament (or multifilament). The tape(s) 201 increase(s) shading provided by the netting while the monofilament 202 gives the netting additional strength than if made entirely of tape. In preferred embodiments of this netting the tape(s) 201 may have a width in the range from about 1 to about 5 mm, or about 1 to about 3, or about 1 to about 2 mm, or 1.4 to 1.8 mm and in a particularly preferred form has a width about 1.6 mm. All of the netting may be knitted of a combination of monofilament and tape or only lengthwise parts with other adjacent lengthwise parts knitted from monofilament alone. That is, across its width the netting comprises two or more lengthwise 'stripes' of sections knotted from monofilament only (or multifilament) and sections knitted from a combination of monofilament and tape—such 'stripes' may be of the same or different individual widths across the overall width of the netting.

FIG. 19.2 is a plan view of a portion a variant of the crop protection netting of FIGS. 19 and 19.1. In this netting tapes 201 are spaced across the width of the netting with, in between the tape strands or elements, monofilament 202 that has been replaced by tape in the embodiment of FIGS. 19 and 19.1 remaining as monofilament of FIG. 19.1 That is, in this embodiment every second similar monofilament rather than every similar monofilament comprises a tape. In other variants every third or fourth or fifth (and so on) similar monofilament is replaced with a tape.

Figure 20:
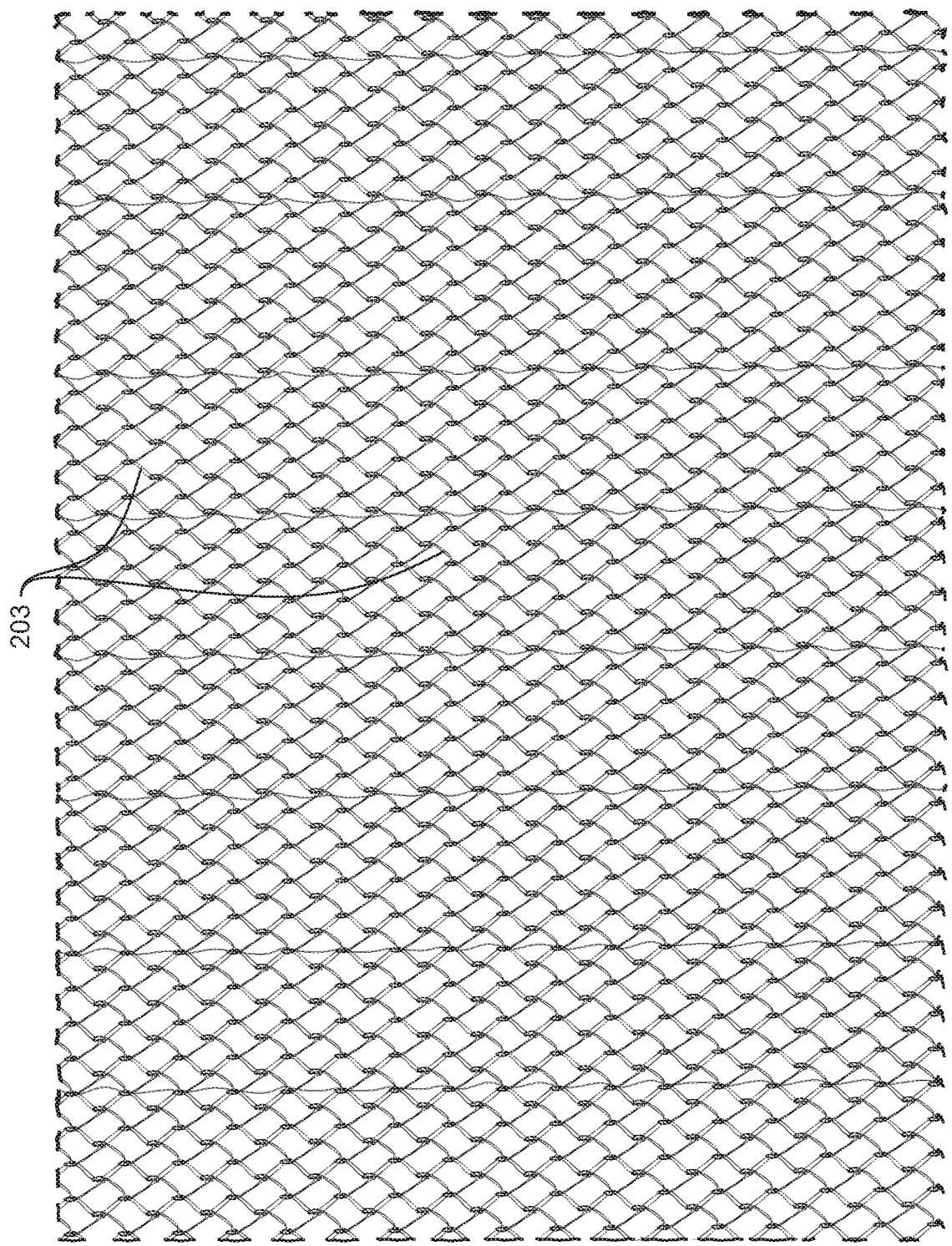
FIG. 20 is a plan view of a portion another embodiment of crop protection netting of the invention knitted from monofilament and with lay-in monofilaments through the netting, in a taut but un-stretched state in accordance with an embodiment of the invention.

FIG. 20 is a plan view of a portion another embodiment of the crop protection netting knitted from monofilament and with lay-in monofilament through the netting, in a taut but un-stretched state in accordance with an embodiment of the invention, and FIG. 20.1 is a closer view of a smaller portion of the crop protection netting of FIG. 20. The netting is the same as that of FIGS. 16 to 18 except that in this embodiment the netting also comprises lay-in monofilament 203 extending through the netting as shown, woven through the mesh apertures and/or around at least some of the intersections of the yarns of which the netting is formed. The lay in could also be made of a tape, to increase the level of shading. The lay in could also be in every aperture rather than every fourth one as shown in FIG. 20.1. Again this lay in increases shading provided by the netting. In preferred embodiments the lay-in 203 may have a width in the range from about 1 to about 5 mm, or about 1 to about 3, or about 1 to about 2 mm, or about 1.4 to 1.8 mm and in a particularly preferred form has a width about 1.6 mm. Alternative to lay-in monofilament as shown the lay-in 203 may comprise multifilament or tape. The yarns of which the netting is formed i.e. the knitted yarns, may comprise monofilament, multifilament yarn, or tape also. Typically the lay-ins 203 extend through the netting substantially in the same direction to one another. Typically the lay-ins extend in a length of the netting (such as a warp or machine direction of the netting). All of the netting may comprise a lay-in tape or monofilament or multifilament or only lengthwise parts. That is, across its width the netting comprises one or more lengthwise 'stripes' of sections with a lay-in and one or more other sections without a lay-in—such 'stripes' may be of the same or different individual widths across the overall width of the netting.

Having described immediately above knit structures, embodiments of netting which are embodiments of the invention, which use this knit structure and also have a shade factor which varies across the width of the netting, are now described. To vary the shade factor across the width of the netting the netting in general terms comprises a greater amount of the tape or lay-in in at least a first region of the netting than in a second region of the netting. In one form of the netting having a higher shade factor in the first region ie centre of the width of the netting, the netting comprises more tape or lay-in in the first region than in the second region. The 'more tape or lay-in' may comprise a higher frequency of the tape or lay-in in the first region and/or the tape or lay-in in the first region is wider and/or heavier. In another form of the netting the netting may have a higher shade factor in a first region ie centre of the width of the netting, an intermediate shade factor in a second region, and a lowest shade factor in a third region, the netting comprises a greater amount of said tape or said lay-in said first region, a lesser amount of tape in said second region than in said first region, and a lesser again amount of tape in said third region than in said second region. For example, the netting may comprise a greater amount of said tape or said lay-in said first region, a lesser amount of tape in said second region than in said first region, and no tape in said third region.

In some embodiments the shade factor could be varied 'gradually' or with a gradient across the width of the netting by having many regions of differing shading factor. By example, netting materials having two or three regions of different shade factors are described above. However, in some embodiments the netting material may have more than three different shade regions. For example, a netting material may have multiple, for example 15, different regions, a centre region having the highest shade factor and seven regions each side of the central region each having a different lower shade factor to provide a netting material with a more graduated change in shading factor from a higher factor in the centre to a lower factor at the edges.

A netting material providing a high level of shading typically has a high cover factor to block out sunlight. It follows that a netting material providing a high level of shading typically has a higher or increased weight compared to netting materials providing lower shading levels. Heavier weight netting materials may be less desirable. Where the netting material is draped over a tree or plant the tree or plant must bear the weight of the netting material and weaker limbs of the tree may be broken or damaged or fruit may be damaged.

Figure 21A:
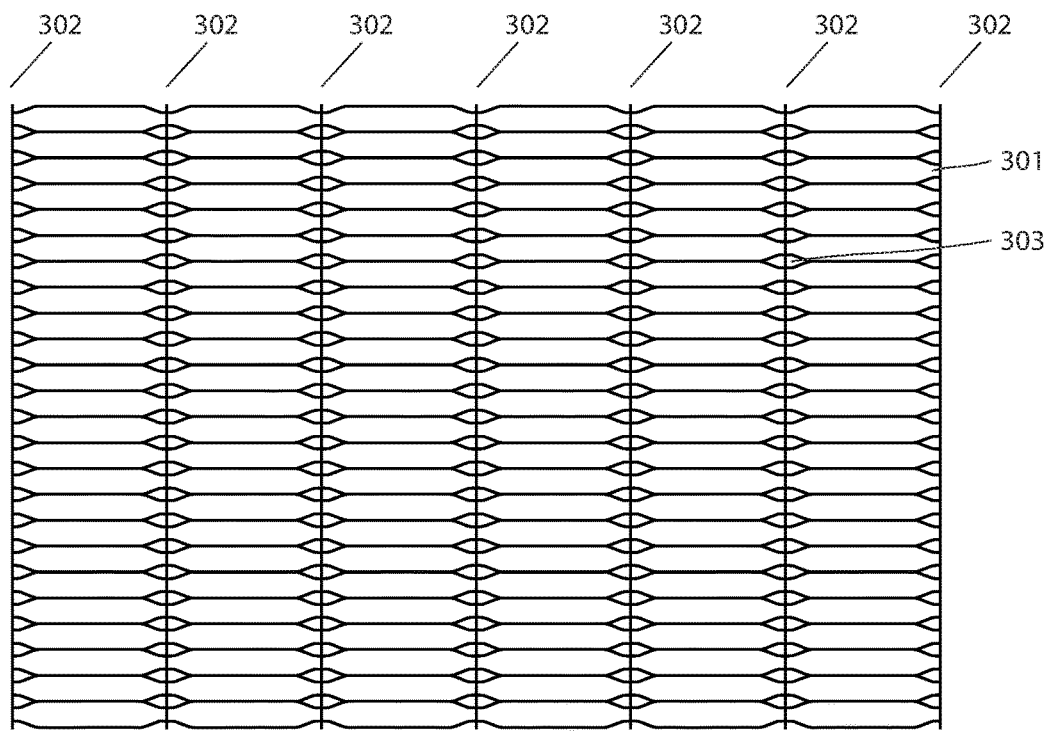
FIG. 21A is a diagrammatic plan view of a section of netting material that has a leno woven construction comprising weft tapes.
Figure 21B:
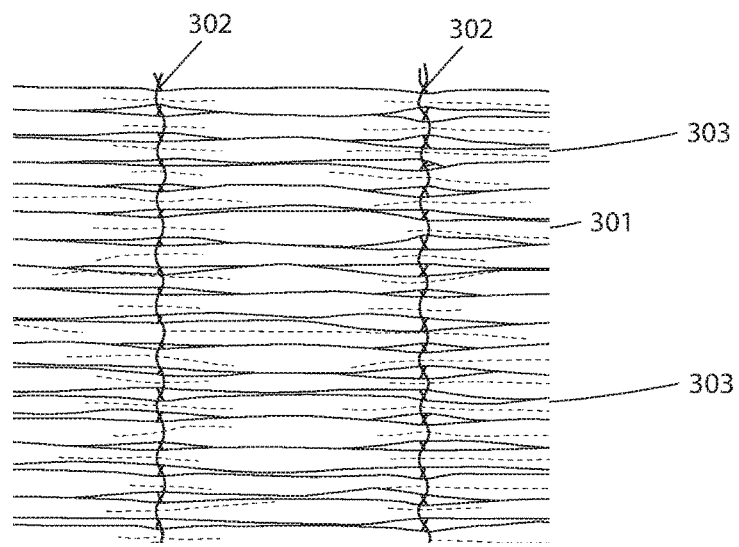
FIG. 21B is a schematic view of a section of netting material that has a leno woven construction comprising weft tapes.
Figure 21C:
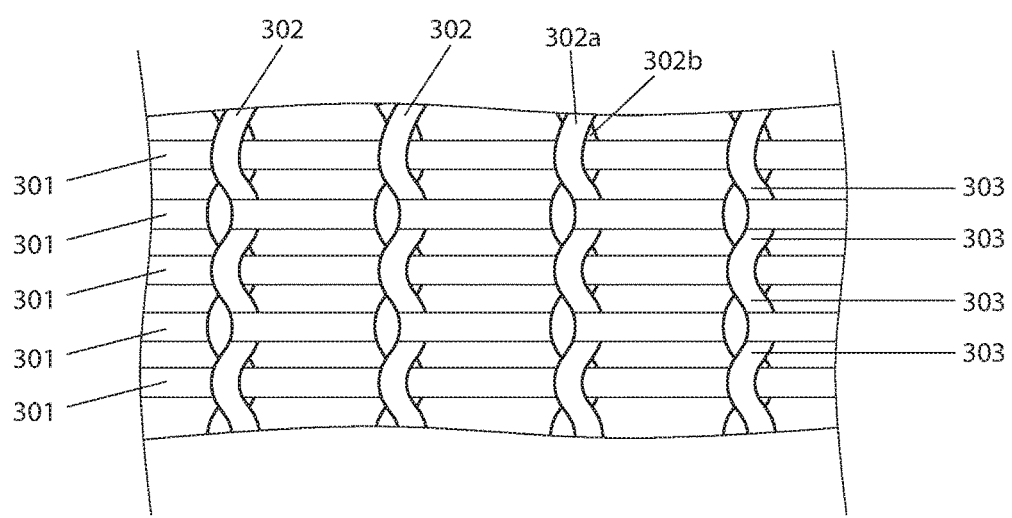
FIG. 21C is a diagrammatic plan view of a section of a typical prior art leno woven netting material.

In one aspect of the invention a netting material is provided that has a high shading factor or cover factor (coverage) with a reduced weight. In a preferred embodiment the netting material has a leno weave construction. A typical prior art leno weave material is illustrated in FIG. 21C that has weft yarns 301 and pairs 302 of warp yarns 302a and 302b, the pairs of warp yarns 302 spaced apart across the width of the material. The two warp yarns 302a and 302b in each pair of yarns 302 cross at a cross-over point 303 between adjacent weft tapes 301 so that the warp yarns extend over and under adjacent weft yarns alternatively.

In some embodiments of the present invention the leno woven netting material comprises weft tapes. The tapes preferably have a width many times its thickness. In some embodiments the warp yarns are monofilaments. With reference to FIGS. 21A and 21B, in a netting material according to some embodiments of the present invention the distance between adjacent cross over points 303 along a pair of warp yarns is less than the width of the weft tapes, so that the weft tapes are folded at each pair of warp yarns. That is, in some embodiments, the warp yarns are woven tightly around the weft tapes so that the warp yarns pull each tape tightly to bunch or fold the tape between the warp yarns in each pair of warp yarns. However, the spacing between adjacent pairs 302 of warp yarns is sufficient to allow the weft tapes to substantially unfold between the adjacent pairs of warp yarns, so that adjacent weft tapes overlap or abut between adjacent pairs 302 of warp yarns. The overlapping or abutting weft tapes 301 result in a high cover factor to provide a high level of shading. This contrasts with prior art leno woven materials, as described above, where a leno weave is used to provide an open weave to allow light and air to pass through the woven material.

The leno woven netting material provides a high cover factor due to adjacent tapes overlapping or abutting in between the adjacent pairs of warp tapes. However this leno construction, while providing a high cover factor, may also be lightweight. The tapes abut without overlapping or with minimal overlapping a high coverage factor may be achieve for a relatively low weight per square meter of netting material. In some embodiments the combination of the dimensions of the weft tapes, the distance between adjacent cross over points of the warp yarns in each pair of warp yarns, and the spacing between adjacent pairs of warp yarns provides a cover factor of at least 70% and a weight of less than 100 grams per square metre. In contrast, knitted netting materials have overlapping yarns in the knotted areas of the netting material resulting in higher weight per square metre of netting material for a given cover factor.

In one preferred example of a netting material the warp tapes have a width of about 3 mm and thickness of about 0.050 mm, and the pairs of warp yarns are spaced apart by a distance of about 24 mm. The warp yarns have a thickness of about 0.285 mm. The distance between cross over points in each pair of warp yarns may be about 1 to 2 mm and preferably less than 2 mm. For these dimensions each tape is folded or bunched onto itself at each pair of warp yarns but is substantially unfolded for a substantial length between adjacent pairs of warp yarns to overlap or abut with adjacent tapes to provide a higher cover factor. In this embodiment the netting material has a weight of about 80 gsm and a cover factor of about 95%. Increasing the distance between adjacent pairs of warp yarns further beyond a spacing of 24 mm in the above example may not achieve a substantial further increase in cover factor.

In some embodiments the width of the weft tapes is at least twice the distance between adjacent cross over points so that the weft tapes may unfold to overlap or abut adjacent weft tapes in between warp yarn cross over points. To allow weft tapes to be unfolded in between warp yarn pairs, in some embodiments the distance between adjacent pairs of warp yarns is at least three times, or five times, or ten times the width of the weft tapes. In a preferred embodiment the distance between adjacent pairs of warp yarns is about eight times the width of the weft tapes.

The combination of the width of the weft tapes and the spacing of the warp yarns can be altered to achieve a desired netting material weight and cover factor. In some embodiments the netting material has a cover factor of at least 85%, or 90% or 95%, or about 95%. In some embodiments the netting material has a weight of less than 100 gsm, or 95 gsm, or 90 gsm, or 85 gsm, or 80 gsm, or about 80 gsm.

In some embodiments the netting material comprises weft tapes having a thickness of about 25 to 75 microns and a width of about 1 to 5 mm and preferably about 2 mm to 4 mm, or about 3 mm, and monofilament warp yarns having a thickness of about 250 to 300 microns. In some embodiments the warp yarns may have a weight of about 250 denier to 1000 denier and in one preferred embodiment a weight of about 500 denier. In some embodiments the weft tapes may have a weight of about 600 denier to 2500 denier and in one preferred embodiment a weight of about 11000 denier. When weaving the warp yarns tightly over and under the weft tapes in the leno weave the distance between the warp yarn cross over points is determined by the tape cross section and also the cross section of the warp yarns. For a larger warp yarn cross section and/or tape cross section the further part the warp yarn cross over points will be and therefore the wider the tapes will need to be to overlap or abut in between the cross over points to provide a higher shade factor.

Figure 21D:
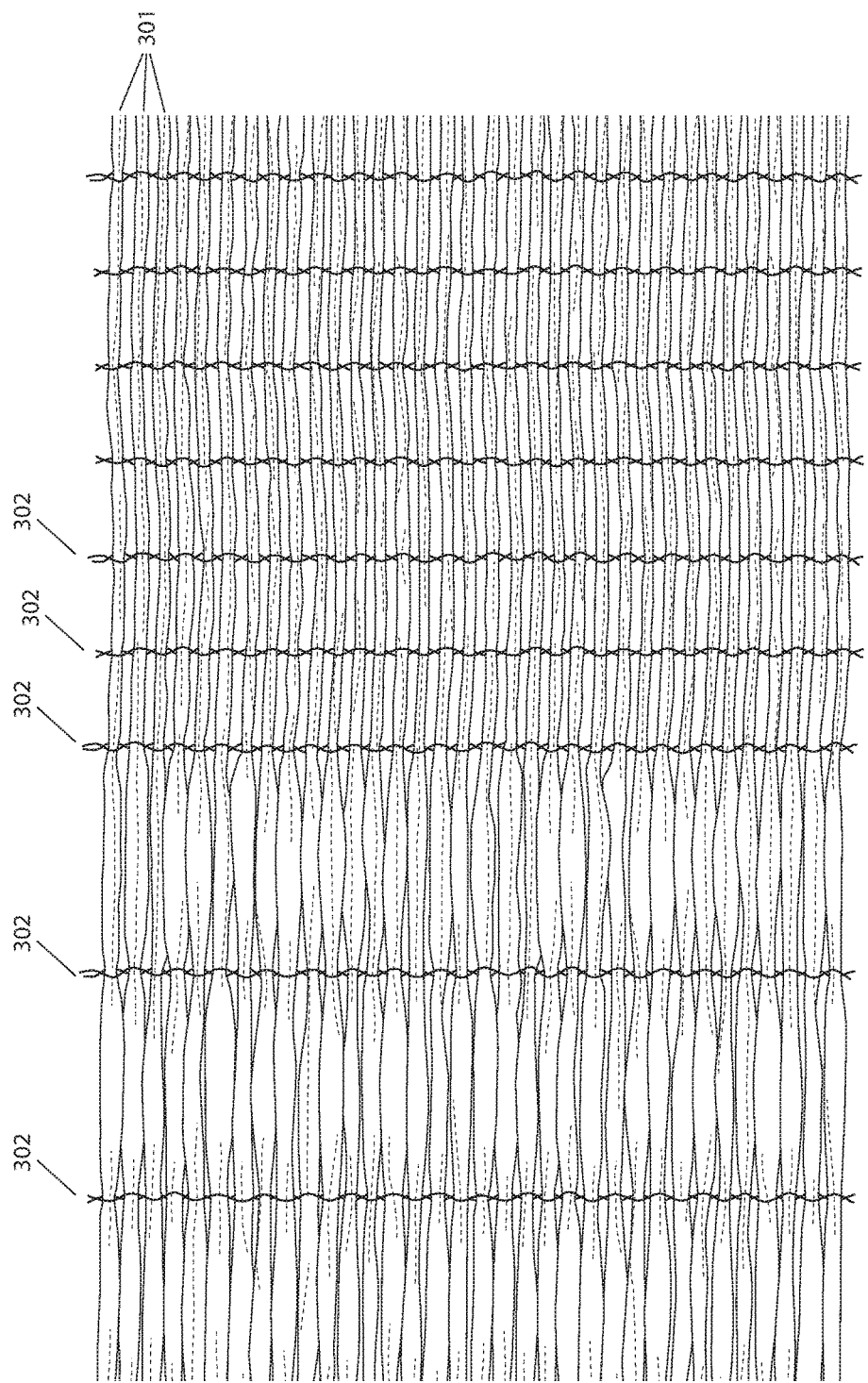
FIG. 21D is a schematic illustration of a leno woven netting material, illustrating two regions each of which has different cover factor.
Figure 21E:
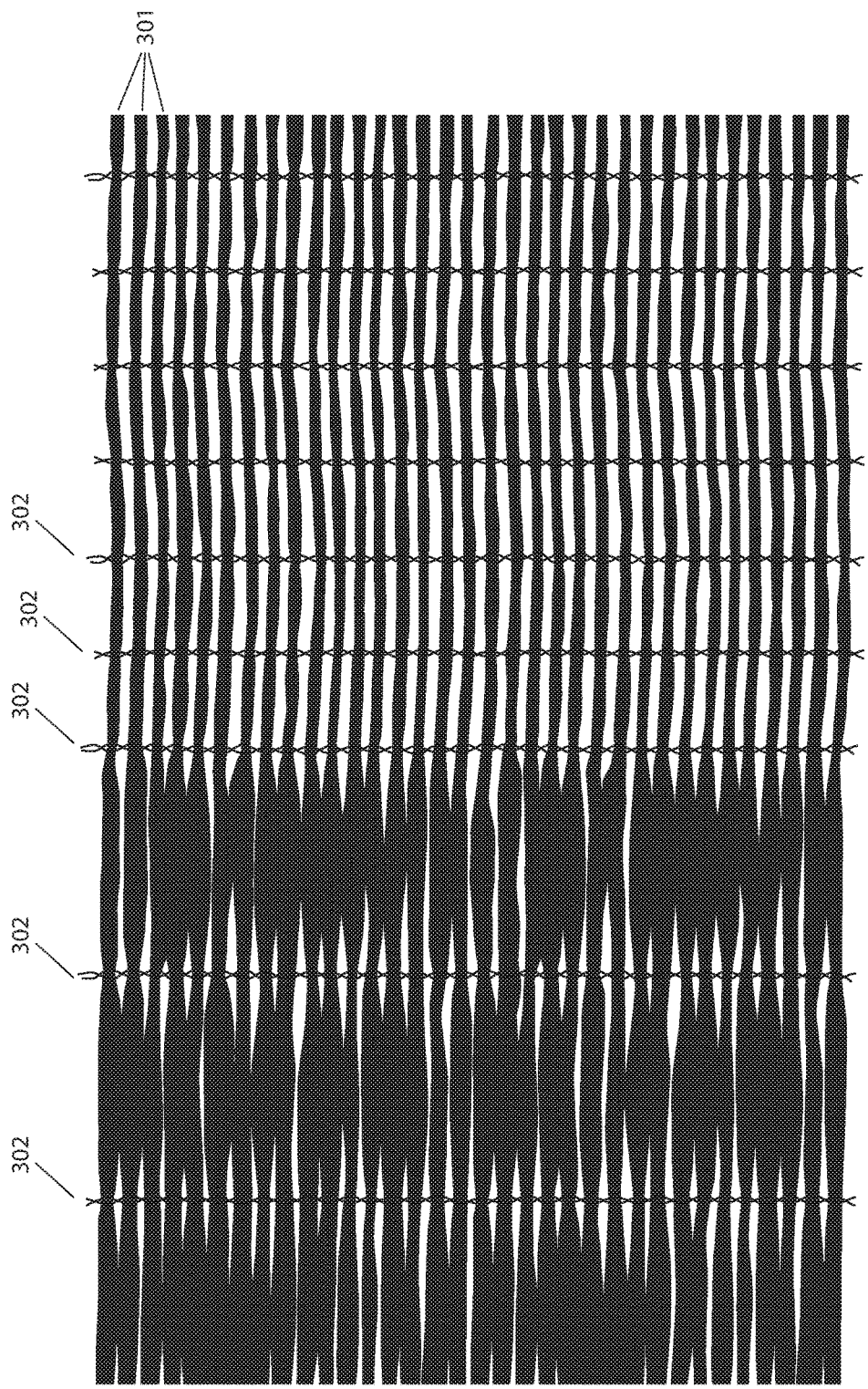
FIG. 21E is the same illustration as that of FIG. 21D but the weft tapes have been coloured black to better illustrate the relative coverage of the different regions of the fabric.
Figure 22:
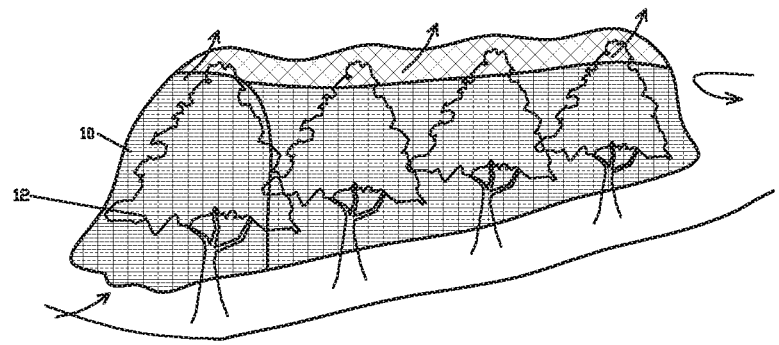
FIGS. 22 and 23 are schematic views showing netting according to one embodiment of the present invention draped over a row of trees, with a centre region of knitted netting material and side regions having a leno weave netting construction. A gap is provided between the ground and an edge of the netting material.
Figure 23:
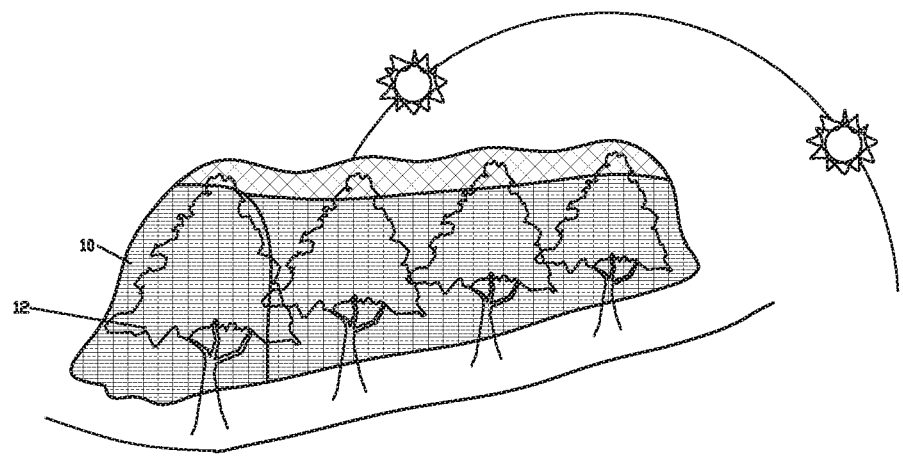
Figure 24:
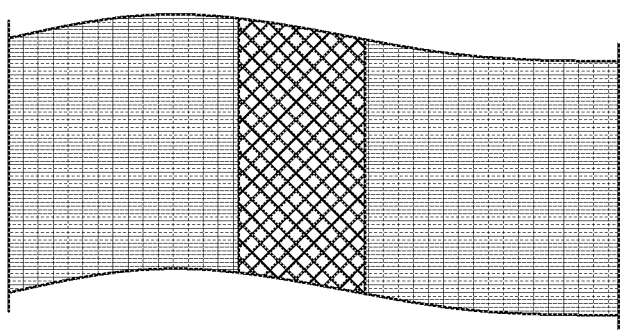
FIG. 24 is a schematic plan view of a length of netting comprising a central portion comprising knitted netting construction having a lower shade factor than regions either side of the central region comprising a leno weave construction.
Figure 25:
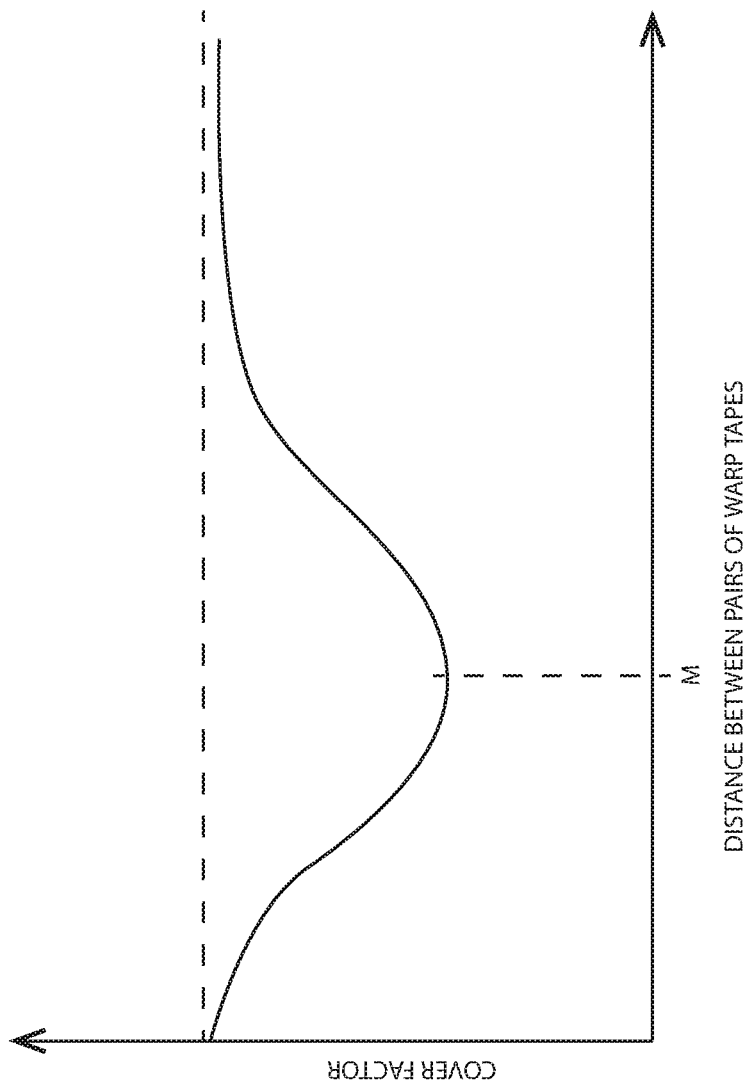
FIG. 25 is a graph illustrating a relationship between the cover factor provided by a leno woven netting material based on a spacing between pairs of warp yarns in the netting material.

Having described immediately above a leno weave construction, embodiments of netting which are embodiments of the invention, which use this weave construction and also have a shade factor which varies across the width of the netting, are now described. To vary the shade factor across the width of the netting the spacing between the warp yarns may be varied. However, unlike the earlier described embodiments described with reference to FIG. 4 where the spacing between warp yarns was decreased in order to achieve a higher shade factor, in the leno weave construction described above, a lower shade factor may be achieved by decreasing the spacing between adjacent pairs of warp yarns. For example, the distance between pairs of warp yarns may be 20 mm in a region of higher shade factor, and 8 mm in a region of lower shade factor. Where there is a small distance between adjacent pairs of warp yarns, the tapes being folded at the warp yarns does not unfold between adjacent warp yarn pairs resulting in a gap between adjacent weft tapes. Such a netting is illustrated in FIG. 21D, where the region of the material on the left side of the illustration has greater spacing between adjacent pairs of warp yarns 302 and greater cover factor, and the region on the right side of the illustration has less spacing between adjacent pairs of warp yarns 302 and lower cover factor. The dashed lines on the weft tapes 301 illustrate folds in the tapes. FIG. 21E is the same illustration as FIG. 21D, but the weft tapes 301 of the material have been coloured black to better illustrate the coverage difference between the two regions. FIG. 21E is a schematic illustration based on an actual sample of fabric. In the sample of fabric the cover factor of the region on the left was 95%, and the cover factor of the region on the right was 74%. While not wishing to be bound by any particular theory, the inventor considers that for a given tape width, warp yarn cross over spacing the relationship between cover factor and spacing between warp yarn pairs is conceptually as shown by the graph of FIG. 25. In the graph of FIG. 25 cover factor is on the vertical axis and spacing between adjacent pairs of warp yarns is on the horizontal axis. For a given netting material there will be a minimum cover factor M achieved at a particular spacing between warp yarn pairs. At that particular spacing between warp yarn pairs the weft tapes do not unfold between adjacent warp yarn pairs and so a gap is present between adjacent weft tapes between warp yarn pairs. As the spacing between warp yarn pairs is increased, the tapes can unfold between warp yarn pairs to spread out and close the gap between adjacent weft tapes. Thus by increasing the spacing between the warp yarn pairs the cover factor of the material increases. Decreasing the spacing between adjacent warp yarn pairs to be less than the spacing at which the minimum cover factor is achieved would see the cover factor begin to increase, as the coverage provided by the warp yarns would become significant and influence the cover factor of the netting material. For example, if the pairs of warp yarns were spaced tightly side by side then a high cover factor would be achieved. However, the weight of the netting material would also increase significantly. By choosing a leno construction that is on the right hand side of the minimum coverage in the graph of FIG. 25 a high cover factor may be achieved for a reduced weight netting or shade material. To be on the right hand side of the minimum coverage point in the graph of FIG. 25 it is necessary for the distance between adjacent pairs of warp yarns to be sufficient to allow the weft tapes to unfold. To be on the right hand side of the minimum coverage point in the graph of FIG. 25 and achieve a substantial increase in cover factor above the minimum cover factor point it is necessary for the distance between adjacent pairs of warp yarns to be sufficient to allow the weft tapes to substantially. In graph of FIG. 25 the dashing line indicates a cover factor of 100%.

Table 1 below illustrates cover factor increasing as the spacing between warp yarns increases for a leno weave material of the construction described above, and as illustrated in FIG. 21D. The leno weave material comprised of polyethylene warp monofilaments, and polyethylene warp tapes. The warp filaments were 0.3 mm in diameter, and of 500 denier. The weft tapes were 2.5 mm wide, and of 1150 denier. The weft tape insertion rate was 17 tapes per inch. The distance between crossover points along a pair of warp yarns was 1.5 mm, which caused slight folding of the weft tapes. The material comprised three different regions of coverage, the different coverage achieved by varying only the spacing between pairs of warp yarns (i.e. spacing between pillars) across the width of the material. The spacing between pairs of warp yarns (i.e. spacing between pillars) for each of the three regions is detailed below, along with the weight (grams per square meter) with the material. As illustrated in the table, as the pillar distance increased, coverage increased as well. The three different regions of the material correspond to the section of the curve of FIG. 25 to the right of the minimum coverage point.

TABLE 1

| Pillar distance (mm) | Cover Factor (%) | Mass (gsm) |
| --- | --- | --- |
| 7.9 | 73.8 | 92 |
| 16 | 90.6 | 84 |
| 23.9 | 94.7 | 80 |

In a preferred leno construction as described the netting material has pairs of warp yarns spaced across the width of the netting and woven over and under the weft elements as in the known leno construction. However, in some embodiments there may be more than two warp yarns grouped together, each group spaced apart across the width of the netting material. For example, each group of warp yarns could comprise a pair of warp yarns as known in the art, and a third yarn twisted around the pair.

Figure 1:
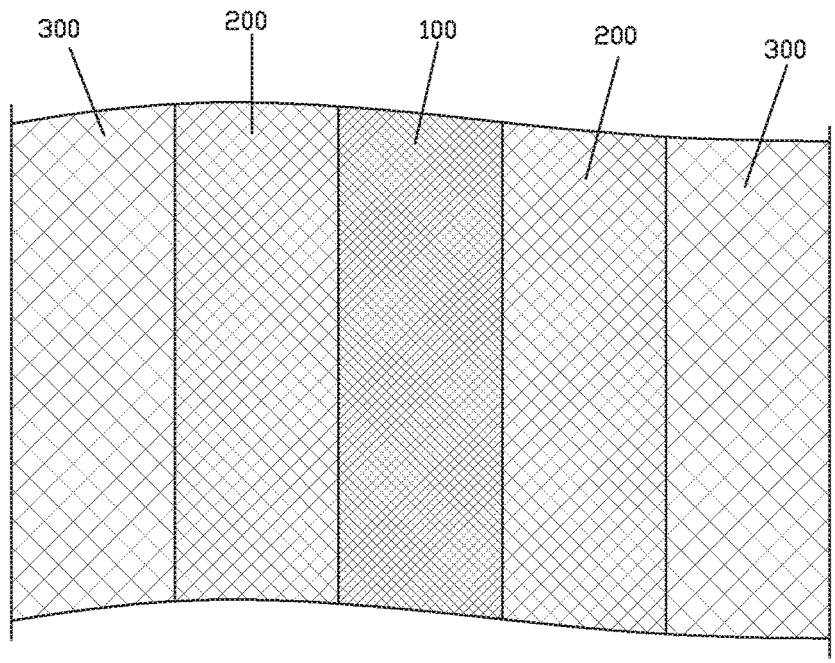
FIG. 1 a schematic plan view of a length of netting. The netting comprises a knitted construction with a higher density of construction at a central region than at peripheral regions.
Figure 2:
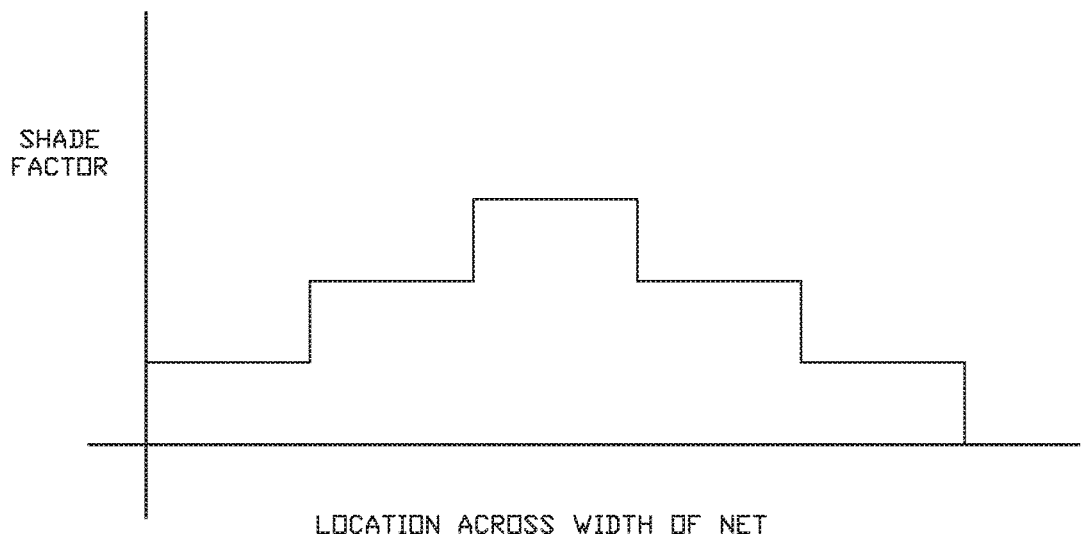
FIG. 2 is a plot of a shade factor profile across the width of a section of hypothetical netting which illustrates how the shade factor of the netting varies across the width of the netting.

For example, with reference to FIG. 1, peripheral regions 300 of the netting material may comprise a leno weave with a spacing between the pairs of warp yarns at or near to a minimum spacing defined by the minimum cover factor M in FIG. 25 to give a low cover or shade factor. An intermediate region 200 may have a larger spacing between the pairs of warp yarns to give a higher cover factor compared to the peripheral regions 300. And a centre region 100 may have an even larger spacing between the pairs of warp yarns to give an even higher cover factor for the netting material.

In some embodiments the leno woven netting material may be combined with another netting material or materials to form a netting material having a varying shade or cover factor over the width of the netting material. A netting material may comprise a knitted netting material in one region of the netting providing a low cover factor and forming a venting region, and a leno weave netting material as described in another region of the netting material providing a high cover factor to provide a shading region. For example, as described above with reference to cherry trees, or temperate fruit trees, where it may be desirable to provide a netting material having a lower cover factor in a central region and a higher cover factor in peripheral regions, a netting material in some embodiments of the invention may have a knitted netting material in the central region, and a leno construction netting as described above in the peripheral regions of the netting material.

The knitted region may provide a venting region allowing warmer air to escape, while the regions either side may provide a shade. The knitted construction in the central region may have an aperture size of 5 mm to 20 mm and may be knitted from monofilaments. The knitted region of the netting material provides an 'open' section of the netting material, while still providing protection against birds or hail for example. In the peripheral regions either side of the central region the leno weave netting construction provides shading against sunshine, to reduce warming effect of sun on the trees. In a preferred embodiment where the edges of the netting does not reach the ground level, a gap is provided between the edges of the netting and the ground so that air flow is open from outside of the netting below the canopy of the trees and up through the central knitted region of the netting material to above the canopy of the trees. The leno construction may be attached to the knitted construction by stitching, bonding with adhesive or any other suitable attachment method. The knitted construction may comprise a cover factor of less than 50% wherein the leno woven material may comprise a cover factor of greater than 70%. Alternatively, both regions may be of leno weave construction, with the venting region being of leno weave construction having lower factor, and the shading region being of leno weave construction and having a higher cover factor.

In various Figures the netting materials are illustrated as drape netting, that is netting draped over trees. However netting materials according to various embodiments of the present invention may be used in vertical or horizontal net installations also, for example vertically arranged windbreak netting materials, or netting installations suspended by overhead wires.

In general, the netting materials of the invention described above have been described in relation to a single length of material extending to cover a single row of plants. In some embodiments a plurality of lengths of such materials may be stitched together along their lengthwise edges to form a larger material capable of covering multiple rows of plants, each length of material forming a repeating unit of material with characteristics effective to enhance the protection or development of a row of plants intended to be located beneath that unit of material. Alternatively, rather than forming multiple lengths of material separately and stitching them together along their lengthwise edges, an equivalent effect can be achieved by manufacturing a single piece of material having a plurality of such repeating units across the width of a single length of material.

In some embodiments the nettings of the invention are drape nets, draped over plants without any supporting structure. In other embodiments the nettings of the invention are supported by structures comprising, for example, post and wires.

The skilled person will appreciate that the present invention can be achieved using a variety of knits and weaves. For example, a netting material according to some embodiments of the invention may comprise a pillar knit construction, a diamond knit construction having a mesh with diamond shaped apertures, or a hexagonal knit construction having a mesh with hexagonal knit constructions.

The foregoing describes the invention including a preferred form thereof, alterations and modifications as will be obvious to those skilled in the art are intended to be incorporated in the scope hereof, as defined in the accompanying claims.

The invention claimed is:

1. An agricultural netting material having a length dimension and a width dimension smaller than the length dimension, the width dimension being at least 1 meter, the netting comprising:
   a lengthwise extending center region,
   a first lengthwise extending side edge,
   a second lengthwise extending side edge opposite to the first lengthwise extending side edge,
   a first lengthwise extending side region on one side of the lengthwise extending center region, and
   a second lengthwise extending side region on an opposite side of the lengthwise extending center region,
   wherein:
      said lengthwise extending center region is narrower across the width dimension of the netting than either said first lengthwise extending side region or said second lengthwise extending side region,
      a majority of the area of said first lengthwise extending side region of the netting has a shade factor greater than a shade factor of a majority of the area of the second lengthwise extending side region of the netting,
      a first total shading effect of the netting of a first lengthwise extending side of the netting between one of said first and second lengthwise extending edges and a notional center-line of the netting equidistantly spaced between said first and second lengthwise extending edges, and
      a second total shading effect of the netting of a second lengthwise extending side of the netting between the other one of said first and second lengthwise extending edges and said notional center-line of the netting, the second total shading effect being less than the first total shading effect.

2. The agricultural netting material as claimed in claim 1 wherein the shade factor of said first lengthwise extending side region is at least 5 percentage points higher than the shade factor of the second lengthwise extending side region.

3. The agricultural netting material as claimed in claim 1 wherein the shade factor of said first lengthwise extending side region is at least 10 percentage points higher than shade factor of the second lengthwise extending side region.

4. The agricultural netting material netting as claimed in claim 1 wherein the shade factor of said first lengthwise extending side region and a shade factor of said lengthwise extending center region of the netting are greater than the shade factor of said second lengthwise extending side region.

5. The agricultural netting material netting as claimed in claim 4 wherein the shade factor of said first lengthwise extending side region and the shade factor of said lengthwise extending center region are at least 5 percentage points greater than the shade factor of the second lengthwise extending side region.

6. The agricultural netting material as claimed in claim 4 wherein the shade factor of said first lengthwise extending side region of the netting and the shade factor of said lengthwise extending center region are at least 10 percentage points greater than shade factor of the second lengthwise extending side region.

7. The agricultural netting material as claimed in claim 4 wherein a combined width of said first lengthwise extending side region and said lengthwise extending center region is at least 0.5 m.

8. The agricultural netting material as claimed in claim 4 wherein a combined width of said first lengthwise extending side region and said lengthwise extending center region is at least 1 m.

9. The agricultural netting material as claimed in claim 4 wherein said first lengthwise extending side region comprises a dark pigment.

10. The agricultural netting material as claimed in claim 4 wherein said first lengthwise extending side region and said lengthwise extending center region comprises a dark pigment.

11. The agricultural netting material as claimed in claim 4 wherein the netting is woven from warp yarns and weft yarns and the spacing between adjacent warp yarns is narrower in said first lengthwise extending side region and said lengthwise extending center region than in said second lengthwise extending side region.

12. The agricultural netting material as claimed in claim 4 wherein the netting is woven from warp yarns and weft yarns including warp yarns in said first lengthwise extending side region and said lengthwise extending center region that are thicker or wider than warp yarns in said second lengthwise extending side region.

13. The agricultural netting material as claimed in claim 1 wherein the width of said first lengthwise extending side region is at least 0.5 m.

14. The agricultural netting material as claimed in claim 13 wherein the width of said second lengthwise extending side region is at least 0.5 m.

15. The agricultural netting material as claimed in claim 1 wherein the width of said first lengthwise extending side region is at least 1 m.

16. The agricultural netting material as claimed in claim 15 wherein the width of said second lengthwise extending side region is at least 1 m.

17. The agricultural netting material as claimed in claim 1 wherein yarn from which the netting is woven incorporates a higher level of a pigment or a different pigment in said first lengthwise extending side region than in said second lengthwise extending side region.

18. The agricultural netting material as claimed in claim 1 wherein said first lengthwise extending side region has a smaller aperture size and/or a higher density than in said second lengthwise extending side region.

19. The agricultural netting material as claimed in claim 1 wherein said first lengthwise extending side region and said lengthwise extending center region have a smaller aperture size and/or a higher density than in said second lengthwise extending side region.

20. The agricultural netting material as claimed in claim 1 wherein the netting is woven from warp yarns and weft yarns and the spacing between adjacent warp yarns is narrower in said first lengthwise extending side region than in said second lengthwise extending side region.

21. The agricultural netting material as claimed in claim 1 wherein the netting is woven from warp yarns and weft yarns including warp yarns in said first lengthwise extending side region that are thicker or wider than warp yarns in said second lengthwise extending side region.

22. The agricultural netting material as claimed in claim 1 is a knitted netting.

23. The agricultural netting material as claimed in claim 1 wherein all of the area of said first lengthwise extending side region of the netting has a shade factor greater than a shade factor of all of the area of the second lengthwise extending side region of the netting.

24. A method comprising installing a netting as claimed in claim 1 over a row of plants with the lengthwise centre region of the netting located at the top of the plants and the side regions of the netting extending at least partly over opposite sides of the row of plants.

25. The method as claimed in claim 24 further comprises installing the netting over the row of plants with the side regions of the netting extending to ground on opposites sides of the row of plants.

26. The method as claimed in claim 24 wherein the row of plants is aligned more north-south than east-west and the method further comprises installing the netting over the row of plants with said first lengthwise extending side region over a west-most facing side of the row of plants.

27. The method as claimed in claim 24 wherein the row of plants is aligned more east-west than north-south and the method further comprises installing the netting over the row of plants with said first lengthwise extending side region over a north-most facing side of the row of plants.

28. The method as claimed in claim 24 wherein the row of plants is aligned more east-west than north-south and the method further comprises installing the netting over the row of plants with said first lengthwise extending side region over a south-most facing side of the row of plants.

29. The method as claimed in claim 24 wherein the row of plants is at least one of a row of trees, a row of fruit trees, and a row of fruit plants.

30. The agricultural netting material as claimed in claim 1 wherein the majority of the area of said first lengthwise extending side region of the netting is all of the area of said first lengthwise extending side region of the netting, and wherein the majority of the area of the second lengthwise extending side region of the netting is all of the area of said second lengthwise extending side region of the netting.

31. An agricultural netting material having a length dimension and a width dimension smaller than the length dimension, the width dimension being at least 1 meter, the netting comprising a first lengthwise extending side edge and an opposite second lengthwise extending side edge, and the netting comprising:
    a lengthwise extending center region,
    a first lengthwise extending side region on one side of the lengthwise extending center region, and
    a second lengthwise extending side region on opposite side of the lengthwise extending center region,
wherein:
    said lengthwise extending center region is narrower across the width dimension of the netting than either said first lengthwise extending side region or said second lengthwise extending side region, and
    a major part of or all of the area of said first lengthwise extending side region of the netting has a higher shade factor than a shade factor of a major part of or all of the area of the second lengthwise extending side region of the netting so that a total shading effect of the netting on one lengthwise-extending side of the netting between one of said first and second lengthwise-extending edges and a notional center-line of the netting equidistantly spaced between said first and second lengthwise-extending edges is greater than a total shading effect of the netting on an opposite lengthwise-extending side of the netting between the opposite of said first and second lengthwise-extending edges and said notional center-line of the netting.

* * * * *